(12) United States Patent
Corum et al.

(10) Patent No.: US 10,355,480 B2
(45) Date of Patent: Jul. 16, 2019

(54) ADAPTATION OF POLYPHASE WAVEGUIDE PROBES

(71) Applicant: CPG Technologies, LLC, Italy, TX (US)

(72) Inventors: James F. Corum, Morgantown, WV (US); Kenneth L. Corum, Plymouth, NH (US)

(73) Assignee: CPG TECHNOLOGIES, LLC, Italy, TX (US)

( * ) Notice: Subject to any disclaimer, the term of this patent is extended or adjusted under 35 U.S.C. 154(b) by 0 days.

(21) Appl. No.: 16/168,248

(22) Filed: Oct. 23, 2018

(65) Prior Publication Data

US 2019/0058327 A1    Feb. 21, 2019

Related U.S. Application Data

(63) Continuation of application No. 16/017,516, filed on Jun. 25, 2018, now Pat. No. 10,153,638, which is a
(Continued)

(51) Int. Cl.
| | |
|---|---|
| *H05K 7/14* | (2006.01) |
| *H02J 3/00* | (2006.01) |
| *H01P 3/00* | (2006.01) |
| *H01P 5/00* | (2006.01) |
| *H02J 17/00* | (2006.01) |

(Continued)

(52) U.S. Cl.
CPC ............ *H02J 3/00* (2013.01); *G01S 13/0218* (2013.01); *H01P 3/00* (2013.01); *H01P 5/00* (2013.01); *H01Q 1/00* (2013.01); *H01Q 1/04* (2013.01); *H01Q 9/30* (2013.01); *H02J 17/00* (2013.01); *H02J 50/12* (2016.02); *H02J 50/20* (2016.02)

(58) Field of Classification Search
CPC .... H04B 3/00; H04B 3/52; H01Q 1/00; H01P 3/00
USPC ......... 307/149, 104; 333/240; 343/785, 719, 343/739, 749; 324/335
See application file for complete search history.

(56) References Cited

U.S. PATENT DOCUMENTS

| | | | |
|---|---|---|---|
| 645,576 | A | 3/1900 | Tesla |
| 649,621 | A | 5/1900 | Tesla |

(Continued)

FOREIGN PATENT DOCUMENTS

| | | |
|---|---|---|
| CO | 15220552 | 2/2016 |
| EP | 0639301 | 2/1995 |

(Continued)

OTHER PUBLICATIONS

Philippines Office Action in Application No. 1/2015/501919 dated Oct. 10, 2018, 4 pages.
(Continued)

*Primary Examiner* — Tomi Skibinski
(74) *Attorney, Agent, or Firm* — Thomas | Horstemeyer, LLP

(57) ABSTRACT

Disclosed are various embodiments for transmitting energy conveyed in the form of a guided surface-waveguide mode along a lossy conducting medium such as, e.g., the surface of a terrestrial medium by exciting a polyphase waveguide probe. A probe control system can be used to adjust the polyphase waveguide probe based at least in part upon characteristics of the lossy conducting medium.

20 Claims, 29 Drawing Sheets

US 10,355,480 B2

Page 2

Related U.S. Application Data continuation of application No. 14/848,653, filed on Sep. 9, 2015, now Pat. No. 10,027,116.

(60) Provisional application No. 62/049,124, filed on Sep. 11, 2014.

(51) Int. Cl.
| | |
|---|---|
| *G01S 13/02* | (2006.01) |
| *H01Q 1/00* | (2006.01) |
| *H01Q 1/04* | (2006.01) |
| *H01Q 9/30* | (2006.01) |
| *H02J 50/20* | (2016.01) |
| *H02J 50/12* | (2016.01) |

(56) References Cited

U.S. PATENT DOCUMENTS

| | | | |
|---|---|---|---|
| 685,012 | A | 10/1901 | Tesla |
| 685,953 | A | 11/1901 | Tesla |
| 685,954 | A | 11/1901 | Tesla |
| 685,955 | A | 11/1901 | Tesla |
| 685,956 | A | 11/1901 | Tesla |
| 723,188 | A | 3/1903 | Tesla |
| 725,605 | A | 4/1903 | Tesla |
| 787,412 | A | 4/1905 | Tesla |
| 851,336 | A | 4/1907 | Von Arco |
| 1,119,732 | A | 12/1914 | Tesla |
| 1,452,849 | A | 4/1923 | Round |
| 1,652,516 | A | 12/1927 | Conrad |
| 1,691,338 | A | 11/1928 | Conrad |
| 1,947,256 | A | 2/1934 | Friis |
| 2,685,068 | A | 7/1954 | Goubau |
| 2,921,277 | A | 1/1960 | Goubau |
| 3,123,767 | A | 3/1964 | Ghose |
| 3,219,954 | A | 11/1965 | Rutelli |
| 3,445,844 | A | 5/1969 | Grossi et al. |
| 3,582,838 | A | 6/1971 | DeVries |
| 3,670,247 | A | 6/1972 | Gutton et al. |
| 3,742,509 | A | 6/1973 | De Bettencourt et al. |
| 3,742,511 | A | 6/1973 | Smith et al. |
| 4,751,515 | A | 6/1988 | Corum |
| 4,808,950 | A | 2/1989 | Apostolos et al. |
| 5,045,825 | A | 9/1991 | McJunkin |
| 5,074,489 | A | 12/1991 | Gamzon |
| 5,155,495 | A | 10/1992 | Hately et al. |
| 5,293,308 | A | 3/1994 | Boys et al. |
| 5,301,096 | A | 3/1994 | Klontz et al. |
| 5,714,917 | A | 2/1998 | Ella |
| 5,835,067 | A | 11/1998 | Goodman |
| 5,920,261 | A | 7/1999 | Hughes |
| 6,025,813 | A | 2/2000 | Hately et al. |
| 6,075,498 | A | 6/2000 | Talwar |
| 6,104,107 | A | 8/2000 | Avramenko et al. |
| 6,107,791 | A | 8/2000 | Lee |
| 6,486,846 | B1 | 11/2002 | Hart |
| 6,515,878 | B1 | 2/2003 | Meins et al. |
| 6,650,556 | B2 | 11/2003 | Dinh |
| 6,864,849 | B2 | 3/2005 | Hart |
| 6,956,535 | B2 | 10/2005 | Hart |
| 7,113,138 | B2 | 9/2006 | Hately |
| 7,307,589 | B1 | 12/2007 | Gregoire |
| 7,561,096 | B2 | 7/2009 | Hellsten |
| 7,741,734 | B2 | 6/2010 | Joannopoulos et al. |
| 7,775,112 | B2 | 8/2010 | Amemiya |
| 7,782,264 | B1 | 8/2010 | Vincent |
| 7,825,543 | B2 | 11/2010 | Karalis et al. |
| 7,890,053 | B2 | 2/2011 | Washiro |
| 7,894,770 | B2 | 2/2011 | Washiro |
| 8,063,717 | B2 | 11/2011 | Bradley et al. |
| 8,076,801 | B2 | 12/2011 | Karalis et al. |
| 8,084,889 | B2 | 12/2011 | Joannopoulos et al. |
| 8,097,983 | B2 | 1/2012 | Karalis et al. |
| 8,299,936 | B2 | 10/2012 | Papadopoulos |
| 8,338,991 | B2 | 12/2012 | Von Novak et al. |
| 8,350,769 | B1 | 1/2013 | Crawley |
| 8,378,524 | B2 | 2/2013 | Mita |
| 8,384,247 | B2 | 2/2013 | Yerazunis et al. |
| 8,395,282 | B2 | 3/2013 | Joannopoulos et al. |
| 8,536,738 | B2 | 9/2013 | Bella |
| 8,587,490 | B2 | 11/2013 | Niver et al. |
| 8,890,472 | B2 | 11/2014 | Mashinsky |
| 8,897,697 | B1 | 11/2014 | Bennett et al. |
| 8,941,448 | B2 | 1/2015 | Yu et al. |
| 9,030,363 | B2 | 5/2015 | Kenington et al. |
| 9,042,812 | B1 | 5/2015 | Bennett et al. |
| 9,154,966 | B2 | 10/2015 | Bennett et al. |
| 9,156,364 | B2 | 10/2015 | Miller et al. |
| 9,178,504 | B2 | 11/2015 | Komori |
| 9,893,403 | B2 | 2/2018 | Corum et al. |
| 9,923,385 | B2 | 3/2018 | Corum et al. |
| 9,941,566 | B2 | 4/2018 | Corum et al. |
| 2004/0227667 | A1 | 11/2004 | Sievenpiper |
| 2004/0263409 | A1* | 12/2004 | Hart ............... H01Q 9/16 343/793 |
| 2005/0111533 | A1 | 5/2005 | Berkman |
| 2005/0128154 | A1 | 6/2005 | Hately |
| 2006/0281423 | A1 | 12/2006 | Caimi |
| 2007/0035356 | A1 | 2/2007 | Ranta |
| 2007/0132489 | A1 | 6/2007 | Corum |
| 2008/0122449 | A1 | 5/2008 | Besser et al. |
| 2008/0273201 | A1 | 11/2008 | Brooks et al. |
| 2010/0194206 | A1 | 8/2010 | Burdo |
| 2010/0259111 | A1 | 10/2010 | Ruocco et al. |
| 2010/0260076 | A1 | 10/2010 | Corman |
| 2010/0264748 | A1 | 10/2010 | Tucker |
| 2011/0049997 | A1 | 3/2011 | Urano |
| 2011/0062916 | A1 | 3/2011 | Farahani |
| 2011/0080050 | A1 | 4/2011 | Thundat et al. |
| 2011/0133564 | A1 | 6/2011 | Ted |
| 2011/0133565 | A1 | 6/2011 | Teo et al. |
| 2011/0156494 | A1 | 6/2011 | Mashinsky |
| 2011/0169336 | A1 | 7/2011 | Yerazunis |
| 2012/0119575 | A1 | 5/2012 | Kurs |
| 2012/0169568 | A1 | 7/2012 | Oh et al. |
| 2012/0248889 | A1 | 10/2012 | Fukushi |
| 2012/0249449 | A1 | 10/2012 | Tseng |
| 2013/0029595 | A1 | 1/2013 | Widmer et al. |
| 2013/0049674 | A1 | 2/2013 | Davis |
| 2013/0064311 | A1* | 3/2013 | Turner ............... H01P 3/00 375/259 |
| 2013/0099584 | A1 | 4/2013 | Von Novak |
| 2014/0015344 | A1 | 1/2014 | Mohamadi |
| 2014/0062813 | A1 | 3/2014 | Alrabadi |
| 2014/0104132 | A1 | 4/2014 | Bakalski et al. |
| 2014/0252865 | A1 | 9/2014 | Corum et al. |
| 2014/0252886 | A1 | 9/2014 | Corum et al. |
| 2014/0308901 | A1 | 10/2014 | Turner et al. |
| 2014/0319922 | A1 | 10/2014 | Shinohara |
| 2015/0042172 | A1 | 2/2015 | Howard |
| 2015/0109181 | A1 | 4/2015 | Hyde |
| 2015/0145339 | A1 | 5/2015 | Chiyo et al. |
| 2015/0207334 | A1 | 7/2015 | Mitcheson et al. |
| 2015/0207335 | A1 | 7/2015 | Madawala |
| 2015/0280444 | A1 | 10/2015 | Smith et al. |
| 2016/0079754 | A1 | 3/2016 | Corum et al. |
| 2016/0079769 | A1 | 3/2016 | Corum et al. |
| 2016/0359336 | A1 | 12/2016 | Corum et al. |
| 2017/0005529 | A1 | 1/2017 | Burling |
| 2017/0018852 | A1 | 1/2017 | Adriazola et al. |
| 2018/0166884 | A1 | 6/2018 | Corum et al. |
| 2018/0180729 | A1 | 6/2018 | Corum et al. |
| 2018/0183128 | A1 | 6/2018 | Corum et al. |
| 2018/0198183 | A1 | 7/2018 | Corum et al. |
| 2018/0262053 | A1 | 9/2018 | Corum et al. |

FOREIGN PATENT DOCUMENTS

| | | |
|---|---|---|
| EP | 1898532 | 3/2008 |
| EP | 1965223 | 9/2008 |
| EP | 2221743 | 8/2010 |
| EP | 2568528 | 3/2013 |
| GB | 20981 | 11/1896 |
| GB | 24421 | 3/1898 |

(56) References Cited

FOREIGN PATENT DOCUMENTS

| | | |
|---|---|---|
| GB | 11293 | 11/1901 |
| GB | 13563 | 11/1901 |
| GB | 14579 | 4/1902 |
| GB | 8200 | 4/1906 |
| GB | 142352 | 8/1912 |
| GB | 1471860 | 4/1977 |
| GB | 2215524 | 9/1989 |
| GB | 2330695 B | 6/2002 |
| GB | 2387969 B | 11/2005 |
| JP | 50-103642 A | 8/1975 |
| JP | 58-066428 A | 4/1983 |
| JP | H06225481 | 8/1994 |
| JP | 2007244015 | 9/2007 |
| RU | 2143775 | 12/1999 |
| RU | 2161850 | 1/2001 |
| RU | 2183376 | 6/2002 |
| RU | 2255406 | 6/2005 |
| RU | 2273939 | 4/2006 |
| RU | 2310964 | 11/2007 |
| RU | 2340064 | 11/2008 |
| RU | 2341860 | 12/2008 |
| RU | 2342761 | 12/2008 |
| RU | 2366057 | 8/2009 |
| RU | 2366058 | 8/2009 |
| RU | 2409883 | 1/2011 |
| RU | 2423772 | 7/2011 |
| RU | 2459340 | 8/2012 |
| RU | 2473160 | 1/2013 |
| RU | 2474031 | 1/2013 |
| RU | 2488207 | 7/2013 |
| RU | 2488208 | 7/2013 |
| RU | 2533060 | 11/2014 |
| RU | 2544380 | 3/2015 |
| RU | 2548571 | 4/2015 |
| RU | 2554723 | 6/2015 |
| WO | 9313495 | 7/1993 |
| WO | WO9323907 | 11/1993 |
| WO | 9529516 A1 | 11/1995 |
| WO | 0191238 A1 | 11/2001 |
| WO | 2007146164 | 12/2007 |
| WO | 2010020813 | 2/2010 |
| WO | 2010111541 | 9/2010 |
| WO | 2010129369 | 11/2010 |
| WO | 2011097046 | 8/2011 |
| WO | 2013093922 | 6/2013 |
| WO | 2017156285 A1 | 9/2017 |

OTHER PUBLICATIONS

Patent Application PCT/US2016/047344 filed on Aug. 17, 2016, International Search Report dated Feb. 8, 2017.
Patent Application PCT/US2016/047676 filed on Aug. 19, 2016, International Search Report dated Jan. 31, 2017.
Patent Application PCT/US2016/047672 filed on Aug. 19, 2016, International Search Report dated Nov. 3, 2016.
Patent Application PCT/US2016/046488 filed on Aug. 11, 2016, International Search Report dated Dec. 19, 2016.
Patent Application PCT/US2016/047674 filed on Aug. 19, 2016, International Search Report dated Dec. 20, 2016.
Patent Application PCT/US2016/047167 filed on Aug. 16, 2016, International Search Report dated Oct. 27, 2016.
Patent Application PCT/US2016/047375 filed on Aug. 17, 2016, International Search Report dated Dec. 2, 2016.
Patent Application PCT/US2016/047599 filed on Aug. 18, 2016, International Search Report dated Nov. 23, 2016.
Patent Application PCT/US2016/047673 filed on Aug. 19, 2016, International Search Report dated Nov. 29, 2016.
Patent Application PCT/US2016/047446 filed on Aug. 18, 2016, International Search Report dated Nov. 3, 2016.
Patent Application PCT/US2016/047353 filed on Aug. 17, 2016, International Search Report dated Nov. 16, 2016.
Patent Application PCT/US2016/047170 filed on Aug. 16, 2016, International Search Report dated Nov. 11, 2016.
Patent Application PCT/US2016/047611 filed on Aug. 18, 2016, International Search Report dated Nov. 11, 2016.
Patent Application PCT/US2016/047455 filed on Aug. 18, 2016, International Search Report and Written Opinion dated Nov. 7, 2016.
Patent Application PCT/US2016/047452 filed on Aug. 18, 2016, International Search Report and Written Opinion dated Nov. 17, 2016.
Leonhard, W., Electrical Engineering Between Energy and Information, Power Electronics and Motion Control Conference, 2000. Proceedings. PI EMC 2000. The Third International Aug. 15-18, 2000, IEEE, vol. 1, Aug. 15, 2000, pp. 197-202, Piscataway, NJ, USA.
Patent Application PCT/US2016/047451 filed on Aug. 18, 2016, International Search Report and Written Opinion dated Nov. 17, 2016.
Patent Application PCT/US16/47986 filed on Aug. 22, 2016, International Search Report and Written Opinion dated Nov. 17, 2016.
Patent Application PCT/US2016/047954 filed on Aug. 22, 2016, International Search Report and Written Opinion dated Nov. 24, 2016.
Zoran, B. et al, Some Notes on Transmission Line Representations of Tesla's Transmitters, 16th International Conference on Software, Telecommunications and Computer Networks, SOFTCOM 2008, IEEE. Sep. 25, 2008, pp. 60-69, Piscataway. NJ, USA.
Patent Application PCT/US2016/047957 filed on Aug. 22, 2016, International Search Report and Written Opinion dated Nov. 17, 2016.
Patent Application PCT/US2016/048314 filed on Aug. 24, 2016, International Search Report and Written Opinion dated Nov. 17, 2016.
Patent Application PCT/US2016/047675 filed on Aug. 19, 2016, International Search Report and Written Opinion dated Nov. 25, 2016.
Patent Application PCT/US2016/047955 filed on Aug. 22, 2016, International Search Report and Written Opinion dated Nov. 17, 2016.
Patent Application PCT/US2016/047457 filed on Aug. 18, 2016, International Search and Written Opinion dated Nov. 18, 2016.
Patent Application PCT/US2016/047368 filed on Aug. 17, 2016, International Search Report and Written Opinion dated Nov. 4, 2016.
Patent Application PCT/US2016/047338 filed on Aug. 17, 2016, International Search Report and Written Opinion dated Nov. 17, 2016.
Patent Application PCT/US2016/047598 filed on Aug. 18, 2016, International Search Report and Written Opinion dated Nov. 3, 2016.
Patent Application PCT/US2015/049236 filed on Sep. 9, 2015, International Search Report and Written Opinion dated Jan. 4, 2016.
Patent Application PCT/US2015/049511 filed on Sep. 10, 2015, International Search Report and Written Opinion dated Jan. 5, 2016.
Patent Application PCT/US2015/049523 filed on Sep. 10, 2015, International Search Report and Written Opinion dated Jan. 7, 2016.
Patent Application PCT/US2015/049497 filed on Sep. 10, 2015, International Search Report and Written Opinion dated Dec. 23, 2015.
Patent Application PCT/US2015/049520 filed on Sep. 10, 2015, International Search Report and Written Opinion dated Jan. 15, 2016.
Rich, G. J., The Launching of a Plane Surface Wave, Proceedings of the IEEE—Part B: Radio and Electronic Engineering, Mar. 1, 1955, pp. 237-246, vol. 102, No. 2, US.
Ranfagni, A. et al, Observation of Zenneck-type Waves in Microwave Propagation Experiments, Journal of Applied Physics, Jul. 2006, pp. 024910-1-024910-5, vol. 100, No. 2, US.
Mahmoud, S. F. et al, Reflection of Surface Waves on a Dielectric Image Line with Application to 'Guided RADAR', Microwave Symposium, 1972 IEEE GMTT International, May 22, 1972, pp. 139-141, Piscataway, NJ, US.
Examination Report issued in New Zealand Application No. 720048 dated May 12, 2017.

(56) References Cited

OTHER PUBLICATIONS

Examination Report issued in New Zealand Application No. 720048 dated Jan. 25, 2017.
Patent Application PCT/US2016/047350 filed on Aug. 17, 2016, International Search Report dated Mar. 9, 2017.
Patent Application PCT/US2015/049171 filed on Sep. 9, 2015, International Search Report and Written Opinion dated Dec. 16, 2015.
International Search Report and Written Opinion for PCT/US2016/047677 dated Oct. 18, 2016.
International Search Report and Written Opinion for PCT/US2016/047956 dated Oct. 21, 2016.
U.S. Appl. No. 13/789,525, filed Mar. 7, 2013, Restriction Requirement dated Oct. 7, 2015.
U.S. Appl. No. 13/789,525, filed Mar. 7, 2013, Response to Restriction Requirement dated Oct. 7, 2015.
U.S. Appl. No. 13/789,525, filed Mar. 7, 2013, Non-Final Office Action dated Feb. 11, 2016.
U.S. Appl. No. 13/789,525, filed Mar. 7, 2013, Response to Non-Final Office Action dated Feb. 11, 2016.
U.S. Appl. No. 13/789,525, filed Mar. 7, 2013, Non-Final Office Action dated Sep. 16, 2016.
International Search Report and Written Opinion for PCT/US2015/053242 dated Jan. 25, 2016.
Examination Report issued in New Zealand Application No. 712566 dated Nov. 30, 2015.
Office Action Issued in Chilean Application No. 2506-2015 dated Sep. 29, 2016. (Partial English Translation included).
"Wireless Transmission Theory, the Tesla Effect," Tesla Radio, Dec. 23, 2011, pp. 1-6.
Peterson, Gary, "Comparing the Hertz-Wave and Tesla Wireless Systems," Feedline, Oct. 27, 2012, pp. 1-7, 9, 21st Century Books, Breckenridge, CO.
International Search Report and Written Opinion for PCT/US2015/035598 dated Sep. 11, 2015.
Examination Report issued in Australian Application No. 2014226221 dated Sep. 22, 2016.
U.S. Appl. No. 13/789,538, filed Mar. 7, 2013, Restriction Requirement dated Oct. 7, 2015.
U.S. Appl. No. 13/789,538, filed Mar. 7, 2013, Response to Restriction Requirement dated Oct. 7, 2015.
U.S. Appl. No. 13/789,538, filed Mar. 7, 2013, Non-Final Office Action dated Feb. 8, 2016.
U.S. Appl. No. 13/789,538, filed Mar. 7, 2013, Response to Non-Final Office Action dated Feb. 8, 2016.
U.S. Appl. No. 13/789,538, filed Mar. 7, 2013, Notice of Allowance dated Oct. 7, 2016.
Hill, et. al. "On the excitation of the Zenneck surface wave over the ground at 10Hz," May 1980, Ann ales des Telecommunications, vol. 35, Issue 5, pp. 179-182.
U.S. Appl. No. 13/789,525, filed Mar. 7, 2013, Response to Final Office Action dated Sep. 16, 2016.
Peterson, Gary, "Rediscovering the zenneck surface wave," Feb. 8, 2008, Feedline No. 4, 1-5.
U.S. Appl. No. 14/728,492, filed Jun. 2, 2015, Non-Final Office Action dated Dec. 16, 2016.
U.S. Appl. No. 14/728,507, filed Jun. 2, 2015, Non-Final Office Action dated Jan. 3, 2017.
Eurasian Office Action in Application No. 201790578, dated Nov. 16, 2018.
Mexican Office Action in Application No. MX/a/2017/003042, dated Nov. 26, 2018.
Australian Office Action in Application No. 2015314927, dated Nov. 23, 2018.
Peterson, G., The Application of Electromagnetic Surface Waves to Wireless Energy Transfer, 2015 IEEE Wireless Sower Transfer Conference (WPTC), May 1, 2015, pp. 1-4, Shoreham, Long Island, New York, USA.
Kukushkin, A. V., On the Existence and Physical Meaning of the Zenneck Wave, UFN, 2009, vol. 179, No. 7, 801-803.
Kistovich, Yu. V., On the Possibility of Observing Surface Zenneck Waves in the Radiation of a Source with a Small Vertical Aperture, Journal of Technical Physics, 1989, vol. 59(4), 16-21.
Datsko, V.N. and A.A. Kopylov, On Surface Electromagnetic Waves, UFN, 2008, vol. 178, No. 1, 109-110.
Baybakov et al., Experimental Discovery of Zenneck's Surface Electromagnetic Waves, UFN, 1989, vol. 157, 722-724.
Hesse et al., A Single Probe Spatial Averaging Technique for Guided Waves and Its Application to Surface Wave Rail Inspection, IEEE Transactions on Ultrasonics, Ferroelectrics, and Frequency Control, vol. 54, No. 11, Nov. 2007, 2344-2356.
Andriyas, T., Surface Wave Propagation in a Dielectric Waveguide Loaded with an Anistropic, Conductive, and Spatially Dispersive Substrate, Utah State University, May 2009, p. 12.
U.S. Appl. No. 14/483,089 filed Sep. 10, 2014, Non-Final Office Action dated Apr. 6, 2017.
U.S. Appl. No. 14/728,507, filed Jun. 2, 2015, Final Office Action dated Jul. 28, 2017.
Beaty, W., Tesla's Big Mistake?, Sep. 1999, http://amasci.com/tesla/tmistk.html.
Anonymous, Tesla Wireless Technology, Mar. 8, 2007, http://montalk.net/notes/tesla-wireless-technology.
Examination Report issued in Australian Application No. 2014226221 dated Sep. 20, 2017.
U.S. Appl. No. 14/848,653, filed Sep. 9, 2015, Final Office Action dated Sep. 25, 2017.
Ling et al., The Propagation and Excitation of Surface Waves in an Absorbing Layer, Progress in Electromagnetics Research, 1998, pp. 49-91, vol. 19.
Wise, W. Howard , Note on the Accuracy of Rolf's Graphs of Sommerfeld's Attenuation Formula, Proceedings of the Institute of Radio Engineers, Nov. 1930, pp. 1971-1972, vol. 18, No. 11.
Barlow et al., Surface Waves, The Proceedings of the Institution of Electrical Engineers, Nov. 1953, pp. 329-347, vol. 100, part iii.
Barlow et al., An Investigation of the Characteristics of Cylindrical Surface Waves, The Proceedings of the Institution of Electrical Engineers, Nov. 1953, pp. 321-328, vol. 100, Part III, No. 68.
Brown et al., The Launching of Radial Cylindrical Surface Waves by a Circumferential Slot, The Proceedings of the Institution of Electrical Engineers, Mar. 1959, pp. 123-128, vol. 106, Part B.
Burrows, Charles R., Radio Propagation Over Plane Earth-Field Strength Curves, Bell System Technical Journal, Jan. 1937, pp. 45-75, vol. 16, No. 1.
Burrows, Charles R., Addendum to: Radio Propagation Over Plane Earth-Field Strength Curves, Bell System Technical Journal, Oct. 1937, pp. 574-577, vol. 16, No. 4.
Burrows, Charles R., Existence of a Surface Wave in Radio Propagation, Nature, Aug. 15, 1936, p. 284, vol. 138, Nature Publishing Group.
Burrows, Charles R., The Surface Wave in Radio Propagation Over Plane Earth, Proceedings of the Institute of Radio Engineers, Feb. 1937, pp. 219-229, vol. 25, No. 2.
Collin, R.E., Hertzian Dipole Radiating Over a Lossy Earth or Sea: Some Early and Late 20th-Century Controversies, IEEE Antennas and Propagation Magazine, Apr. 2004, pp. 64-79, vol. 46, No. 2.
Jones, E.M.T., An Annular Corrugated-Surface Antenna, Proceedings of the I.R.E., Jun. 1952, pp. 721-725, vol. 40.
Fernando et al., An Investigation of the Properties of Radial Cylindrical Surface Waves Launched Over Flat Reactive Surfaces, The Proceedings of the Institution of Electrical Engineers, May 1956, pp. 307-318, vol. 103, Part B.
Belrose, John S., A Radioscientist's Reaction to Marconi's First Transatlantic Wireless Experiment—Revisited, Conference Digest, Jul. 2001, pp. 22-25, vol. 1, IEEE Antennas & Propagation Society International Symposium, Boston, MA, US.
Marconi, Guglielmo, Wireless Telegraphic Communication, Nobel Lecture, Dec. 11, 1909, pp. 196-222.
Norton, K.A., Propagation of Radio Waves Over a Plane Earth, Nature, Jun. 8, 1935, pp. 954-955, Nature Publishing Group.
Kukushkin, A.V., On the Existence and Physical Meaning of the Zenneck Wave, Physics—Uspekhi, 2009, pp. 755-756, vol. 52, No. 7, Uspekhi Fizicheskikh Nauk, Russian Academy of Sciences.

(56) References Cited

OTHER PUBLICATIONS

Michaels, Charles J., A Load-Tracking L Network, QST, Apr. 1992, p. 74, American Radio Relay League, Inc.
Feldman, C.B., The Optical Behavior of the Ground for Short Radio Waves, Proceedings of the IRE, Jun. 1933, pp. 764-801, vol. 21, No. 6.
Rolf, Bruno, Graphs to Prof. Sommerfeld's Attenuation Formula for Radio Waves, Proceedings of the Institute of Radio Engineers, Mar. 1930, pp. 391-402, vol. 18, No. 3.
Wait, James R., The Ancient and Modem History of EM Ground-Wave Propagation, IEEE Antennas and Propagation Magazine, Oct. 1998, pp. 7-24, vol. 40, No. 5.
Zucker, Francis J., Surface-Wave Antennas, Antenna Engineering Handbook, 2007, pp. 10.1-10.32, Chp. 10, McGraw-Hill.
Smith, Carl E., Short Low Loss AM Antenna, IEEE Transactions on Broadcasting, Jun. 1989, pp. 237-240, vol. 35, No. 2, IEEE.
Belrose, John S., An Electrically Small Umbrella Antenna for 160 Meters, ARRL Antenna Compendium, 2002, pp. 3-8, vol. 7.
Belrose, John S., Characteristics of the Crossed Field Antenna Obtained by Numerical and Experimental Modelling, IEEE Antennas and Propagation Society International Symposium, 2005, pp. 21-24, vol. 1B.
Belrose, John S., Radiation Characteristics of an Electrically Small MF Broadcast Antenna—by Simulation, 11th International Conference on Antennas and Propagation, Apr. 17-20, 2001, pp. 90-94, IEEE Conference Publication No. 480.
Cobos et al., A Modified Goubau-Type Antenna with Two Octaves of Impedance Bandwidth, Antennas and Propagation Society International Symposium, Jun. 2004, pp. 3051-3054, vol. 3, IEEE.
Goubau, Georg, Surface Waves and Their Application to Transmission Lines, Journal of Applied Physics, Nov. 1950, pp. 1119-1128, vol. 21.
Ravipati et al., The Goubau Multi Element Monopole Antenna—Revisited, Antennas and Propagation Society International Symposium, Jun. 2007, pp. 233-236, IEEE.
Pinzone et al., A New Low Profile Anti-Skywave Antenna for AM Broadcasting, NAB Engineering Conference Proceedings, 1988, 7-15.
Underhill, Mike, All sorts of small antennas—they are better than you think—heuristics shows why!, Lecture Presentation to the Adelaide Hills Amateur Radio Society, Feb. 2008, pp. 1-144.
Belrose, John S., The Crossed Field Antenna—Analyzed by Simulation and Experiment, ICAP-JINA Millennium Conference on Antennas and Propagation, Apr. 9-12, 2000, pp. 1-4, Davos, Switzerland.
Belrose, John S., The Truth and Untruth About Electrically Small Antennas, Amateur Radio Technical Session, QCWA 2004 International Convention, Oct. 15, 2004, pp. 1-8, Ottawa, ON, Canada.
Hately et al., An Operational MF Broadcast Antenna Using Poynting Vector Synthesis, IEEE ICAP Seventh International Conference 1991, Apr. 1991, pp. 645-648, Conference Publication 333, Part 2.
Kabbary et al., Phasing and Matching Units for the CFA, URSI Seventeenth National Radio Science Conference, Feb. 22-24, 2000, pp. B22.1-622.8, Minufiya University, Egypt.
Underhill, M.J., The Estimation and Measurement of the Efficiency and Effectiveness of Small Antennas in an Environment, HF Radio 2003—Ninth International IEE Conference on HF Radio Systems and Techniques, Jun. 23-26, 2003, pp. 1-6, University of Bath, UK.
Trainotti et al., On the Crossed Field Antenna Performance, IEEE Transactions on Broadcasting, Sep. 2006, pp. 299-317, vol. 52, No. 3.
Trainotti, Valentin, Short Medium Frequency AM Antennas, IEEE Transactions on Broadcasting, Sep. 2001, pp. 263-284, vol. 47, No. 3.
Underhill, Mike, Tuneable Coupled (Multi-) Mode Small Antennas—CFA, CFL, EH etc?, Lecture Presentation at the Radio Society of Great Britain Convention, Oct. 2010, pp. 1-167.
Letter to James Corum from John Musselman regarding the Antenna Installation at Kodiak, Alaska, Jun. 2011.

Smith, Carl E., Antenna Coupling Unit Network Fig. 2.4, Installed at Radio Station Kvok, exact date unknown, Installed some time around or before 1980, Kodiak, Alaska.
Rice, S.O., Series for the Wave Functions of a Radiating Dipole at the Earth's Surface, BSTJ, Jan. 1937, pp. 101-109, vol. 16, No. 1.
McDonald, Kirk T., "Crossed-Field" and "EH" Antennas Including Radiation from the Feed Lines and Reflection from the Earth's Surface, Published at http://www.physics.princeton.edu/~mcdonald/examples/crossedfield.pdf, Jul. 2006; updated Mar. 2010, pp. 1-11.
McDonald, Kirk T., "Crossed-Field" and "EH" Antennas Including Radiation from the Feed Lines and Reflection from the Earth's Surface, Published at http://www.physics.princeton.edu/~mcdonald/examples/crossedfield.pdf, Jul. 2006; updated Jun. 2008, pp. 1-18.
Belrose, John S., On the EH Antenna, antenneX Online, Apr. 2003, pp. 1-4, Issue No. 72.
Stewart, Brian G., Planning Application submitted by Isle of Man International Broadcasting plc to construct a Crossed Field Antenna at Cranstal, near Bride, Isle of Man, Department of Engineering Glasgow Caledonian University, Aug. 2000, pp. 1-19.
Hendry et al., Surface Waves for Communication Systems, 3rd SEAS DTC Technical Conference, 2008, A18, Edinburgh, Scotland.
Watson, W.H., The Physical Principles of Wave Guide Transmission and Antenna Systems, 1947, p. 25, Oxford at the Clarendon Press.
Pover et al., The Silsden Crossed Field Antenna, Extracts from the report on the performance of an elevated 8 Metre CFA constructed and tested at Silsden in West Yorkshire on Sep. 23-26, 2009.
Holland, Ralph, Egyptian Daytime Wave Pockets—Speculative Causes, antenneX Online, Apr. 2002, pp. 1-38, Issue No. 60.
Corum et al., Multiple Resonances in RF Coils and the Failure of Lumped Inductance Models, Sixth International Symposium Nikola Tesla, Oct. 18-20, 2006, Belgrade, SASA, Serbia.
Wu, Ke et al., Wireless Power Transmission, Technology, and Applications, Proceedings of the IEEE, Jun. 2013, pp. 1271-1275, vol. 101, No. 6.
Massa, Andrea et al., Array Designs for Long-Distance Wireless Power Transmission: State-of-the-Art and Innovative Solutions, Proceedings of the IEEE, Jun. 2013, pp. 1464-1481, vol. 101, No. 6.
Norton, K. A., The Propagation of Radio Waves Over the Surface of the Earth and in the Upper Atmosphere: Part I Ground-Wave Propagation from Short Antennas, Proc. IRE, Oct. 1936, pp. 1367-1387, vol. 24, No. 10.
Shinohara, Naoki, Beam Control Technologies with a High-Efficiency Phased Array for Microwave Power Transmission in Japan, Proceedings of the IEEE, Jun. 2013, pp. 1448-1463, vol. 101, No. 6.
Miyakoshi, Junji, Cellular and Molecular Responses to Radio-Frequency Electromagnetic Fields, Proceedings of be IEEE, Jun. 2013, pp. 1494-1502, vol. 101, No. 6.
Kim, Jiseong et al., Coil Design and Shielding Methods for a Magnetic Resonant Wireless Power Transfer System, Proceedings of the IEEE, Jun. 2013, pp. 1332-1342, vol. 101, No. 6.
Shoki, Hiroki, Issues and Initiatives for Practical Deployment of Wireless Power Transfer Technologies in Japan, Proceedings of the IEEE, Jun. 2013, pp. 1312-1320, vol. 101, No. 6.
Covic, Grant A. et al., Inductive Power Transfer, Proceedings of the IEEE, Jun. 2013, pp. 1276-1289, vol. 101, No. 6.
Strassner, Bernd et al., Microwave Power Transmission: Historical Milestones and System Components, Proceedings of the IEEE, Jun. 2013, pp. 1379-1396, vol. 101, No. 6.
Christ, Andreas et al., Assessing Human Exposure to Electromagnetic Fields from Wireless Power Transmission Systems, Proceedings of the IEEE, Jun. 2013, pp. 1482-1493, vol. 101, No. 6.
Jaffe, Paul et al., Energy Conversion and Transmission Modules for Space Solar Power, Proceedings of the IEEE, Jun. 2013, pp. 1424-1437, vol. 101, No. 6.
Tesla, Nikola, The Transmission of Electrical Energy Without Wires, Electrical World & Engineer, Mar. 5, 1904, pp. 429-431.
Hui, S. Y., Planar Wireless Charging Technology for Portable Electronic Products and Qi, Proceedings of the IEEE, Jun. 2013, pp. 1290-1301, vol. 101, No. 6.

(56) References Cited

OTHER PUBLICATIONS

Sasaki, Susumu et al., Microwave Power Transmission Technologies for Solar Power Satellites, Proceedings of the IEEE, Jun. 2013, pp. 1438-1447, vol. 101, No. 6.
Wang, Bingnan et al., Wireless Power Transfer: Metamaterials and Array of Coupled Resonators, Proceedings of be IEEE, Jun. 2013, pp. 1359-1368, vol. 101, No. 6.
Sample, Alanson P. et al., Enabling Seamless Wireless Power Delivery in Dynamic Environments, Proceedings of be IEEE, Jun. 2013, pp. 1343-1358, vol. 101, No. 6.
Visser, Hubregt J. et al., RF Energy Harvesting and Transport for Wireless Sensor Network Applications: Principles and Requirements, Proceedings of the IEEE, Jun. 2013, pp. 1410-1423, vol. 101, No. 6.
Popovic, Zoya et al., Low-Power Far-Field Wireless Powering for Wireless Sensors, Proceedings of the IEEE, Jun. 2013, pp. 1397-1409, vol. 101, No. 6.
Mayordomo, Iker et al., An Overview of Technical Challenges and Advances of Inductive Wireless Power Transmission, Proceedings of the IEEE, Jun. 2013, pp. 1302-1311, vol. 101, No. 6.
Garnica, Jaime et al., Wireless Power Transmission: From Far Field to Near Field, Proceedings of the IEEE, Jun. 2013, pp. 1321-1331, vol. 101, No. 6.
Ho, John S. et al., Midfield Wireless Powering for Implantable Systems, Proceedings of the IEEE, Jun. 2013, pp. 1369-1378, vol. 101, No. 6.
O'Neill, John J., Prodigal Genius: The Life of Nikola Tesla, 2008, pp. 121-217, Adventures Unlimited Press, Kempton, Illinois.
Cheney, Margaret, Tesla: Man Out of Time, 1981, pp. 171-191, Touchstone, New York, NY.
Burrows, C. R., The Surface Wave in Radio Transmission, Bell Laboratories Record, Jun. 1937, pp. 321-324, vol. 15.
Valone, Thomas, Harnessing the Wheelwork of Nature, Tesla's Science of Energy, 2002, pp. 147-269, Adventures Unlimited Press, Kempton, Illinois.
Tesla, Nikola, My Inventions, The Autobiography of Nikola Tesla, 2013, pp. 61-72, Lexington, KY.
Tesla, Nikola, From Colorado Springs to Long Island, Research Notes: Colorado Springs 1899-1900 New York 1900-1901, 2008, Nikola Tesla Museum.
McMichael, I., A Note on the Brewster Angle in Lossy Dielectric Media, Night Vision and Electronic Sensors Directorate, Oct. 2010, pp. 1-11, US Army RDECOM CERDEC NVESD, Fort Belvior, Virginia.
Karalis, A., et al., Efficient Wireless Non-radiative Mid-range Energy Transfer, Annals of Physics, 2008, pp. 34-48, No. 323, Elsevier, Inc.
Wadsworth, D., Approximate Integration Methods Applied to Wave Propagation (Thesis), Department of Geology and Geophysics, Massachusetts Institute of Technology, Thesis Submitted in Feb. 1958, pp. 1-128, Massachusetts Institute of Technology, Cambridge, Massachusetts, United States.
Pover, B., Report on the Performance of the Silsden 8 Metre Crossed Field Antenna, Published on the Internet at pk1mjo.com/all/ostatni/t-dab_dvb-t .../CFA_antena_silsden-report.pdf, Oct. 2009, pp. 1-28.
Corum, J. et al., The Application of Transmission Line Resonators to High Voltage RF Power Processing: History, Analysis and Experiment, IEEE 19th Southeastern Symposium on System Theory, Mar. 1987, pp. 45-50, Held at Clemson University, Clemson, South Carolina, United States.
Search Report and Written Opinion, PCT/US2014/019477, International Publication No. WO 2014/137817, entitled Excitation and Use of Guided Surface Waves on Lossy Media, International Publication dated Sep. 12, 2014, International Filing Date: Feb. 28, 2014.
Wait, J. R., Excitation of Surface Waves on Conducting, Stratified, Dielectric-clad and Corrugated Surfaces, Research of the National Bureau of Standards, Dec. 1957, pp. 365-377, vol. 59, No. 6.

Marincic, A. S., Nikola Tesla and the Wireless Transmission of Energy, IEEE Transactions on Power Apparatus and Systems, Oct. 1982, pp. 58-59, vol. PAS-101, No. 10, IEEE, University of Belgrade, Belgrade, Yugoslavia.
Valentinuzzi, M.E., Nikola Tesla: Why Was He So Much Resisted and Forgotten?, IEEE Engineering in Medicine and Biology Magazine, Jul./Aug. 1998, pp. 74-75, vol. 17, No. 4, IEEE, Inst. de Bioingenieria, Univ. Nacional de Tucuman, Mexico.
Leyh, G.E. et al., Efficient Wireless Transmission of Power Using Resonators with Coupled Electric Fields, Power Symposium, 2008. NAPS '08. 40th North American, pp. 1-4, IEEE, Nevada Lightning Lab., NV, USA.
Marincic, A. et al., Tesla's Contribution to Radiowave Propagation, Telecommunications in Modern Satellite, Cable and Broadcasting Service, Sep. 2001, pp. 327-331, vol. 1, IEEE, Belgrade, Serbia.
Garnica, J. et al., Wireless Power Transmission: From Far Field to Near Field, Proceedings of the IEEE, Apr. 4, 2013, pp. 1321-1331, vol. 101, No. 6, IEEE, Gainesville, FL, USA.
Poljak, D. et al., Full Wave Model versus Transmission Line Representation of Tesla's Wave Propagation: 155th Anniversary of Birth of Nikola Tesla, 2011 19th International Conference on Software, Telecommunications and Computer Networks (SoftCOM), Sep. 15-17, 2011, pp. 1-5, IEEE, Split, Croatia.
Li, Joshua Le-Wei et al., Keynote Speakers: Wireless Power Transfer: From Long-Distance Transmission to Short-Range Charging, 2013 IEEE International RF and Microwave Conference (REM), Dec. 9-11, 2013, IEEE, Penang, Malaysia.
Keller, J. B. et al., Surface Waves Excitation and Propagation, Journal of Applied Physics, Jun. 1960, pp. 1039-1046, vol. 31, No. 6., AIP Publishing.
Chu, L. J., Physical Limitations on Omni-Directional Antennas, Journal of Applied Physics, Dec. 1948, pp. 1163-1175, vol. 19, AIP Publishing.
Wise, W. H., Note on Dipole Radiation Theory, Journal of Applied Physics, Oct. 1933, pp. 354-358, vol. 4, AIP Publishing.
Van Der Pol, B., Theory of the Reflection of the Light from a Point Source by a Finitely Conducting Flat Mirror, with an Application to Radiotelegraphy, Physica, Aug. 1935, pp. 843-853, vol. 2.
Friedman, B., Excitation of Surface Waves, The Institution of Electrical Engineers, Jan. 1958, pp. 252-258, Monograph No. 277 R.
Kabbary, F. M., Extremely Small High Power MW Broadcasting Antennas, IEE International Broadcasting Convention, Sep. 12-16, 1997, Conference Publication No. 447, Amsterdam.
Jordan, E. C. et al., Electromagnetic Waves and Radiating Systems, Second Edition, 1968, pp. 558-560, 730-734, Prentice-Hall, Inc., Englewood Cliffs, New Jersey.
Smythe, W. R., Static and Dynamic Electricity, 1950, pp. 542-547, McGraw-Hill Book Company, Inc., New York.
Jahnke et al., Tables of Functions with Formulae and Curves, 1945, p. 145, 4th Edition, Dover Publications, New York.
Milligan, T., Modem Antenna Design, 1985, pp. 8-9, 1st Edition, McGraw-Hill, New York.
Reinartz, J. L., 1XAM's transmitter, QST, Jan. 1924, pp. 26-27.
Sommerfeld, A., Problems of Radio, Partial Differential Equations in Physics—Lectures on Theoretical Physics, 1949, pp. 246-257, vol. VI, Academic Press, New York.
Stratton, J. A, Electromagnetic Theory, 1941, p. 516, McGraw-Hill, New York.
Stutzman et al., Antenna Theory and Design, 1981, p. 82, 92-93, Wiley & Sons, New York.
Wait, J. R., Complex Image Theory—Revisited, IEEE Antennas and Propagation Magazine, Aug. 1991, pp. 27-29, vol. 33, No. 4.
Counterpoises, QST, Sep. 1920, pp. 24-25.
Ashe, G. B., A Counterpoise Investigation, QST, Dec. 1924, pp. 34-35.
Bannister, P. R., Summary of Image Theory Expressions for the Quasi-Static Fields of Antennas at or Above the Earth's Surface, Jul. 1979, pp. 1001-1008, vol. 67, No. 7, Proceedings of the IEEE.
Banos et al., Sommerfeld Surface Wave, Summary of Normal Mode Theory Symposium, IRE Transactions on Antennas and Propagation, Jan. 1956, p. 92, vol. AP-4, No. 1.

(56) References Cited

OTHER PUBLICATIONS

Barlow, H. M., Launching a Surface Wave over the Earth, Electronics Letters, Jul. 1967, pp. 304-305, vol. 3, No. 7.
Westman, H. P., Antenna-Counterpoise Fundamentals, QST, May 1926, p. 46.
Beverage, H.H., Improving the CW Ground System, OST, Nov. 1921, pp. 25-26.
Bucher, E. E., The Alexanderson System for Radio Communication, General Electric Review, Oct. 1920, pp. 313-839 (See Fig. 11, p. 820.) vol. 23, No. 10.
Paknys, R., Evaluation of Hankel Functions with Complex Argument and Complex Order, IEEE Transactions on Antennas and Propagation, May 1992, pp. 569-578, vol. 40, No. 5.
Burrows, C. R., Radio Propagation Over Spherical Earth, Proc. IRE, May 1935, pp. 470-480, vol. 23, No. 5; Reprinted in Bell System Tech. Jour., Jul. 1935, pp. 477-488, vol. 14, No. 3.
Wise, W. H., The Physical Reality of Zenneck's Surface Wave, Bell System Technical Journal, No. 1, Jan. 1937, pp. 35-44, vol. 16, No. 1.
Burrows, C. R., Addendum to the Effect of the Earth's Curvature on Ground Wave Propagation, IEEE Transactions on Antennas and Propagation, Nov. 1964, pp. 789-791, vol. 12, No. 6.
Burrows, C. R., Radio Gain, IEEE Transactions on Antennas and Propagation, May 1967, pp. 404-410, vol. AP-15, No. 3.
Chu et al., Electromagnetic Waves in Hollow Metal Tubes of Rectangular Cross Section, Proceedings of the IRE, Dec. 1938, pp. 1520-1555, vol. 26, No. 12.
Ufimtsev et al., Transformation of Surface Waves in Homogeneous Absorbing Layers, IEEE Transactions on Antennas and Propagation, Feb. 2000, pp. 214-222, vol. 48, No. 2.
Corum et al., Toroidal Helix Antenna, IEEE Antennas and Propagation Society International Symposium, Jun. 14-19, 1987, pp. 832-835, vol. 25.
Pinzone et al., A Novel Structure for Improved Directivity, 1988 Antennas and Propagation Society International Symposium Digest, Jun. 1988, pp. 824-827, vol. 2, IEEE, Syracuse, NY.
Corum et al., Experimental Validation of the Improved Directivity Element—Elevation Plane Control, 1989 Antennas and Propagation Society International Symposium Digest, Jun. 1989, pp. 702-705, vol. 2, IEEE, San Jose, CA.
Corum et al., A Concentric Array for Low and Medium Frequencies, 1990 Antennas and Propagation Society International Symposium Digest, May 1990, pp. 832-835, vol. 2, IEEE, Dallas, Texas.
Deminco, N., Propagation Prediction Techniques and Antenna Modeling (150 to 1750 kHz) for Intelligent Transportation Systems (ITS) Broadcast Applications, IEEE Antennas and Propagation Magazine, Aug. 2000, pp. 9-34, vol. 42, No. 4.
Eckert, R. P., History of Ground Wave Propagation Prediction Curves for AM Standard Broadcast, IEEE Transactions on Broadcasting, Mar. 1986, pp. 1-4, vol. BC-32, No. 1.
Epstein, P., Radio-Wave Propagation and Electromagnetic Surface Waves, Proc. National Academy of Sciences, Jun. 1947, pp. 195-199, vol. 33, No. 6.
Epstein, P., On the Possibility of Electromagnetic Surface Waves, Proc. National Academy of Sciences, Dec. 1954, pp. 1158-1165, vol. 40, No. 12.
Norton, K. A., The Physical Reality of Space and Surface Waves in the Radiation Field of Radio Antennas, Proceedings of the IRE, Sep. 1937, pp. 1192-1202, vol. 25, No. 9.
Goubau, G., Single Conductor Surface Wave Transmission Lines, Proc. IRE, Jun. 1951, pp. 619-624, vol. 39, No. 6.
Norton, K.A., The Propagation of Radio Waves over the Surface of the Earth and in the Upper Atmosphere: Part II The Propagation from Vertical, Horizontal, and Loop Antennas Over a Plane Earth of Finite Conductivity, Proceedings of the IRE, Sep. 1937, pp. 1203-1236, vol. 25, No. 9.
Hately et al., CFA: Working Assumption, Electronics World + Wireless World, Dec. 1990, pp. 1094-1099, vol. 96.
Hill et al., Excitation of the Zenneck Surface Wave by a Vertical Aperture, Radio Science, Nov.-Dec. 1978, pp. 969-977, vol. 13, No. 6.
Kabbary et al., Maxwell's Equations and the Crossed-Field Antenna, Electronics World + Wireless World, Mar. 1989, pp. 216-218, vol. 95.
Trainotti et al., Short Low and Medium Frequency Antenna Performance, IEEE Antennas and Propagation Magazine, Oct. 2005, pp. 66-90, vol. 47, No. 5.
Kabbary et al., Four Egyptian MW Broadcast Crossed-Field Antennas, Proceedings of the National Association of Broadcasters 1999 Engineering Conference, Apr. 1999, pp. 235-241, Las Vegas, Nevada.
Kahan et al., On the Existence of a Surface Wave in Dipole Radiation over a Plane Earth, Proc. IRE, Jul. 1950, pp. 807-812, vol. 38, No. 7.
Karbowiak, A. E., Theory of Composite Guides: Stratified Guides for Surface Waves, Proc. IEE (British), 1954, pp. 238-242, vol. 101, No. 72.
Tesla, N., The True Wireless, Electrical Experimenter, May 1919, pp. 1-13.
King et al., Groundwave Attenuation Function for Propagation Over a Highly Inductive Earth, Radio Science, Jul. 1967, pp. 687-693, vol. 2, No. 7.
Li, R. The Accuracy of Norton's Empirical Approximations for Ground Wave Attenuation, IEEE Trans. Antennas and Propagation, Jul. 1983, pp. 624-628, vol. AP-31, No. 4.
Lindell et al., Exact Image Theory for the Sommerfeld Half-Space Problem, Part I: Vertical Magnetic Dipole, IEEE Transactions on Antennas and Propagation, Feb. 1984, pp. 126-133, vol. AP-32, No. 2.
Lindell et al., Exact Image Theory for the Sommerfeld Half-Space Problem, Part II: Vertical Electric Dipole, IEEE Transactions on Antennas and Propagation, Aug. 1984, pp. 841-847, vol. AP-32, No. 8.
Lindell et al., Exact Image Theory for the Sommerfeld Half-Space Problem, Part III: General Formulation, IEEE Transactions on Antennas and Propagation, Oct. 1984, pp. 1027-1032, vol. AP-32, No. 10.
Lodge et al., Syntonic Wireless Telegraphy; with Specimens of Large-scale Measurements, Proceedings of the Royal Society—London, Series A, May 26, 1909, pp. 227-256, vol. 82, No. 554.
Marincic, A. S., Nikola Tesla and the Wireless Transmission of Energy, IEEE Transactions on Power Apparatus and Systems, Oct. 1982, pp. 4064-4068, vol. PAS-101, No. 10.
Mason, H. F., The Nodal Point Explained, QST, Sep. 1923, pp. 11-14.
Norton, K. A., The Calculation of Ground-Wave Field Intensity Over a Finitely Conducting Spherical Earth, Proceedings of the IRE, Dec. 1941, pp. 623-639, vol. 29, No. 12.
First Examination Report dated Apr. 6, 2018 (New Zealand; Application No. 712566).
Japanese Office Action with Partial Translation, dated Jan. 9, 2018 (Japanese Patent Application No. 2015-561472).
International Search Report and Written Opinion for PCT/US2018/020731 dated Jun. 1, 2018, 14 pages.
Mexican Office Action issued in Mexican Patent Office for Application No. MX/a/2017/003024 dated May 28, 2018.
Colombian Office Action issued in Colombian Patent and Trademark Office for Application No. NC2017/0003264 dated May 9, 2018.
Written Opinion dated Apr. 16, 2018, dated Apr. 17, 2018 (Singapore Application No. 11201701355Q).
Algerian Office Action dated Mar. 15, 2018 (Algerian Patent Application No. 170124).
Response to Algerian Office Action filed Jun. 11, 2018 (Algerian Patent Application No. 170124).
Australian Examination Report issued for Application No. 2015396957 dated Jun. 29, 2018.
U.S. Appl. No. 14/849,643, filed Sep. 10, 2015, Non-Final Office Action dated Nov. 17, 2017.
U.S. Appl. No. 13/789,525, filed Mar. 7, 2013, Advisory Action dated Jan. 27, 2017.

(56) References Cited

OTHER PUBLICATIONS

U.S. Appl. No. 13/789,525, filed Mar. 7, 2013, Notice of Allowance dated Mar. 24, 2017.
U.S. Appl. No. 13/789,525, filed Mar. 7, 2013, Notice of Allowance dated Jul. 18, 2017.
U.S. Appl. No. 131789,525, filed Mar. 7, 2013, Notice of Allowance dated Nov. 17, 2017.
U.S. Appl. No. 14/728,492, filed Jun. 2, 2015, Notice of Allowance dated Jun. 16, 2017.
U.S. Appl. No. 14/728,492, filed Jun. 2, 2015, Notice of Allowance dated Aug. 10, 2017.
U.S. Appl. No. 14/728,492, filed Jun. 2, 2015, Notice of Allowance dated Jan. 2, 2018.
U.S. Appl. No. 14/483,089, filed Sep. 10, 2014, Notice of Allowance dated Nov. 30, 2017.
Notice of Allowance dated Aug. 13, 2018 in U.S. Appl. No. 16/017,516.
U.S. Appl. No. 14/728,507, filed Jun. 2, 2015, Non-Final Office Action dated Apr. 6, 2018.
Niessen, K.F., Zur Entscheidung zwischen den beiden Sommerfeldschen Formeln für die Fortpflanzung von drahtlosen Wellen, Ann. der Physik, 1937, pp. 585-596, vol. 29 (Includes English Translation and German Original).
Niessen, K.F., Über die enffemten Raumwellen eines vertikalen Dipolsenders oberhalb einer ebenen Erde von beliebiger Dielektrizitätskonstante und beliebiger Leitfähigkeit, Ann. der Physik, Dec. 24, 1933, pp. 893-912, Series 5, vol. 18 (Includes English Translation and German Original).
Niessen, K.F., Bemerkung zu einer Arbeit von Murray und einer Arbeit von van der Pol und Niessen über die Ausbreitung elektromagnetischer Wellen, Ann. der Physik, Apr. 3, 1933, pp. 810-820, Series 5, vol. 16 (Includes English Translation and German Original).
Hack, F., Die Ausbreitung ebener elektromagnetischer Wellen längs eines geschichteten Leiters, besonders in den Fällen der drahtlosen Telegraphie, Annalen der Physik, 1908, pp. 43-63, vol. 27 (Includes English Translation and German Original).
True, H., Über die Erdströme in der Nähe einer Sendeantenne für drahtlose Telegraphie, Jahrbuch der drahtlosen Telegraphie und Telephonie, Feb. 1911, pp. 125-175, vol. 5, No. 2 (Includes English Translation and German Original).
Van Der Pol et al., Über die Ausbreitung elektromagnetischer Wellen über eine ebene Erde, Ann. der Physik, Aug. 22, 1930, pp. 273-294, Ser. 5, vol. 6 (Includes English Translation and German Original).
Van Der Pol, B., Über die Ausbreitung elektromagnetischer Wellen, Jahrbuch der drahtlosen Telegraphie und Telephonie, Apr. 1931, pp. 152-156, vol. 37 (Includes English Translation and German Original).
Zenneck, J., "Über die Fortpflanzung ebener elektromagnetischer Wellen längs einer ebenen Leiterfläche und ihre Beziehung zur drahtlosen Telegraphie," (On the propagation of plane electromagnetic waves along a flat conducting surface and their relation to wireless telegraphy), Annalen der Physik, Sep. 20, 1907, pp. 846-866, Serial 4, vol. 23 (Includes English Translation and German Original).
Sommerfeld, A., Über die Ausbreitung der Wellen in der drahtlosen Telegraphie, Annalen der Physik, 1909, pp. 665-737, vol. 28, No. 4 (Includes English Translation and German Original).
Weyl, H., Ausbreitung elektromagnetischer Wellen über einem ebenen Leiter (Propagation of Electromagnetic Waves Over a Plane Conductor), Annalen der Physik, Nov. 1919, pp. 97-109, vol. 60 (Includes English Translation and German Original).
Sommerfeld, A., Ausbreitung der Wellen in der drahtlosen Telegraphie. Einfluss der Bodenbeschaffenheit auf gerichtete und ungerichtete Wellenzüge, Jahrbuch der drahtlosen Telegraphie und Telephonie, Dec. 1910, pp. 157-176 (Includes English Translation and German Original).

Van Der Pol et al., Über die Raumwellen von einem vertikalen Dipolsender auf ebener Erde, Ann. der Physik, Jul. 21, 1931, pp. 485-510, Ser. 5, vol. 10 (Includes English Translation and German Original).
Sommerfeld, A., Über die Fortpflanzung elektrodynamischer Wellen langs eines Drahtes, Annalen der Physik, 1899, pp. 233-290, vol. 67 (Includes English Translation and German Original).
Sommerfeld, A., Über die Ausbreitung der Wellen in der drahtlosen Telegraphie, Annalen der Physik, Dec. 1926, pp. 1135-1153, vol. 81 (Includes English Translation and German Original).
Weyl, H., Erwiderung auf Herrn Sommerfelds Bemerkungen über die Ausbreitung der Wellen in der drahtlosen Telegraphie, Annalen der Physik, 1920, pp. 110-112, vol. 62 (Includes English Translation and German Original).
Sommerfeld, A., Über die Ausbreitung der Wellen in der drahtlosen Telegraphie, Annalen der Physik, 1920 , pp. 95-96, vol. 367, No. 9 (Includes English Translation and German Original).
Wolff, Christian, "Over the Horizon Oceanography Radar WERA," Oct. 13, 2011, https://web.archive.org/web/20111013010047/http:/www.radartutorial.eu/19.kartei/karte712.en.html.
Kume, Hideyoshi, "Dengyo Converts Microwave Into Electricity with High Efficiency," Nikkei Electronics, May 17, 2011, http://techon.nikkeibp.co.jp/english/NEWS_EN/20110517/191846/.
Examination Report issued in New Zealand Application No. 712566 dated Jun. 10, 2016.
Examination Report issued in New Zealand for Application No. 720048 dated Jun. 28, 2016.
Fujimoto et al., Small Antennas, Research Studies Press, 1987, p. 4.
Corum et al., Class Notes: Tesla Coils and the Failure of Lumped-Element Circuit Theory, published on the World Wide Web at http://www.teslatechnologyresearch.com/corum/, 1999.
Corum et al., RF Coils, Helical Resonators and Voltage Magnification by Coherent Spatial Modes, Microwave Review, Sep. 2001, pp. 36-45.
Burrows, Charles R., The Surface Wave in Radio Propagation, Proceedings of the Radio Club of America, Aug. 1937, pp. 15-18, vol. 14, No. 2.
Burrows, Charles R., The History of Radio Wave Propagation Up to the End of World War I, Proceedings of the IRE, May 1962, pp. 682-684, vol. 50, Issue 5.
Wolff, Edward A., Antenna Analysis, 1966, p. 33, John Wiley & Sons, Inc.
Vogler, L.E., A Note on the Attenuation Function for Propagation Over a Flat Layered Ground, IEEE Transactions on Antennas and Propagation, Mar. 1964, pp. 240-242, vol. AP-12, No. 2.
Banos, A., Dipole Radiation in the Presence of a Conducting Half-Space, 1966, pp. 148-158, Pergamon Press.
Barlow et al., Radio Surface Waves, 1962, pp. 1-5, 10-12, 29-33, Oxford University Press.
Brainerd et al., Ultra High Frequency Techniques, 1942, pp. 477-480, D. Van Nostrand Company, Inc., New York.
Bronwell et al., Theory and Application of Microwaves, 1947, pp. 384-387, 390, McGraw-Hill.
Clemmow, P.C., The Plane Wave Spectrum Representation of Electromagnetic Fields, 1966, pp. 30-31, Pergamon Press.
Collin, R.E., Field Theory of Guided Waves, 1960, pp. 453-454, McGraw-Hill.
Collin et al., Electromagnetic Fields, Antenna Theory—Part 1, 1969, p. 18, vol. 7, McGraw-Hill.
Collin, R.E., Antennas and Radiowave Propagation, 1985, pp. 377-385, McGraw-Hill.
Everitt et al., Communication Engineering, 3rd edition, 1956, p. 407, McGraw-Hill.
Felsen et al., Radiation and Scattering of Waves, 1973, pp. 506-513, 554-559, Prentice-Hall.
Friedman, B., Principles and Techniques of Applied Mathematics, 1956, pp. 213-214, 283-286, 290, 298-300, Wiley.
Hansen, R.C., Electrically Small, Superdirective, and Superconducting Antennas, 2006, pp. 62-64, Wiley Interscience.
Hansen et al., Small Antenna Handbook, 2011, pp. 147-150, Wiley, New Jersey.
Harrington, R.F., Time-Harmonic Electromagnetic Fields, 1961, pp. 460-463, McGraw-Hill.

(56) References Cited

OTHER PUBLICATIONS

Ishimaru, A., Electromagnetic Wave Propagation, Radiation and Scattering, 1991, pp. 456-461, Prentice-Hall, New Jersey.
Wise, W.H., The Grounded Condenser Antenna Radiation Formula, Proc. IRE, Sep. 1931, pp. 1684-1689, vol. 19, No. 9.
Kraus, J.D., Antennas, 1950, pp. 33-34, 452-453, 461-463, McGraw-Hill.
Wise, W.H., Asymptotic Dipole Radiation Formulas, Bell System Technical Journal, Oct. 1929, pp. 662-671, vol. 8.
Ramo et al., Fields and Waves in Communication Electronics, 3rd Edition, 1994, pp. 435-437, Wiley.
Ryder, J.D., Networks, Lines and Fields, 1949, pp. 422-425, Prentice Hall, New York.
Reich et al., Microwave Theory and Techniques, 1953, pp. 291-293, Van Nostrand.
Sarbacher et al., Hyper and Ultrahigh Frequency Engineering, 1943, pp. 201-202, Wiley & Sons, Inc.
Schelkunoff, S.A., Electromagnetic Waves, 1943, pp. 49, 428-437, Van Nostrand Company, New York.
Tesla, N., The Problem of Increasing Human Energy with Special References to the Harnessing of the Sun's Energy, The Century Illustrated Monthly Magazine, Jun. 1900, pp. 1-35.
Van Der Pol, B., On Discontinuous Electromagnetic Waves and the Occurrence of a Surface Wave, IEEE Transactions on Antennas and Propagation, Jul. 1956, pp. 288-293, vol. AP-4.
Eckert, Robert P., Modern Methods for Calculating Ground-Wave Field Strength Over a Smooth Spherical Earth, Report to the Federal Communications Division, Feb. 1986.
Wait et al., Radiation from a Vertical Dipole over a Stratified Ground (Part II), IRE Transactions on Antennas and Propagation, Oct. 1954, pp. 144-146, vol. AP-3, No. 4.
Tesla, N., From Colorado Springs to Long Island, Nikola Tesla Museum, 2008, pp. 485, 487, Nikola Tesla Museum.
Cross et al., An Advanced VHF/UHF Short Range, Groundwave Propagation Model for Paths with Near-Earth Antennas, MegaWave Corporation, Nov. 1, 2006, Boylston, MA.
Tyras, G., Radiation and Propagation of Electromagnetic Waves, 1969, pp. 33-36, Academic Press.
Wait, J.R., Wave Propagation Theory, 1981, pp. 67-75, 117-127, Pergamon Press.
Wait, J.R., Electromagnetic Wave Theory, 1985, pp. 254-259, Harper and Row, Publishers, New York.
Wait, J.R., Electromagnetic Waves in Stratified Media, 1996, pp. 8-10, IEEE Press, Reprint from 1962 edition, Pergamon Press.
Hessel, A., General Characteristics of Traveling-Wave Antennas, Antenna Theory—Part 2, Chapter 19, Appendix B, 1969, pp. 238-241, McGraw-Hill Book Company, New York.
Sarkar et al., Electromagnetic Macro Modeling of Propagation in Mobile Wireless Communication: Theory and Experiment, IEEE Antennas and Propagation Magazine, Dec. 2012, pp. 17-43, vol. 54, No. 6.
Wait, J.R., Characteristics of Antennas over Lossy Earth, Antenna Theory—Part 2, Chapter 23, 1969, pp. 386-391, McGraw-Hill Book Company, New York.
Wait, J.R., Theory of Ground Wave Propagation, Electromagnetic Probing in Geophysics, Chapter 5, 1971, pp. 163-172, 204-207, Golem Press, Boulder, Colorado.
Smith, M.S., Conventional Explanation for Crossed-Field Antenna, Electronics Letters, Feb. 13, 1992, pp. 360-361, vol. 28, No. 4.
Tesla, N., The Transmission of Electrical Energy Without Wires as a Means of Furthering Peace, Electrical World and Engineer, Jan. 7, 1905, pp. 21-24.
Wait et al., Excitation of the HF Surface Wave by Vertical and Horizontal Antennas, Radio Science, Sep.-Oct. 1979, pp. 767-780, vol. 14, No. 5.
Wait, J.R., A Note on Surface Waves and Ground Waves, IEEE Transactions on Antennas and Propagation, Nov. 1965, pp. 996-997, vol. AP-13.
Nikola Tesla, Nikola Tesla on His Work With Alternating Currents and Their Application to Wireless Telegraphy, Telephony, and Transmission of Power, 2002, pp. 1-240, Twenty First Century Books, Breckenridge, Colorado.
Tesla, N., Colorado Springs Notes: 1899-1900, 1978, pp. 1-437, Nolit, Beograd, Yugoslavia.
Zenneck, J., Wireless Telegraphy, Mar. 1918, McGraw-Hill Book Company, Inc., New York, NY, USA.
Hendry, J. Surface Waves: what Are They? Why Are They Interesting?, Roke Manor Research Limited, 2009, pp. 1-10, Romsey, England.
Turner, J., Isolation of the Zenneck Surface Wave: Update, Roke Manor Research Limited, Romsey, England.
Schelkunoff, S. A., Modified Sommerfeld's Integral and Its Applications, Proceedings of the Institute of Radio Engineers, Oct. 1936, pp. 1388-1398, vol. 24, No. 10, IEEE, New York, NY, USA.
Wells, C.B., CFA Experiments, Electronics World + Wireless World, Mar. 1990, pp. 253-255, vol. 96.
Wells, C.B., The Cross-Field Antenna in Practice, Electronics World + Wireless World, Nov. 1989, pp. 1109-1111, vol. 95.
Wait, J.R., Theory of Ground Wave Propagation, Electromagnetic Probing in Geophysics, 1971, pp. 163-207, Golem Press.
Sarkar et al., History of Wireless, Jan. 17, 2006, Wiley-IEEE Press, Hoboken, NJ, USA.
Stark III, J.C., Wireless Power Transmission Utilizing a Phased Array of Tesla Coils (Master's Thesis), May 13, 2004, pp. 1-247, MIT, Cambridge, MA, USA.
Hardesty et al., Electrical Storms in Tesla's Colorado Springs Notes (& the Transmission of Energy w/o Wires), Tesla Science Center Conference, Nov. 5, 2011, Long Island, NY, USA.
Corum et al., A Technical Analysis of the Extra Coil as a Slow Wave Helical Resonator, Proceedings of the 2nd International Tesla Symposium, 1986, pp. 2-1 to 2-24, International Tesla Society, Colorado Springs, CO, USA.
Corum et al., Dr. Mahlon Loomis: Terra Alta's Neglected Discoverer of Rf Communication, Proceedings of the 1992 International Tesla Symposium, pp. 19-34, International Tesla Society, Colorado Springs, CO, USA.
Corum et al., Summary Notes on Tesla Coils, Tesla Conference 2011, Published as Appendix 8 in Electrical Storms in Tesla's Colorado Springs Notes and the Transmission of Energy Without Wires, Nov. 5, 2011, pp. 1-14, Tesla Science Center at Wardenclyffe, Shoreham, NY, USA.
Hardesty et al., Franklin—Loomis—Tesla: The Origin and Development of Wireless Technology, Tesla Science Foundation Conference, Jul. 9-11, 2010, Philadelphia, PA, USA.
Hardesty et al., Franklin—Loomis—Tesla: The Origin of Modern Wireless Phenomena, Tesla Science Foundation Conference, Jul. 9-11, 2010, pp. 1-99, Philadelphia, PA, USA.
Corum et al., Goodness, Q and Power Factor in Electrical Science and Machinery, Infinite Energy Magazine, Jan./Feb. 2010, pp. 1-17, vol. 15, No. 89, New Energy Foundation, Concord, NH, USA.
Marriott, R. H., How Radio Grew Up, Radio Broadcast, Dec. 1925, pp. 159-162, vol. VIII, No. 2, Doubleday, Page & Co., Garden City, NY, USA.
Goubau, G., Über die Zennecksche Bodenwelle (On the Zenneeck Surface Wave), Zeitschrift fur Angewandte Physik, 1951, pp. 103-107, vol. 3, No. 3/4, as translated by James F. Corum.
Pinzone, B.F., Pinzone Antiskywave Design, Radio World, May 15, 1988, pp. 45-46.
Corum et al., Experimental Replication of Loomis' RF Experiments, AAPT Summer Meeting, Jul. 24, 2006, Syracuse, NY, USA.
Corum et al., Tesla Coil Research, U.S. Army Armament Research, Development and Engineering Center, Contract No. DAAA21-90-C-0084, Jun. 1992.
Lebo, J.R., The Man Before Marconi: A Biography of Dr. Mahlon Loomis, QST, Aug. 1948, pp. 42-44.
Winters, S.R., The Story of Mahlon Loomis: Pioneer of Radio, Radio News, Nov. 1922, pp. 836-837, 966-980.
Kogan, S.H., Distribution of Waves Along an Infinite Helix, Reports of the Academy of Sciences of the USSR, 1949, pp. 1-5, vol. 66, No. 5, as translated by P.J. Pesavento and E. Corum.

(56) References Cited

OTHER PUBLICATIONS

Singh A. K. et al., Excitation of surface electromagnetic waves on water, App Optics, Nov. 1, 1978, pp. 3459-3465, vol. 17, No. 21.
Olivier Balosso et al., Brief overview about Surface Wave theory and applications, 2012 15th International Symposium on Antenna Technology and Applied Electromagnetics (ANTEM), Jun. 25, 2012, pp. 1-7, IEEE.
International Search Report and Written Opinion for PCT/US2015/035598 dated Jul. 21, 2014.
Menelle M et al., Full digital high frequency surface wave radar: French trials in the Biscay bay, 2008 International Conference on RADAR, Sep. 2, 2008, pp. 224-229, IEEE, Piscataway, NJ, USA.
J. O. Hinz et al., A MIMO FMCW radar approach to HFSWR, Advances in Radio Science: ARS, Jul. 29, 2011, pp. 159-163, retrieved from the Internet: http://www.adv-radio-sci.net/9/159/2011/ars-9-159-2011.pdf (retrieved on Dec. 4, 2015), Katlenburg-Lindau, Germany.
Guohua Wang et al., High Resolution MIMO-HFSWR Radar Using Sparse Frequency Waveforms, Wireless Sensor Network, Oct. 1, 2009, pp. 152-162, vol. 1, No. 3.
International Search Report and Written Opinion for PCT/US2015/049505 dated Dec. 14, 2015.
International Search Report and Written Opinion for PCT/US2015/049394 dated Dec. 14, 2015.
International Search Report and Written Opinion for PCT/US2015/049064 dated Dec. 11, 2015.
International Search Report and Written Opinion for PCT/US2015/049509 dated Dec. 18, 2015.
H. M. Barlow et al., Surface Waves, Proceedings of the IRE, Nov. 1, 1953, pp. 329-341, vol. 100, No. 68, US.
International Search Report and Written Opinion for PCT/US2015/049171 dated Dec. 16, 2015.
International Search Report and Written Opinion for PCT/US2015/049435 dated Dec. 22, 2015.
International Search Report and Written Opinion for PCT/US2015/049424 dated Dec. 18, 2015.
International Search Report and Written Opinion for PCT/US2015/049151 dated Dec. 17, 2015.
International Search Report and Written Opinion for PCT/US2015/049161 dated Dec. 17, 2015.
International Search Report and Written Opinion for PCT/US2015/049518 dated Dec. 18, 2015.
International Search Report and Written Opinion for PCT/US2015/049154 dated Dec. 15, 2015.
Hambling, David, "Skimming the Surface: The Return of Tesla's Surface Waves", Published by Popular Mechanics on the Internet at http://www.popularmechanics.com/technology/infrastructure/a8778/ skimming-the-surface-the-return-of-teslas-surface-waves-15322250/, Apr. 8, 2013, Popular Mechanics.
Barfield, R. H., "The Attenuation of Wireless Waves Over Land," Journal of the I.E.E. (British), Jan. 1928, pp. 204-214, vol. 66.
Michalski, K. A. et al., "The Sommerfeld half-space problem revisited: from radio frequencies and Zenneck waves to visible light and Fano modes," Journal of Electromagnetic Waves and Applications, Jan. 2016, pp. 1-42, vol. 30, No. 1, Taylor & Francis.
Noether, F., "Spreading of Electric Waves Along the Earth," published in the book translation Theory of Functions as Applied to Engineering Problems, Technology Press, 1942, pp. 167-184, Part 2, Section E, MIT [Originally published by Springer, Berlin, in 1931 under the title Funktionentheorie and Ihre Anwendung in der Technik, Part II, R. Rothe, F. Ollendorf, and K Pohlhausen, editors.].
Notice of Allowance dated Feb. 1, 2019 in U.S. Appl. No. 15/878,607, dated Feb. 1, 2019.
Final Office Action dated May 2, 2019 in related U.S. Appl. No. 15/889,827, filed Feb. 6, 2018.

\* cited by examiner $P_0: \ |J_{R_0}| \ \underline{|\varphi_0}$ $P_1: \ |J_{R_1}| \ \underline{|\varphi_0 - \beta R_1}$ $P_2: \ |J_{R_2}| \ \underline{|\varphi_0 - \beta R_2 + \varphi_\Delta}$ $\varphi_\Delta = \arg\left(\sqrt{\gamma}\right) \approx \dfrac{\pi}{4}$

ADAPTATION OF POLYPHASE WAVEGUIDE PROBES

CROSS REFERENCE TO RELATED APPLICATIONS

This application is a continuation application of U.S. application Ser. No. 16/017,516, filed Jun. 25, 2018, entitled "Adaptation of Polyphase Waveguide Probes", which application is a continuation application of U.S. application Ser. No. 14/848,653, filed Sep. 9, 2015, entitled "Adaptation of Polyphase Waveguide Probes," which application claims priority to, and the benefit of, co-pending U.S. provisional application entitled "Adaptation of Polyphase Waveguide Probes" having Ser. No. 62/049,124, filed Sep. 11, 2014, which is hereby incorporated by reference in its entirety.

This application is related to co-pending U.S. Non-provisional patent application entitled "Excitation and Use of Guided Surface Wave Modes on Lossy Media," which was filed on Mar. 7, 2013 and assigned application Ser. No. 13/789,538, and was published on Sep. 11, 2014 as Publication Number US2014/0252886 A1, and which is incorporated herein by reference in its entirety. This application is also related to co-pending U.S. Non-provisional patent application entitled "Excitation and Use of Guided Surface Wave Modes on Lossy Media," which was filed on Mar. 7, 2013 and assigned application Ser. No. 13/789,525, and was published on Sep. 11, 2014 as Publication Number US2014/0252865 A1, and which is incorporated herein by reference in its entirety. This application is further related to co-pending U.S. Non-provisional patent application entitled "Excitation and Use of Guided Surface Wave Modes on Lossy Media," which was filed on Sep. 10, 2014 and assigned application Ser. No. 14/483,089, and which is incorporated herein by reference in its entirety. This application is further related to co-pending U.S. Non-provisional patent application entitled "Excitation and Use of Guided Surface Waves," which was filed on Jun. 2, 2015 and assigned application Ser. No. 14/728,507, and which is incorporated herein by reference in its entirety. This application is further related to co-pending U.S. Non-provisional patent application entitled "Excitation and Use of Guided Surface Waves," which was filed on Jun. 2, 2015 and assigned application Ser. No. 14/728,492, and which is incorporated herein by reference in its entirety

BACKGROUND

For over a century, signals transmitted by radio waves involved radiation fields launched using conventional antenna structures. In contrast to radio science, electrical power distribution systems in the last century involved the transmission of energy guided along electrical conductors. This understanding of the distinction between radio frequency (RF) and power transmission has existed since the early 1900's.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
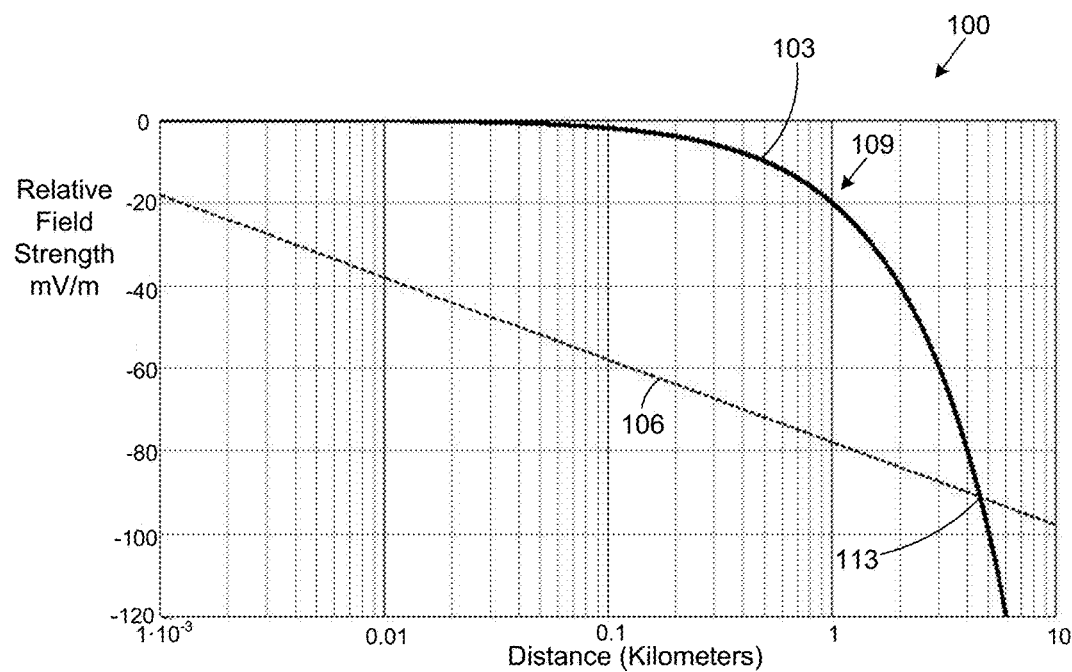
FIG. 1 is a chart that depicts field strength as a function of distance for a guided electromagnetic field and a radiated electromagnetic field.

Referring to FIG. 1, to begin, some terminology shall be established to provide clarity in the discussion of concepts to follow. First, as contemplated herein, a formal distinction is drawn between radiated electromagnetic fields and guided electromagnetic fields.

As contemplated herein, a radiated electromagnetic field comprises electromagnetic energy that is emitted from a source structure in the form of waves that are not bound to a waveguide. For example, a radiated electromagnetic field is generally a field that leaves an electric structure such as an antenna and propagates through the atmosphere or other medium and is not bound to any waveguide structure. Once radiated electromagnetic waves leave an electric structure such as an antenna, they continue to propagate in the medium of propagation (such as air) independent of their source until they dissipate regardless of whether the source continues to operate. Once electromagnetic waves are radiated, they are not recoverable unless intercepted, and, if not intercepted, the energy inherent in radiated electromagnetic waves is lost forever. Electrical structures such as antennas are designed to radiate electromagnetic fields by maximizing the ratio of the radiation resistance to the structure loss resistance. Radiated energy spreads out in space and is lost regardless of whether a receiver is present. The energy density of radiated fields is a function of distance due to geometrical spreading. Accordingly, the term "radiate" in all its forms as used herein refers to this form of electromagnetic propagation.

A guided electromagnetic field is a propagating electromagnetic wave whose energy is concentrated within or near boundaries between media having different electromagnetic properties. In this sense, a guided electromagnetic field is one that is bound to a waveguide and may be characterized as being conveyed by the current flowing in the waveguide. If there is no load to receive and/or dissipate the energy conveyed in a guided electromagnetic wave, then no energy is lost except for that dissipated in the conductivity of the guiding medium. Stated another way, if there is no load for a guided electromagnetic wave, then no energy is consumed. Thus, a generator or other source generating a guided electromagnetic field does not deliver real power unless a resistive load is present. To this end, such a generator or other source essentially runs idle until a load is presented. This is akin to running a generator to generate a 60 Hertz electromagnetic wave that is transmitted over power lines where there is no electrical load. It should be noted that a guided electromagnetic field or wave is the equivalent to what is termed a "transmission line mode." This contrasts with radiated electromagnetic waves in which real power is supplied at all times in order to generate radiated waves. Unlike radiated electromagnetic waves, guided electromagnetic energy does not continue to propagate along a finite length waveguide after the energy source is turned off. Accordingly, the term "guide" in all its forms as used herein refers to this transmission mode of electromagnetic propagation.

To further illustrate the distinction between radiated and guided electromagnetic fields, reference is made to FIG. 1 that depicts graph 100 of field strength in decibels (dB) above an arbitrary reference in volts per meter as a function of distance in kilometers on a log-dB plot. The graph 100 of FIG. 1 depicts a guided field strength curve 103 that shows the field strength of a guided electromagnetic field as a function of distance. This guided field strength curve 103 is essentially the same as a transmission line mode. Also, the graph 100 of FIG. 1 depicts a radiated field strength curve 106 that shows the field strength of a radiated electromagnetic field as a function of distance.

Of interest are the shapes of the curves 103/106 for radiation and for guided wave propagation. The radiated field strength curve 106 falls off geometrically (1/d, where d is distance) and is a straight line on the log-log scale. The guided field strength curve 103, on the other hand, has the characteristic exponential decay of $e^{-\alpha d}/\sqrt{d}$ and exhibits a distinctive knee 109. Thus, as shown, the field strength of a guided electromagnetic field falls off at a rate of $e^{-\alpha d}/\sqrt{d}$, whereas the field strength of a radiated electromagnetic field falls off at a rate of $1/d$, where d is the distance. Due to the fact that the guided field strength curve 103 falls off exponentially, the guided field strength curve 103 features the knee 109 as mentioned above. The guided field strength curve 103 and the radiated field strength curve 106 intersect at a crossover point 113 which occurs at a crossover distance. At distances less than the crossover distance, the field strength of a guided electromagnetic field is significantly greater at most locations than the field strength of a radiated electromagnetic field. At distances greater than the crossover distance, the opposite is true. Thus, the guided and radiated field strength curves 103 and 106 further illustrate the fundamental propagation difference between guided and radiated electromagnetic fields. For an informal discussion of the difference between guided and radiated electromagnetic fields, reference is made to Milligan, T., *Modern Antenna Design*, McGraw-Hill, 1st Edition, 1985, pp.8-9, which is incorporated herein by reference in its entirety.

The distinction between radiated and guided electromagnetic waves, made above, is readily expressed formally and placed on a rigorous basis. That two such diverse solutions could emerge from one and the same linear partial differential equation, the wave equation, analytically follows from the boundary conditions imposed on the problem. The Green function for the wave equation, itself, contains the distinction between the nature of radiation and guided waves.

In empty space, the wave equation is a differential operator whose eigenfunctions possess a continuous spectrum of eigenvalues on the complex wave-number plane. This transverse electro-magnetic (TEM) field is called the radiation field, and those propagating fields are called "Hertzian waves". However, in the presence of a conducting boundary, the wave equation plus boundary conditions mathematically lead to a spectral representation of wave-numbers composed of a continuous spectrum plus a sum of discrete spectra. To this end, reference is made to Sommerfeld, A., "Uber die Ausbreitung der Wellen in der Drahtlosen Telegraphie," Annalen der Physik, Vol. 28, 1909, pp. 665-736. Also see Sommerfeld, A., "Problems of Radio," published as Chapter 6 in *Partial Differential Equations in Physics—Lectures on Theoretical Physics: Volume VI*, Academic Press, 1949, pp. 236-289, 295-296; Collin, R. E., "Hertzian Dipole Radiating Over a Lossy Earth or Sea: Some Early and Late 20th Century Controversies," *IEEE Antennas and Propagation Magazine*, Vol. 46, No. 2, April 2004, pp. 64-79; and Reich, H. J., Ordnung, P. F, Krauss, H. L., and Skalnik, J. G.,

*Microwave Theory and Techniques*, Van Nostrand, 1953, pp. 291-293, each of these references being incorporated herein by reference in their entirety.

To summarize the above, first, the continuous part of the wave-number eigenvalue spectrum, corresponding to branch-cut integrals, produces the radiation field, and second, the discrete spectra, and corresponding residue sum arising from the poles enclosed by the contour of integration, result in non-TEM traveling surface waves that are exponentially damped in the direction transverse to the propagation. Such surface waves are guided transmission line modes. For further explanation, reference is made to Friedman, B., *Principles and Techniques of Applied Mathematics*, Wiley, 1956, pp. pp. 214, 283-286, 290, 298-300.

In free space, antennas excite the continuum eigenvalues of the wave equation, which is a radiation field, where the outwardly propagating RF energy with $E_Z$ and $H_\varphi$ in-phase is lost forever. On the other hand, waveguide probes excite discrete eigenvalues, which results in transmission line propagation. See Collin, R. E., *Field Theory of Guided Waves*, McGraw-Hill, 1960, pp. 453, 474-477. While such theoretical analyses have held out the hypothetical possibility of launching open surface guided waves over planar or spherical surfaces of lossy, homogeneous media, for more than a century no known structures in the engineering arts have existed for accomplishing this with any practical efficiency. Unfortunately, since it emerged in the early 1900's, the theoretical analysis set forth above has essentially remained a theory and there have been no known structures for practically accomplishing the launching of open surface guided waves over planar or spherical surfaces of lossy, homogeneous media.

According to the various embodiments of the present disclosure, various polyphase waveguide probes are described that are configured to excite radial surface currents having resultant fields that synthesize the form of surface-waveguide modes along the surface of a lossy conducting medium. Such guided electromagnetic fields are substantially mode-matched in magnitude and phase to a guided surface wave mode on the surface of the lossy conducting medium. Such a guided surface wave mode may also be termed a Zenneck surface wave mode. By virtue of the fact that the resultant fields excited by the polyphase waveguide probes described herein are substantially mode-matched to a Zenneck surface wave mode on the surface of the lossy conducting medium, a guided electromagnetic field in the form of a Zenneck surface wave is launched along the surface of the lossy conducting medium. According to one embodiment, the lossy conducting medium comprises a terrestrial medium such as the Earth.

Figure 2:
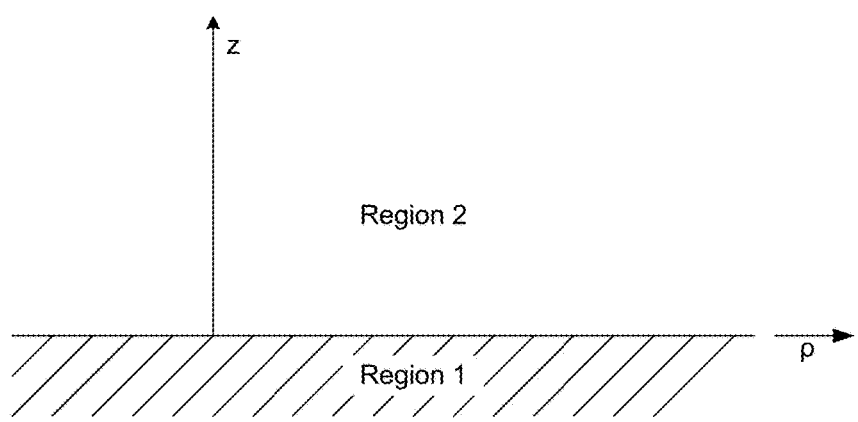
FIG. 2 is a drawing that illustrates a propagation interface with two regions employed for transmission of a guided surface wave according to various embodiments of the present disclosure.

Referring to FIG. 2, shown is a propagation interface that provides for an examination of the boundary value solution to Maxwell's equations derived in 1907 by Jonathan Zenneck as set forth in his paper Zenneck, J., "On the Propagation of Plane Electromagnetic Waves Along a Flat Conducting Surface and their Relation to Wireless Telegraphy," Annalen der Physik, Serial 4, Vol. 23, Sep. 20, 1907, pp. 846-866. FIG. 2 depicts cylindrical coordinates for radially propagating waves along the interface between a lossy conducting medium specified as Region 1 and an insulator specified as Region 2. Region 1 may comprise, for example, any lossy conducting medium. In one example, such a lossy conducting medium may comprise a terrestrial medium such as the Earth or other medium. Region 2 is a second medium that shares a boundary interface with Region 1 and has different constitutive parameters relative to Region 1. Region 2 may comprise, for example, any insulator such as the atmosphere or other medium. The reflection coefficient for such a boundary interface goes to zero only for incidence at a complex Brewster angle. See Stratton, J. A., *Electromagnetic Theory*, McGraw-Hill, 1941, p. 516.

According to various embodiments, the present disclosure sets forth various polyphase waveguide probes that generate electromagnetic fields that are substantially mode-matched to a Zenneck surface wave mode on the surface of the lossy conducting medium comprising Region 1. According to various embodiments, such electromagnetic fields substantially synthesize a wave front incident at a complex Brewster angle of the lossy conducting medium that results in zero reflection.

To explain further, in Region 2, where $e^{j\omega t}$ field variation is assumed and where $\rho \neq 0$ and $z \geq 0$ (z is a vertical coordinate normal to the surface of Region 1, $\rho$ is the radial dimension in cylindrical coordinates), Zenneck's closed-form exact solution of Maxwell's equations satisfying the boundary conditions along the interface are expressed by the following electric field and magnetic field components:

$$H_{2\phi} = Ae^{-u_2 z} H_1^{(2)}(-j\gamma\rho), \tag{1}$$

$$E_{2\rho} = A\left(\frac{u_2}{j\omega\varepsilon_0}\right) e^{-u_2 z} H_1^{(2)}(-j\gamma\rho), \text{ and} \tag{2}$$

$$E_{2z} = A\left(\frac{-\gamma}{\omega\varepsilon_0}\right) e^{-u_2 z} H_0^{(2)}(-j\gamma\rho). \tag{3}$$

In Region 1, where $e^{j\omega t}$ field variation is assumed and where $\rho \neq 0$ and $z \leq 0$, Zenneck's closed-form exact solution of Maxwell's equations satisfying the boundary conditions along the interface are expressed by the following electric field and magnetic field components:

$$H_{1\phi} = Ae^{u_1 z} H_1^{(2)}(-j\gamma\rho), \tag{4}$$

$$E_{1\rho} = A\left(\frac{-u_1}{\sigma_1 + j\omega\varepsilon_1}\right) e^{u_1 z} H_1^{(2)}(-j\gamma\rho), \text{ and} \tag{5}$$

$$E_{1z} = A\left(\frac{-j\gamma}{\sigma_1 + j\omega\varepsilon_1}\right) e^{u_1 z} H_0^{(2)}(-j\gamma\rho). \tag{6}$$

In these expressions, $H_n^{(2)}(-j\gamma\rho)$ is a complex argument Hankel function of the second kind and order n, $u_1$ is the propagation constant in the positive vertical direction in Region 1, $u_2$ is the propagation constant in the vertical direction in Region 2, $\sigma_1$ is the conductivity of Region 1, $\omega$ is equal to $2\pi f$, where f is a frequency of excitation, $\varepsilon_0$ is the permittivity of free space, $\varepsilon_1$ is the permittivity of Region 1, A is a source constant imposed by the source, z is a vertical coordinate normal to the surface of Region 1, $\gamma$ is a surface wave radial propagation constant, and $\rho$ is the radial coordinate.

The propagation constants in the $\pm z$ directions are determined by separating the wave equation above and below the interface between Regions 1 and 2, and imposing the boundary conditions. This exercise gives, in Region 2, $$u_2 = \frac{-jk_1}{\sqrt{1 + (\varepsilon_r - jx)}}, \tag{7}$$

and gives, in Region 1, $$u_1 = -u_2(\varepsilon_r - jx). \tag{8}$$

The radial propagation constant Y is given by $$\gamma = j\sqrt{k_o^2 + u_2^2}, \qquad (9)$$

which is a complex expression. In all of the above Equations, $$x = \frac{\sigma_1}{\omega\varepsilon_o}, \text{ and} \qquad (10)$$

$$k_o = \omega\sqrt{\mu_o\varepsilon_o}, \qquad (11)$$

where $\mu_0$ comprises the permeability of free space, $\varepsilon_r$ comprises relative permittivity of Region 1. Thus, the surface wave generated propagates parallel to the interface and exponentially decays vertical to it. This is known as evanescence.

Thus, Equations (1)-(3) may be considered to be a cylindrically-symmetric, radially-propagating waveguide mode. See Barlow, H. M., and Brown, J., Radio Surface Waves, Oxford University Press, 1962, pp. 10-12, 29-33. The present disclosure details structures that excite this "open boundary" waveguide mode. Specifically, according to various embodiments, a polyphase waveguide probe is provided with charge terminals of appropriate size that are positioned relative to each other and are fed with voltages and/or currents so as to excite the relative phasing of the fields of the surface waveguide mode that is to be launched along the boundary interface between Region 2 and Region 1.

To continue further, the Leontovich impedance boundary condition between Region 1 and Region 2 is stated as $$\hat{n} \times \vec{H}_2(\rho, \phi, 0) = \vec{J}_s, \qquad (12)$$

where $\hat{n}$ is a unit normal in the positive vertical (+z) direction and $\vec{H}_2$ is the magnetic field strength in Region 2 expressed by Equation (1) above. Equation (12) implies that the fields specified in Equations (1)-(3) may be obtained by driving a radial surface current density along the boundary interface, such radial surface current density being specified by $$\boxed{J_\rho(\rho') = -A H_1^{(2)}(-j\gamma\rho')} \qquad (13)$$

where A is a constant yet to be determined. Further, it should be noted that close-in to the polyphase waveguide probe (for $\rho \ll \lambda$), Equation (13) above has the behavior $$J_{close}(\rho') = \frac{-A(j2)}{\pi(-j\gamma\rho)} = -H_\phi = -\frac{I_o}{2\pi\rho'}. \qquad (14)$$

One may wish to note the negative sign. This means that when source current flows vertically upward, the required "close-in" ground current flows radially inward. By field matching on $H_\phi$ "close-in" we find that $$A = \frac{-I_o\gamma}{4} \qquad (15)$$

in Equations (1)-(6) and (13). Therefore, Equation (13) may be restated as $$J_\rho(\rho') = \frac{I_o\gamma}{4} H_1^{(2)}(-j\gamma\rho'). \qquad (16)$$

Figure 3:
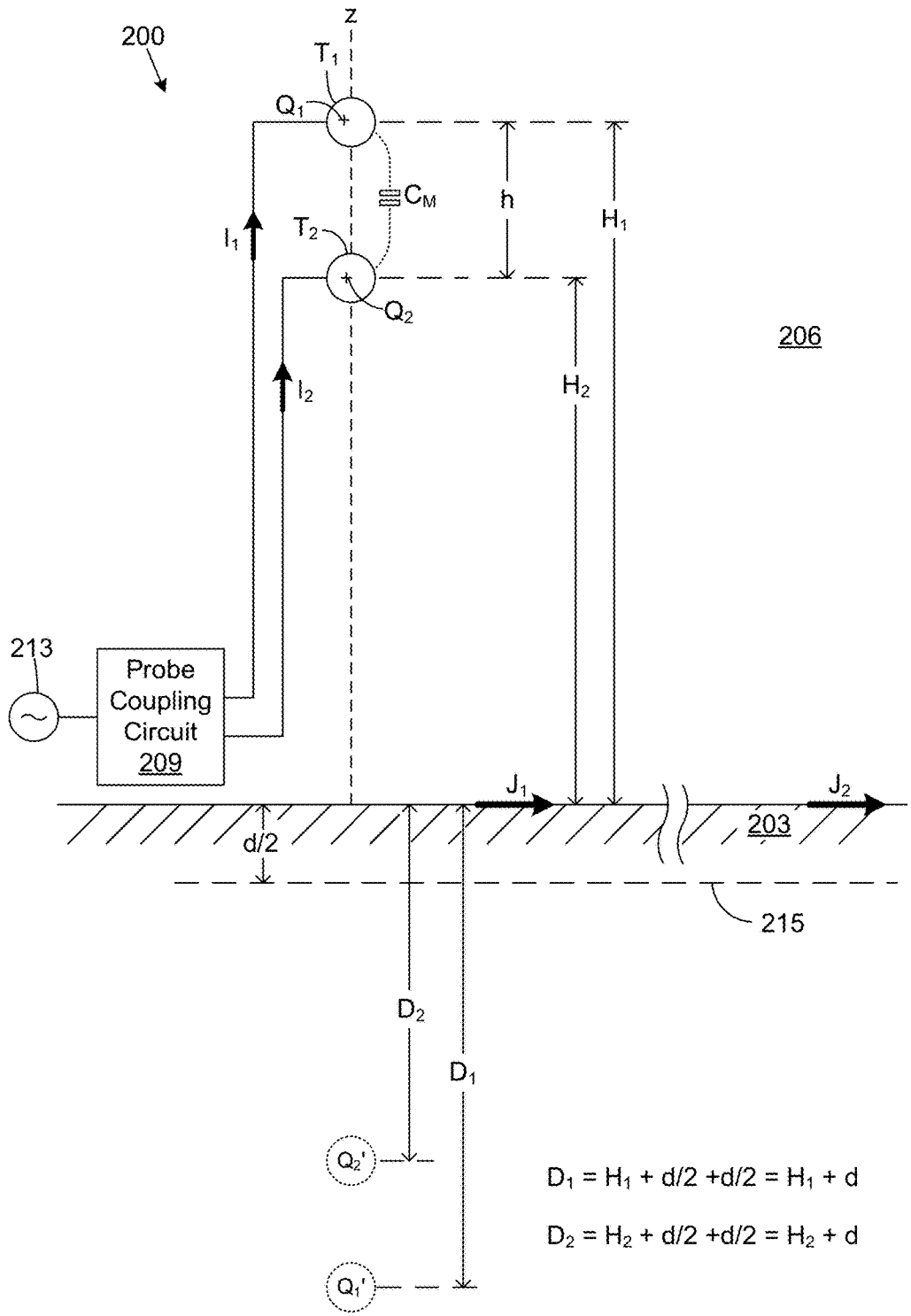
FIG. 3 is a drawing that illustrates a polyphase waveguide probe disposed with respect to a propagation interface of FIG. 2 according to an embodiment of the present disclosure.

With reference then to FIG. 3, shown is an example of a polyphase waveguide probe 200 that includes a charge terminal $T_1$ and a charge terminal $T_2$ that are arranged along a vertical axis z. The polyphase waveguide probe 200 is disposed above a lossy conducting medium 203 according to an embodiment of the present disclosure. The lossy conducting medium 203 makes up Region 1 (FIG. 2) according to one embodiment. In addition, a second medium 206 shares a boundary interface with the lossy conducting medium 203 and makes up Region 2 (FIG. 2). The polyphase waveguide probe 200 includes a probe coupling circuit 209 that couples an excitation source 213 to the charge terminals $T_1$ and $T_2$ as is discussed in greater detail with reference to later figures.

The charge terminals $T_1$ and $T_2$ are positioned over the lossy conducting medium 203. The charge terminal $T_1$ may be considered a capacitor, and the charge terminal $T_2$ may comprise a counterpoise or lower capacitor as is described herein. According to one embodiment, the charge terminal $T_1$ is positioned at height $H_1$, and the charge terminal $T_2$ is positioned directly below $T_1$ along the vertical axis z at height $H_2$, where $H_2$ is less than $H_1$. The height h of the transmission structure presented by the polyphase waveguide probe 200 is $h = H_1 - H_2$. Given the foregoing discussion, one can determine asymptotes of the radial Zenneck surface current on the surface of the lossy conducting medium $J_\rho(\rho)$ to be $J_1(\rho)$ close-in and $J_2(\rho)$ far-out, where $$\text{Close-in } (\rho < \lambda/8): J_\rho(\rho) \sim J_1 = \frac{I_1 + I_2}{2\pi\rho} + \frac{E_\rho^{QS}(Q_1) + E_\rho^{QS}(Q_2)}{Z_\rho}, \text{ and} \qquad (17)$$

$$\text{Far-out } (\rho \gg \lambda/8): J_\rho(\rho) \sim J_2 = \frac{j\gamma\omega Q_1}{4} \times \sqrt{\frac{2\gamma}{\pi}} \times \frac{e^{-(\alpha+j\beta)\rho}}{\sqrt{\rho}} \qquad (18)$$

where $I_1$ is the conduction current feeding the charge $Q_1$ on the first charge terminal $T_1$, and $I_2$ is the conduction current feeding the charge $Q_2$ on the second charge terminal $T_2$. The charge $Q_1$ on the upper charge terminal $T_1$ is determined by $Q_1 = C_1 V_1$, where $C_1$ is the isolated capacitance of the charge terminal $T_1$. Note that there is a third component to $J_1$ set forth above given by $$\frac{(E_\rho^{Q_1})}{Z_\rho},$$

which follows from the Leontovich boundary condition and is the radial current contribution in the lossy conducting medium 203 pumped by the quasi-static field of the elevated oscillating charge on the first charge terminal $Q_1$. The quantity $$Z_\rho = \frac{j\omega\mu_o}{\gamma_e}$$

is the radial impedance of the lossy conducting medium, where $\gamma_e = (j\omega\mu_1\sigma_1 - \psi^2\mu_1\varepsilon_1)^{1/2}$.

The asymptotes representing the radial current close-in and far-out as set forth by Equations (17) and (18) are complex quantities. According to various embodiments, a physical surface current, J(r), is synthesized to match as close as possible the current asymptotes in magnitude and phase. That is to say close-in, |J(r)| is to be tangent to |J₁|, and far-out |J(r)| is to be tangent to |J₂|. Also, according to the various embodiments, the phase of J(r) should transition from the phase of J₁ close-in to the phase of J₂ far-out.

According to one embodiment, if any of the various embodiments of a polyphase waveguide probe described herein are adjusted properly, this configuration will give at least an approximate magnitude and phase match to the Zenneck mode and launch Zenneck surface waves. It should be noted that the phase far-out, $\Phi_2$, is proportional to the propagation phase corresponding to $e^{-j\beta\rho}$ plus a fixed "phase boost" due to the phase of $\sqrt{\gamma}$ which is $\arg(\sqrt{\gamma})$, $$j\Phi_2(\rho) = -j\beta\rho + \arg(\sqrt{\gamma})$$

where $\gamma$ is expressed in Equation (9) above, and depending on the values for $\varepsilon_r$ and $\sigma$ at the site of transmission on the lossy conducting medium and the operating frequency f, $\arg(\sqrt{\gamma})$, which has two complex roots, is typically on the order of approximately 45° or 225°. Stated another way, in order to match the Zenneck surface wave mode at the site of transmission to launch a Zenneck surface wave, the phase of the surface current |J₂| far-out should differ from the phase of the surface current |J₁| close-in by the propagation phase corresponding to $e^{-j\beta(\rho_2-\rho_1)}$ plus a constant of approximately 45 degrees or 225 degrees. This is because there are two roots for $\sqrt{\gamma}$, one near $\pi/4$ and one near $5\pi/4$. The properly adjusted synthetic radial surface current is $$J_\rho(\rho, \phi, 0) = \frac{I_o \gamma}{4} H_1^{(2)}(-j\gamma\rho). \quad (20)$$

By Maxwell's equations, such a J(ρ) surface current automatically creates fields that conform to $$H_\phi = \frac{-\gamma I_o}{4} e^{-u_2 z} H_1^{(2)}(-j\gamma\rho), \quad (21)$$

$$E_\rho = \frac{-\gamma I_o}{4}\left(\frac{u_2}{j\omega\varepsilon_o}\right) e^{-u_2 z} H_1^{(2)}(-j\gamma\rho), \text{ and} \quad (22)$$

$$E_z = \frac{-\gamma I_o}{4}\left(\frac{-\gamma}{\omega\varepsilon_o}\right) e^{-u_2 z} H_0^{(2)}(-j\gamma\rho). \quad (23)$$

Thus, the difference in phase between the surface current |J₂| far-out and the surface current |J₁| close-in for the Zenneck surface wave mode that is to be matched is due to the inherent characteristics of the Hankel functions in Equations (20)-(23) set forth above. It is of significance to recognize that the fields expressed by Equations (1)-(6) and (20) have the nature of a transmission line mode bound to a lossy interface, not radiation fields such as are associated with groundwave propagation. See Barlow, H. M. and Brown, J., *Radio Surface Waves*, Oxford University Press, 1962, pp. 1-5. These fields automatically satisfy the complex Brewster angle requirement for zero reflection, which means that radiation is negligible, while surface guided wave propagation is dramatically enhanced, as is verified and supported in the experimental results provided below.

At this point, a review of the nature of the Hankel functions used in Equations (20)-(23) is provided with emphasis on a special property of these solutions of the wave equation. One might observe that the Hankel functions of the first and second kind and order n are defined as complex combinations of the standard Bessel functions of the first and second kinds $$H_n^{(1)}(x) = J_n(x) + jN_n(x) \text{ and} \quad (24)$$

$$H_n^{(2)}(x) = J_n(x) - jN_n(x) \quad (25)$$

These functions represent cylindrical waves propagating radially inward (superscript (1)) and outward (superscript (2)), respectively. The definition is analogous to the relationship $e^{\pm jx} = \cos x \pm j \sin x$. See, for example, Harrington, R. F., *Time-Harmonic Fields*, McGraw-Hill, 1961, pp. 460-463.

That $H_n^{(2)}(k_\rho\rho)$ is an outgoing wave is easily recognized from its large argument asymptotic behavior that is obtained directly from the series definitions of Jn(x) and Nn(x), $$H_n^{(2)}(x) \underset{x\to\infty}{\longrightarrow} \sqrt{\frac{2j}{\pi x}} j^n e^{-jx} \quad (26)$$

which, when multiplied by $e^{j\omega t}$, is an outward propagating cylindrical wave of the form $e^{j(\omega t - k\rho)}$ with a $1/\sqrt{\rho}$ spatial variation. The phase of the exponential component is $\psi = (\omega t - k\pi)$. It is also evident that $$H_n^{(2)}(x) \underset{x\to\infty}{\longrightarrow} j^n H_0^{(2)}(x), \quad (27)$$

and, a further useful property of Hankel functions is expressed by $$\frac{\partial H_0^{(2)}(x)}{\partial x} = -H_1^{(2)}(x), \quad (28)$$

which is described by Jahnke, E., and F. Emde, *Tables of Functions*, Dover, 1945, p. 145.

In addition, the small argument and large argument asymptotes of the outward propagating Hankel function are as follows:

$$H_1^{(2)}(x) \underset{x\to 0}{\longrightarrow} \frac{j2}{\pi x} \quad (29)$$

$$H_1^{(2)}(x) \underset{x\to\infty}{\longrightarrow} j\sqrt{\frac{2j}{\pi x}} e^{-jx} = \sqrt{\frac{2}{\pi x}} e^{-j\left(x-\frac{\pi}{2}-\frac{\pi}{4}\right)}. \quad (30)$$

Note that these asymptotic expressions are complex quantities. Also, unlike ordinary sinusoidal functions, the behavior of complex Hankel functions differs in-close and far-out from the origin. When x is a real quantity, Equations (29) and (30) differ in phase by $\sqrt{j}$, which corresponds to an extra phase advance or "phase boost" of 45° or, equivalently $\lambda/8$.

Figure 4:
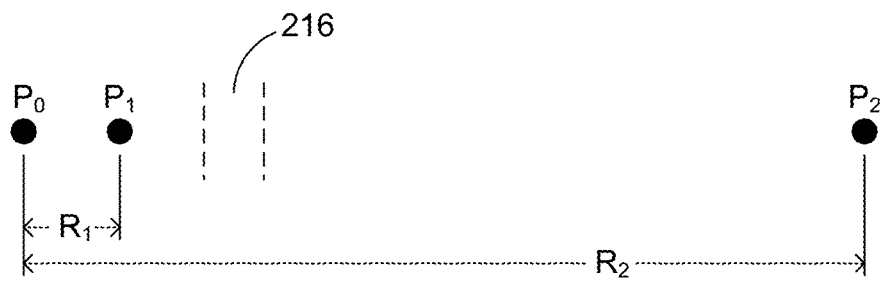
FIG. 4 is a drawing that provides one example illustration of a phase shift in a ground current that facilitates the launching of a guided surface-waveguide mode on a lossy conducting medium in the propagation interface of FIG. 3 according to an embodiment of the present disclosure.

With reference to FIG. 4, to further illustrate the phase transition between J₁ (FIGS. 3) and J₂ (FIG. 3) shown is an illustration of the phases of the surface currents J₁ close-in and J₂ far-out relative to a position of a polyphase waveguide probe 200 (FIG. 3). As shown in FIG. 4, there are three different observation points P₀, P₁, and P₂. A transition region is located between the observation point Pi and observation point $P_2$. The observation point $P_0$ is located at the position of the polyphase waveguide probe 200. The observation point $P_1$ is positioned "close-in" at a distance $R_1$ from the observation point $P_0$ that places the observation point $P_1$ between the transition region 216 and the observation point $P_0$. The observation point $P_2$ is positioned "far-out" at a distance $R_2$ from the observation point Po beyond the transition region 216 as shown.

At observation point $P_0$, the magnitude and phase of the radial current J is expressed as $|J_{P_0}|\angle\varphi_0$. At observation point $P_1$, the magnitude and phase of the radial current J is expressed as $|J_{P_1}|\angle\varphi_0-\beta R_1$, where the phase shift of $\beta R_1$ is attributable to the distance $R_1$ between the observation points $P_0$ and $P_1$. At observation point $P_2$, the magnitude and phase of the radial current J is expressed as $|J_{P_2}|\angle\varphi_0-\beta R_1+\varphi_A$ is attributable to the distance $R_2$ between the observation points $P_0$ and $P_2$ AND an additional phase shift that occurs in the transition region 216. The additional phase shift $\varphi_A$ occurs as a property of the Hankel function as mentioned above.

The foregoing reflects the fact that the polyphase waveguide probe 200 generates the surface current Ji close-in and then transitions to the $J_2$ current far-out. In the transition region 216, the phase of the Zenneck surface-waveguide mode transitions by approximately 45 degrees or ⅛λ. This transition or phase shift may be considered a "phase boost" as the phase of the Zenneck surface-waveguide mode appears to advance by 45 degrees in the transition region 216. The transition region 216 appears to occur somewhere less than 1/10 of a wavelength of the operating frequency.

Referring back to FIG. 3, according to one embodiment, a polyphase waveguide probe may be created that will launch the appropriate radial surface current distribution. According to one embodiment, a Zenneck waveguide mode is created in a radial direction. If the J(r) given by Equation (20) can be created, it will automatically launch Zenneck surface waves.

In addition, further discussion is provided regarding the charge images $Q_1'$ and $Q_2'$ of the charges $Q_1$ and $Q_2$ on the charge terminals $T_1$ and $T_2$ of one example polyphase waveguide probe shown in FIG. 3. Analysis with respect to the lossy conducting medium assumes the presence of induced effective image charges $Q_1'$ and $Q_2'$ beneath the polyphase waveguide probes coinciding with the charges $Q_1$ and $Q_2$ on the charge reservoirs $T_1$ and $T_2$ as described herein. Such image charges $Q_1'$ and $Q_2'$ must also be considered in the analysis. These image charges $Q_1'$ and $Q_2'$ are not merely 180° out of phase with the primary source charges $Q_1$ and $Q_2$ on the charge reservoirs $T_1$ and $T_2$, as they would be in the case of a perfect conductor. A lossy conducting medium such as, for example, a terrestrial medium presents phase shifted images. That is to say, the image charges $Q_1'$ and $Q_2'$ are at complex depths. For a discussion of complex images, reference is made to Wait, J. R., "Complex Image Theory—Revisited," *IEEE Antennas and Propagation Magazine*, Vol. 33, No. 4, August 1991, pp. 27-29, which is incorporated herein by reference in its entirety.

Instead of the image charges $Q_1'$ and $Q_2'$ being at a depth that is equal to the height of the charges $Q_1$ and $Q_2$ (i.e. $z_n^*=-h_n$), a conducting mirror 215 is placed at depth $z=-d/2$ and the image itself appears at a "complex distance" (i.e., the "distance" has both magnitude and phase), given by $z_n'=-D_n=-(d+h_n)\neq-h_n$, where n=1, 2, and for vertically polarized sources, $$d = \frac{2\sqrt{\gamma_e^2+k_o^2}}{\gamma_e^2} \approx \frac{2}{\gamma_e} = d_r + jd_i = |d|\angle\zeta, \quad (31)$$

where $$\gamma_e^2 = j\omega\mu_1\sigma_1-\omega^2\mu_1\varepsilon_1, \text{ and} \quad (32)$$

$$k_o = \omega\sqrt{\mu_o\varepsilon_o}. \quad (33)$$

The complex spacing of image charges $Q_1'$ and $Q_2'$, in turn, implies that the external fields will experience extra phase shifts not encountered when the interface is either a lossless dielectric or a perfect conductor. The essence of the lossy dielectric image-theory technique is to replace the finitely conducting Earth (or lossy dielectric) by a perfect conductor located at a complex depth, $z=-d/2$. Next, a source image is then located at a complex depth $D_n=d/2+d/2+h_n=d+h_n$, where n=1, 2. Thereafter, one can calculate the fields above ground ($z\geq0$) using a superposition of the physical charge (at $z=+h$) plus its image (at $z'=-D$). The charge images $Q_1'$ and $Q_2'$ at complex depths actually assist in obtaining the desired current phases specified in Equations (20) and (21) above.

From Equations (2) and (3) above, it is noted that the ratio of $E_2z$ to $E_{2\rho}$ in Region 2 is given by $$\frac{E_{2z}}{E_{2\rho}} = \frac{A\left(\frac{-\gamma}{\omega\varepsilon_o}\right)e^{-u_2z}H_0^{(2)}(-j\gamma\rho)}{A\left(\frac{u_2}{j\omega\varepsilon_o}\right)e^{-u_2z}H_1^{(2)}(-j\gamma\rho)} = \left(\frac{-j\gamma}{u_2}\right)\frac{H_0^{(2)}(-j\gamma\rho)}{H_1^{(2)}(-j\gamma\rho)}. \quad (34)$$

Also, it should be noted that asymptotically, $$H_n^{(2)}(x) \xrightarrow[x\to\infty]{} j^n H_0^{(2)}(x). \quad (35)$$

Consequently, it follows directly from Equations (2) and (3) that $$\frac{E_{2z}}{E_{2\rho}} = \sqrt{\varepsilon_r - jx} = n = \tan\psi_{i,B}, \quad (36)$$

where $\psi_{i,B}$ is the complex Brewster angle. By adjusting source distributions and synthesizing complex Brewster angle illumination at the surface of a lossy conducting medium 203, Zenneck surface waves may be excited.

Figure 5:
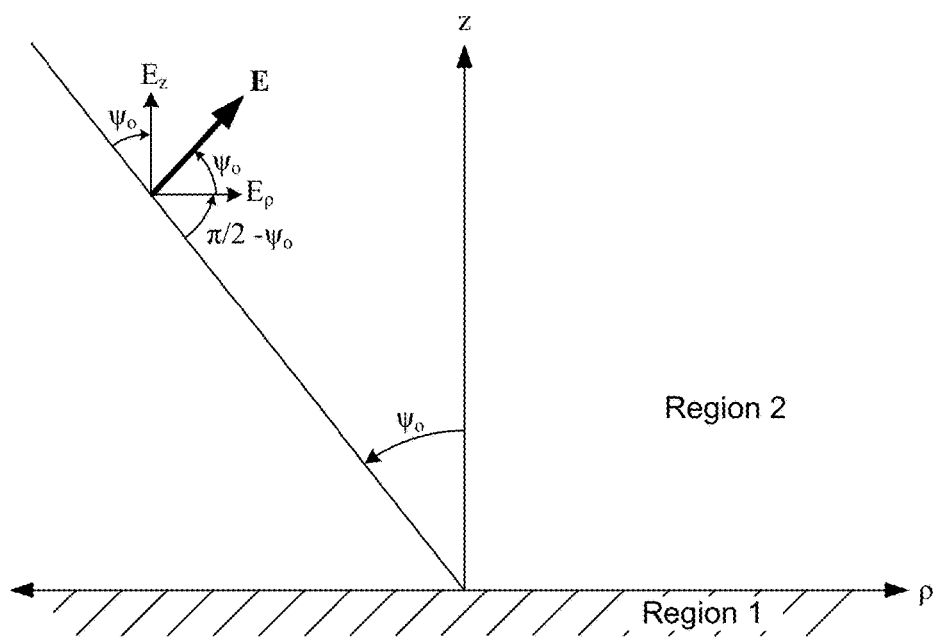
FIG. 5 is a drawing that illustrates a complex angle of insertion of an electric field synthesized by the polyphase waveguide probes according to the various embodiments of the present disclosure.

With reference to FIG. 5, shown is an incident field E polarized parallel to a plane of incidence. The electric field vector E is to be synthesized as an incoming non-uniform plane wave, polarized parallel to the plane of incidence. The electric field vector E may be created from independent horizontal and vertical components as:

$$\vec{E}(\theta_o) = E_\rho\hat{\rho}+E_z\hat{z}. \quad (37)$$

Geometrically, the illustration in FIG. 5 suggests:

$$E_\rho(\rho, z) = E(\rho, z)\cos\psi_o, \text{ and} \quad (38a)$$

$$E_z(\rho, z) = E(\rho, z)\cos\left(\frac{\pi}{2}-\psi_o\right) = E(\rho, z)\sin\psi_o, \quad (38b)$$

which means that the field ratio is $$\frac{E_z}{E_\rho} = \tan\psi_o. \qquad (39)$$

However, recall that from Equation (36), $$\tan\theta_{i,B} = \sqrt{\varepsilon_r - jx} \qquad (40)$$

so that, for a Zenneck surface wave, we desire $\psi=\theta_{i,B}$, which results in $$\frac{E_z}{E_\rho} = \tan\psi_o = \sqrt{\varepsilon_r - j\frac{\sigma}{\omega\varepsilon_o}}. \qquad (41)$$

The Equations mean that if one controls the magnitude of the complex field ratio and the relative phase between the incident vertical and horizontal components $E_z$ and $E_\rho$ in a plane parallel to the plane of incidence, then the synthesized E-field vector will effectively be made to be incident at a complex Brewster angle. Such a circumstance will synthetically excite a Zenneck surface wave over the interface between Region 1 and Region 2.

Figure 6:
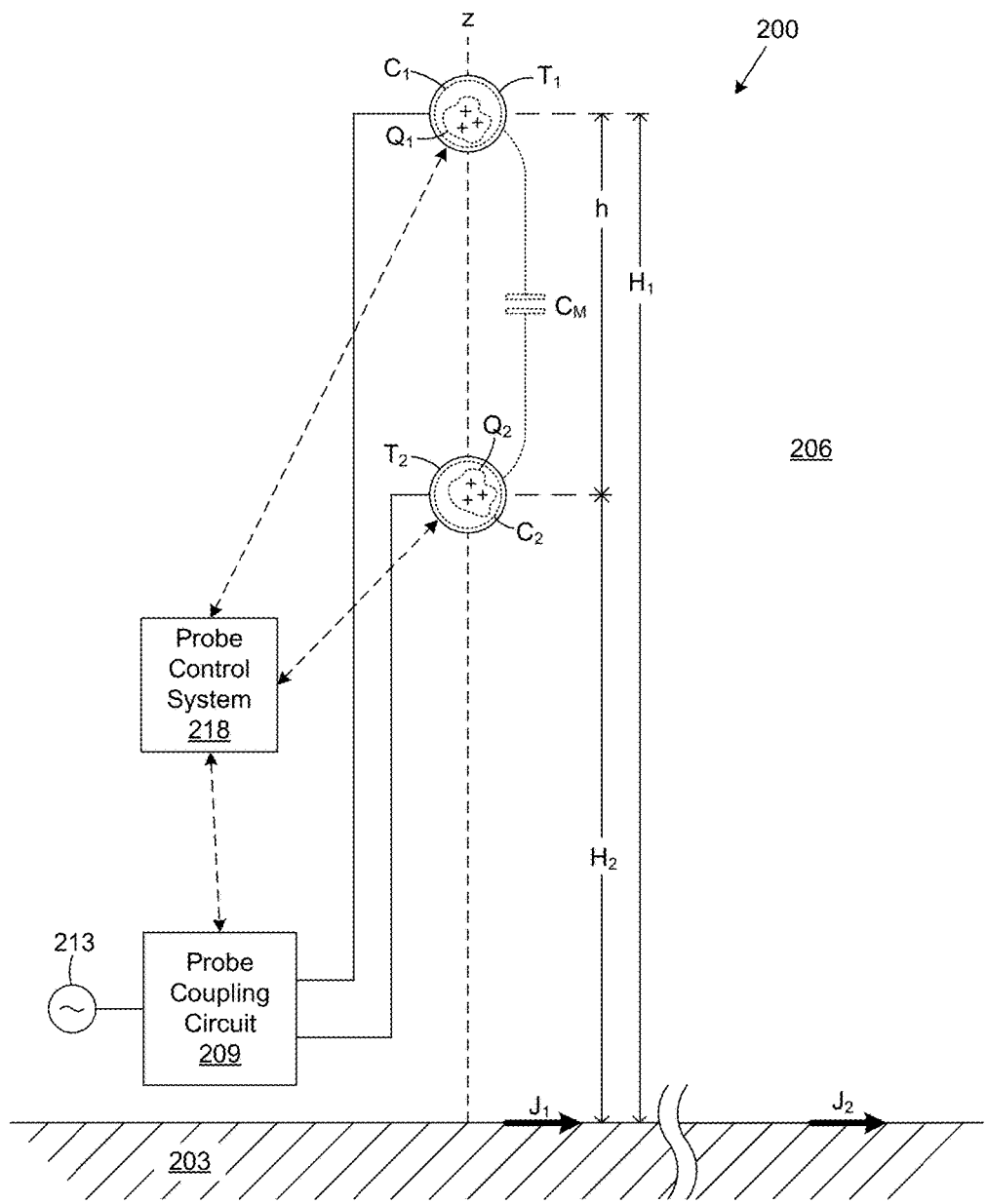
FIG. 6 is a schematic of a polyphase waveguide probe according to an embodiment of the present disclosure.

With reference to FIG. 6, shown is another view of the polyphase waveguide probe 200 disposed above a lossy conducting medium 203 according to an embodiment of the present disclosure. The lossy conducting medium 203 makes up Region 1 (FIG. 2) according to one embodiment. In addition, a second medium 206 shares a boundary interface with the lossy conducting medium 203 and makes up Region 2 (FIG. 2).

According to one embodiment, the lossy conducting medium 203 comprises a terrestrial medium such as the planet Earth. To this end, such a terrestrial medium comprises all structures or formations included thereon whether natural or man-made. For example, such a terrestrial medium may comprise natural elements such as rock, soil, sand, fresh water, sea water, trees, vegetation, and all other natural elements that make up our planet. In addition, such a terrestrial medium may comprise man-made elements such as concrete, asphalt, building materials, and other man-made materials. In other embodiments, the lossy conducting medium 203 may comprise some medium other than the Earth, whether naturally occurring or man-made. In other embodiments, the lossy conducting medium 203 may comprise other media such as man-made surfaces and structures such as automobiles, aircraft, man-made materials (such as plywood, plastic sheeting, or other materials) or other media.

In the case that the lossy conducting medium 203 comprises a terrestrial medium or Earth, the second medium 206 may comprise the atmosphere above the ground. As such, the atmosphere may be termed an "atmospheric medium" that comprises air and other elements that make up the atmosphere of the Earth. In addition, it is possible that the second medium 206 may comprise other media relative to the lossy conducting medium 203.

The polyphase waveguide probe 200 comprises a pair of charge terminals $T_1$ and $T_2$. Although two charge terminals $T_1$ and $T_2$ are shown, it is understood that there may be more than two charge terminals $T_1$ and $T_2$. According to one embodiment, the charge terminals $T_1$ and $T_2$ are positioned above the lossy conducting medium 203 along a vertical axis z that is normal to a plane presented by the lossy conducting medium 203. In this respect, the charge terminal $T_1$ is placed directly above the charge terminal $T_2$ although it is possible that some other arrangement of two or more charge terminals TN may be used. According to various embodiments, charges $Q_1$ and $Q_2$ may be imposed on the respective charge terminals $T_1$ and $T_2$.

The charge terminals $T_1$ and/or $T_2$ may comprise any conductive mass that can hold an electrical charge. The charge terminal $T_1$ has a self-capacitance $C_1$, and the charge terminal $T_2$ has a self-capacitance $C_2$. The charge terminals $T_1$ and/or $T_2$ may comprise any shape such as a sphere, a disk, a cylinder, a cone, a torus, a randomized shape, or any other shape. Also note that the charge terminals $T_1$ and $T_2$ need not be identical, but each can have a separate size and shape, and be comprises of different conducting materials. According to one embodiment, the shape of the charge terminal $T_1$ is specified to hold as much charge as practically possible. Ultimately, the field strength of a Zenneck surface wave launched by a polyphase waveguide probe 200 is directly proportional to the quantity of charge on the terminal $T_1$.

If the charge terminals $T_1$ and/or $T_2$ are spheres or disks, the respective self-capacitance $C_1$ and $C_2$ can be calculated. For example, the self-capacitance of an isolated conductive sphere is $C=4\pi\varepsilon_o r$, where r comprises the radius of the sphere in meters. The self-capacitance of an isolated disk is $C=8\varepsilon_o r$, where r comprises the radius of the disk in meters.

Thus, the charge $Q_1$ stored on the charge terminal $T_1$ may be calculated as $Q_1=C_1V$, given the self-capacitance $C_1$ of the charge reservoir $T_1$ and voltage V that is applied to the charge terminal $T_1$.

With further reference to FIG. 6, according to one embodiment, the polyphase waveguide probe 200 comprises a probe coupling circuit 209 that is coupled to the charge terminals $T_1$ and $T_2$. The probe coupling circuit 209 facilitates coupling the excitation source 213 to the charge terminals $T_1$ and $T_2$, and facilitates generating respective voltage magnitudes and phases on the charge terminals $T_1$ and $T_2$ for a given frequency of operation. If more than two charge terminals $T_N$ are employed, then the probe coupling circuit 209 would be configured to facilitate the generation of various voltage magnitudes and phases on the respective charge terminals $T_N$ relative to each other. In the embodiment of the polyphase waveguide probe 200, the probe coupling circuit 209 comprises various circuit configurations as will be described. In addition, a probe control system 218 is provided to control various parameters of the polyphase waveguide probe 200 as will be described.

In one embodiment, the probe coupling circuit 209 is specified so as to make the polyphase waveguide probe 200 electrically half-wave resonant. This imposes a voltage +V on a first one of the terminals $T_1$ or $T_2$, and a −V on the second one of the charge terminals $T_1$ or $T_2$ at any given time. In such case, the voltages on the respective charge terminals $T_1$ and $T_2$ are 180 degrees out of phase as can be appreciated. In the case that the voltages on the respective charge terminals $T_1$ and $T_2$ are 180 degrees out of phase, the largest voltage magnitude differential is experienced on the charge terminals $T_1$ and $T_2$. Alternatively, the probe coupling circuit 209 may be configured so that the phase differential between the charge terminals $T_1$ and $T_2$ is other than 180 degrees. To this end, the probe coupling circuit 209 may be adjusted to alter the voltage magnitudes and phases during adjustment of the polyphase waveguide probe 200.

By virtue of the placement of the charge terminal $T_1$ directly above the charge terminal $T_2$, a mutual capacitance $C_M$ is created between the charge terminals $T_1$ and $T_2$. Also, the charge terminal $T_1$ has self-capacitance $C_1$, and the charge terminal $T_2$ has a self-capacitance $C_2$ as mentioned above. There may also be a bound capacitance between the charge terminal $T_1$ and the lossy conducting medium 203, and a bound capacitance between the charge terminal $T_2$ and the lossy conducting medium 203, depending on the respective heights of the charge terminals $T_1$ and $T_2$. The mutual capacitance $C_M$ depends on the distance between the charge terminals $T_1$ and $T_2$.

Ultimately, the field strength generated by the polyphase waveguide probe 200 will be directly proportional to the magnitude of the charge $Q_1$ that is imposed on the upper terminal $T_1$. The charge $Q_1$ is, in turn, proportional to the self-capacitance $C_i$ associated with the charge terminal $T_1$ since $Q_1 = C_1 V$, where V is the voltage imposed on the charge terminal $T_1$.

According to one embodiment, an excitation source 213 is coupled to the probe coupling circuit 209 in order to apply a signal to the polyphase waveguide probe 200. The excitation source 213 may be any suitable electrical source such as a voltage or current source capable of generating the voltage or current at the operating frequency that is applied to the polyphase waveguide probe 200. To this end, the excitation source 213 may comprise, for example, a generator, a function generator, transmitter, or other electrical source.

In one embodiment, the excitation source 213 may be coupled to the polyphase waveguide probe 200 by way of magnetic coupling, capacitive coupling, or conductive (direct tap) coupling as will be described. In some embodiments, the probe coupling circuit 209 may be coupled to the lossy conducting medium 203. Also, in various embodiments, the excitation source 213 maybe coupled to the lossy conducting medium 203 as will be described.

In addition, it should be noted that, according to one embodiment, the polyphase waveguide probe 200 described herein has the property that its radiation resistance $R_r$ is very small or even negligible. One should recall that radiation resistance $R_r$ is the equivalent resistance that would dissipate the same amount of power that is ultimately radiated from an antenna. According to the various embodiments, the polyphase waveguide probe 200 launches a Zenneck surface wave that is a guided electromagnetic wave. According to the various embodiments, the polyphase waveguide probes described herein have little radiation resistance $R_r$ because the height of such polyphase waveguide probes is usually small relative to their operating wavelengths. Stated another way, according to one embodiment, the polyphase waveguide probes described herein are "electrically small." As contemplated herein, the phrase "electrically small" is defined as a structure such as the various embodiments of polyphase waveguide probes described herein that can be physically bounded by a sphere having a radius equal to $\lambda/2\pi$, where $\lambda$ is the free-space wavelength. See Fujimoto, K., A. Henderson, K. Hirasawa, and J. R. James, Small Antennas, *Wiley*, 1987, p. 4.

To discuss further, the radiation resistance $R_r$ for a short monopole antenna is expressed by $$R_r = 160\pi^2 \left(\frac{h}{\lambda}\right)^2 \quad (42)$$

where the short monopole antenna has a height h with a uniform current distribution, and where $\lambda$ is the wavelength at the frequency of operation. See Stutzman, W. L. et al., "*Antenna Theory and Design*," Wiley & Sons, 1981, p. 93.

Given that the value of the radiation resistance $R_r$ is determined as a function of $$\left(\frac{h}{\lambda}\right)^2,$$

it follows that if the height h of the structure is small relative to the wavelength of the operating signal at the operating frequency, then the radiation resistance $R_r$ will also be small. As one example, if the height h of the transmission structure is 10% of the wavelength of the operating signal at the operating frequency, then the resulting value of $$\left(\frac{h}{\lambda}\right)^2$$

would be $(0.1)^2 = 0.01$. It would follow that the radiation resistance $R_r$ is correspondingly small.

Thus, according to various embodiments, if the effective height h of the transmission structure is less than or equal to $$\frac{\lambda}{2\pi},$$

where $\lambda$ is the wavelength at the operating frequency, then the radiation resistance $R_r$ will be relatively small. For the various embodiments of polyphase waveguide probes 200 described below, the height h of the transmission structure may be calculated as $h = H_1 - H_2$, where $H_1$ is the height of the charge terminal $T_1$, and $H_2$ is the height of the charge terminal $T_2$. It should be appreciated that the height h of the transmission structure for each embodiment of the polyphase waveguide probes 200 described herein can be determined in a similar manner.

While $$\frac{\lambda}{2\pi}$$

is provided as one benchmark, it is understood that the ratio of the height h of the transmission structure over the wavelength of the operating signal at the operating frequency can be any value. However, it is understood that, at a given frequency of operation, as the height of a given transmission structure increases, the radiation resistance $R_r$ will increase accordingly.

Depending on the actual values for the height h and the wavelength of the operating signal at the operating frequency, it is possible that the radiation resistance $R_r$ may be of a value such that some amount of radiation may occur along with the launching of a Zenneck surface wave. To this end, the polyphase waveguide probe 200 can be constructed to have a short height h relative to the wavelength at the frequency of operation so as to ensure that little or substantially zero energy is lost in the form of radiation.

In addition, the placement of the charge reservoirs $T_1$ and $T_2$ along the vertical axis z provides for symmetry in the Zenneck surface wave that is launched by the polyphase waveguide probe 200 as described by the Hankel functions in Equations (20)-(23) set forth above. Although the polyphase waveguide probe 200 is shown with two charge reservoirs $T_1$ and $T_2$ along the vertical axis z that is normal to a plane making up the surface of the lossy conducting medium 203, it is understood that other configurations may be employed that will also provide for the desired symmetry. For example, additional charge reservoirs $T_N$ may be positioned along the vertical axis z, or some other arrangement may be employed. In some embodiments, symmetry of transmission may not be desired. In such case, the charge reservoirs $T_N$ may be arranged in a configuration other than along a vertical axis z to provide for an alternative transmission distribution pattern.

When properly adjusted to operate at a predefined operating frequency, the polyphase waveguide probe 200 generates a Zenneck surface wave along the surface of the lossy conducting medium 203. To this end, an excitation source 213 may be employed to generate electrical energy at a predefined frequency that is applied to the polyphase waveguide probe 200 to excite the structure. The energy from the excitation source 213 is transmitted in the form of a Zenneck surface wave by the polyphase waveguide probe 200 to one or more receivers that are also coupled to the lossy conducting medium 203 or that are located within an effective transmission range of the polyphase waveguide probe 200. The energy is thus conveyed in the form of a Zenneck surface wave which is a surface-waveguide mode or a guided electromagnetic field. In the context of modern power grids using high voltage lines, a Zenneck surface wave comprises a transmission line mode.

Thus, the Zenneck surface wave generated by the polyphase waveguide probe 200 is not a radiated wave, but a guided wave in the sense that these terms are described above. The Zenneck surface wave is launched by virtue of the fact that the polyphase waveguide probe 200 creates electromagnetic fields that are substantially mode-matched to a Zenneck surface wave mode on the surface of the lossy conducting medium 203. When the electromagnetic fields generated by the polyphase waveguide probe 200 are substantially mode-matched as such, the electromagnetic fields substantially synthesize a wave front incident at a complex Brewster angle of the lossy conducting medium 203 that results in little or no reflection. Note that if the polyphase waveguide probe 200 is not substantially mode-matched to the Zenneck surface wave mode, then a Zenneck surface wave will not be launched since the complex Brewster angle of the lossy conducting medium 203 would not have been attained.

In the case that the lossy conducting medium 203 comprises a terrestrial medium such as the Earth, the Zenneck surface wave mode will depend upon the dielectric permittivity $\varepsilon_r$ and conductivity a of the site at which the polyphase waveguide probe 200 is located as indicated above in Equations (1)-(11). Thus, the phase of the Hankel functions in Equations (20)-(23) above depends on these constitutive parameters at the launch site and on the frequency of operation.

In order to excite the fields associated with the Zenneck surface wave mode, according to one embodiment, the polyphase waveguide probe 200 substantially synthesizes the radial surface current density on the lossy conducting medium of the Zenneck surface wave mode as is expressed by Equation (20) set forth above. When this occurs, the electromagnetic fields are then substantially or approximately mode-matched to a Zenneck surface wave mode on the surface of the lossy conducting medium 203. To this end, the match should be as close as is practicable. According to one embodiment, this Zenneck surface wave mode to which the electromagnetic fields are substantially matched is expressed in Equations (21)-(23) set forth above.

In order to synthesize the radial surface current density in the lossy conducting medium of the Zenneck surface wave mode, the electrical characteristics of the polyphase waveguide probe 200 should be adjusted to impose appropriate voltage magnitudes and phases on the charge terminals $T_1$ and $T_2$ for a given frequency of operation and given the electrical properties of the site of transmission. If more than two charge terminals $T_N$ are employed, then appropriate voltage magnitudes and phases would need to be imposed on the respective charge terminals $T_N$, where N may even be a very large number effectively comprising a continuum of charge terminals.

In order to obtain the appropriate voltage magnitudes and phases for a given design of a polyphase waveguide probe 200 at a given location, an iterative approach may be used. Specifically, analysis may be performed of a given excitation and configuration of a polyphase waveguide probe 200 taking into account the feed currents to the terminals $T_1$ and $T_2$, the charges on the charge terminals $T_1$ and $T_2$, and their images in the lossy conducting medium 203 in order to determine the radial surface current density generated. This process may be performed iteratively until an optimal configuration and excitation for a given polyphase waveguide probe 200 is determined based on desired parameters. To aid in determining whether a given polyphase waveguide probe 200 is operating at an optimal level, a guided field strength curve 103 (FIG. 1) may be generated using Equations (1)-(11) above based on values for the conductivity of Region 1 ($\sigma_1$) and the permittivity of Region 1 ($\varepsilon_1$) at the location of the polyphase waveguide probe 200. Such a guided field strength curve 103 will provide a benchmark for operation such that measured field strengths can be compared with the magnitudes indicated by the guided field strength curve 103 to determine if optimal transmission has been achieved.

In order to arrive at an optimized polyphase waveguide probe 200, various parameters associated with the polyphase waveguide probe 200 may be adjusted. Stated another way, the various parameters associated with the polyphase waveguide probe 200 may be varied to adjust the polyphase waveguide probe 200 to a desired operating configuration.

One parameter that may be varied to adjust the polyphase waveguide probe 200 is the height of one or both of the charge terminals $T_1$ and/or $T_2$ relative to the surface of the lossy conducting medium 203. In addition, the distance or spacing between the charge terminals $T_1$ and $T_2$ may also be adjusted. In doing so, one may minimize or otherwise alter the mutual capacitance $C_M$ or any bound capacitances between the charge terminals $T_1$ and $T_2$ and the lossy conducting medium 203 as can be appreciated.

Alternatively, another parameter that can be adjusted is the size of the respective charge terminals $T_1$ and/or $T_2$. By changing the size of the charge terminals $T_2$ and/or $T_2$, one will alter the respective self-capacitances $C_1$ and/or $C_2$, and the mutual capacitance $C_M$ as can be appreciated. Also, any bound capacitances that exist between the charge terminals $T_1$ and $T_2$ and the lossy conducting medium 203 will be altered. In doing so, the voltage magnitudes and phases on the charge terminals $T_1$ and $T_2$ are altered.

Still further, another parameter that can be adjusted is the probe coupling circuit 209 associated with the polyphase waveguide probe 200. This may be accomplished by adjusting the size of the inductive and/or capacitive reactances that make up the probe coupling circuit 209. For example, where such inductive reactances comprise coils, the number of turns on such coils may be adjusted. Ultimately, the adjustments to the probe coupling circuit 209 can be made to alter the electrical length of the probe coupling circuit 209, thereby affecting the voltage magnitudes and phases on the charge terminals $T_1$ and $T_2$.

It is also the case that one can adjust the frequency of an excitation source 213 applied to the polyphase waveguide probe 200 to optimize the transmission of a Zenneck surface wave. However, if one wishes to transmit at a given frequency, other parameters would need to be adjusted to optimize transmission.

Note that the iterations of transmission performed by making the various adjustments may be implemented by using computer models or by adjusting physical structures as can be appreciated. In one approach, a field meter tuned to the transmission frequency may be placed an appropriate distance from the polyphase waveguide probe 200 and adjustments may be made as set forth above until a maximum or any other desired field strength of a resulting Zenneck surface wave is detected. To this end, the field strength may be compared with a guided field strength curve 103 (FIG. 1) generated at the desired operating frequency and voltages on the terminals $T_1$ and $T_2$. According to one approach, the appropriate distance for placement of such a field meter may be specified as greater than the transition region 216 (FIG. 4) in the "far-out" region described above where the surface current $J_2$ dominates.

By making the above adjustments, one can create corresponding "close-in" surface current $J_1$ and "far-out" surface current $J_2$ that approximate the same currents $J(r)$ of the Zenneck surface wave mode specified in Equations (17) and (18) set forth above. In doing so, the resulting electromagnetic fields would be substantially or approximately mode-matched to a Zenneck surface wave mode on the surface of the lossy conducting medium 203.

Referring next to FIGS. 7A through 7J, shown are additional examples of polyphase waveguide probes 200, denoted herein as polyphase waveguide probes 200a-j, according to various embodiments of the present disclosure. The polyphase waveguide probes 200a-j each include a different probe coupling circuit 209, denoted herein as probe coupling circuits 209a-j, according to various embodiments. While several examples of probe coupling circuits 209a-j are described, it is understood that these embodiments are merely examples and that there may be many other probe coupling circuits 209 not set forth herein that may be employed to provide for the desired voltage magnitudes and phases on the charge terminals $T_1$ and $T_2$ according to the principles set forth herein in order to facilitate the launching of Zenneck surface waves.

In addition, each of the probe coupling circuits 209a-j may employ, but are not limited to, inductive impedances comprising coils. Even though coils are used, it is understood that other circuit elements, both lumped and distributed, may be employed as reactances. Also, other circuit elements may be included in the probe coupling circuits 209a-j beyond those illustrated herein. In addition, it is noted that the various polyphase waveguide probes 200a-j with their respective probe coupling circuits 209a-j are merely described herein to provide examples. To this end, there may be many other polyphase waveguide probes 200 that employ various probe coupling circuits 209 and other circuitry that can be used to launch Zenneck surface waves according to the various principles set forth herein.

Figure 7A:
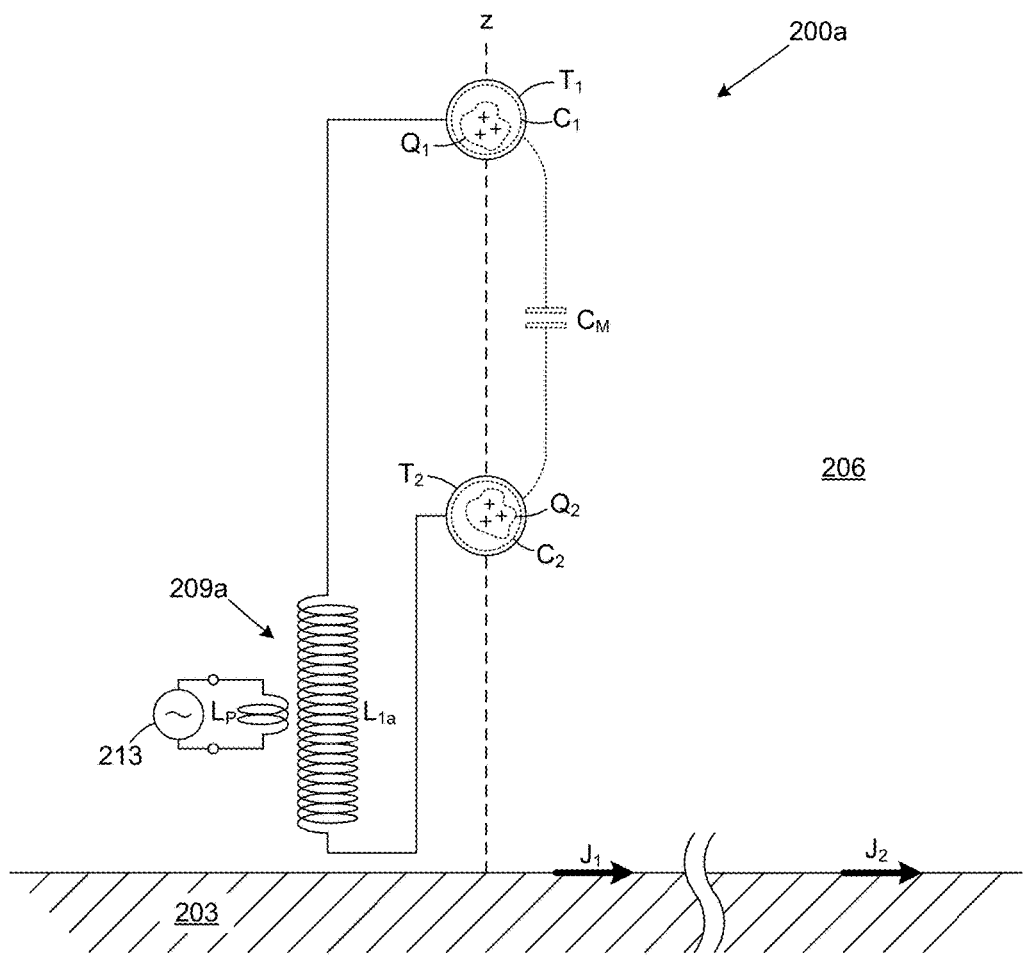
FIGS. 7A through 7J are schematics of specific examples of the polyphase waveguide probe of FIG. 6 according to various embodiments of the present disclosure.

Referring now to FIG. 7A, shown is a first example of the polyphase waveguide probe 200 (FIG. 6), denoted herein as polyphase waveguide probe 200a, according to one embodiment. The polyphase waveguide probe 200a includes the charge terminals $T_1$ and $T_2$ that are positioned along a vertical axis z that is substantially normal to the plane presented by the lossy conducting medium 203. The second medium 206 is above the lossy conducting medium 203. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200a includes a probe coupling circuit 209a that comprises an inductive impedance comprising a coil Lia having a pair of leads that are coupled to respective ones of the charge terminals $T_1$ and $T_2$. In one embodiment, the coil $L_{1a}$ is specified to have an electrical length that is one-half (½) of the wavelength at the operating frequency of the polyphase waveguide probe 200a.

While the electrical length of the coil $L_{1a}$ is specified as approximately one-half (½) the wavelength at the operating frequency, it is understood that the coil $L_{1a}$ may be specified with an electrical length at other values. According to one embodiment, the fact that the coil $L_{1a}$ has an electrical length of approximately one-half the wavelength at the operating frequency provides for an advantage in that a maximum voltage differential is created on the charge terminals $T_1$ and $T_2$. Nonetheless, the length or diameter of the coil $L_{1a}$ may be increased or decreased when adjusting the polyphase waveguide probe 200a to obtain optimal excitation of a Zenneck surface wave mode. Alternatively, it may be the case that the inductive impedance is specified to have an electrical length that is significantly less than or greater than ½ the wavelength at the operating frequency of the polyphase waveguide probe 200a.

According to one embodiment, the excitation source 213 is coupled to the probe coupling circuit 209 by way of magnetic coupling. Specifically, the excitation source 213 is coupled to a coil $L_P$ that is inductively coupled to the coil $L_{1a}$. This may be done by link coupling, a tapped coil, a variable reactance, or other coupling approach as can be appreciated. To this end, the coil $L_P$ acts as a primary, and the coil $L_{1a}$ acts as a secondary as can be appreciated.

In order to adjust the polyphase waveguide probe 200a for the transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of the coil $L_{1a}$ may be altered by adding or eliminating turns or by changing some other dimension of the coil $L_{1a}$.

Based on experimentation with the polyphase waveguide probe 200a, this appears to be the easiest of the polyphase waveguide probes 200a-j to adjust and to operate to achieve a desired efficiency.

Figure 7B:
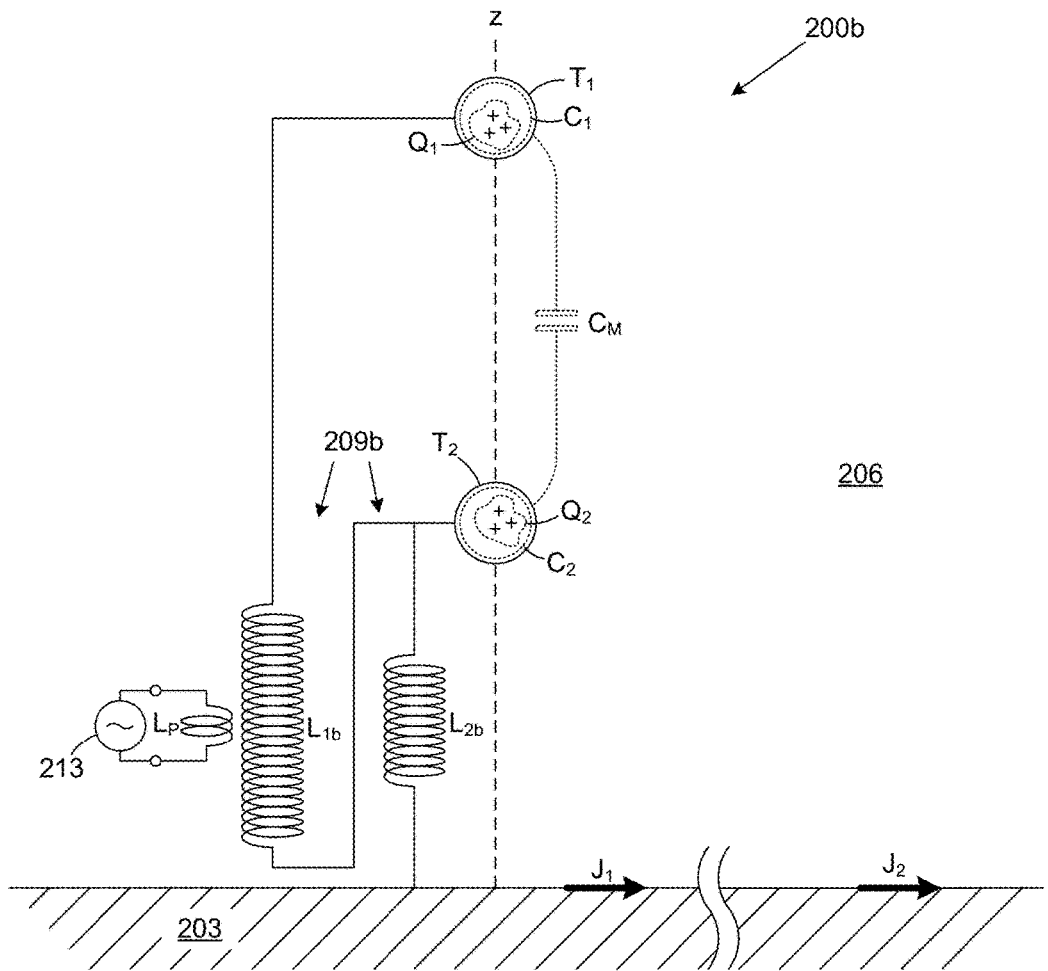

Referring now to FIG. 7B, shown is an example of the polyphase waveguide probe 200 (FIG. 6), denoted herein as polyphase waveguide probe 200b, according to one embodiment. The polyphase waveguide probe 200b includes the charge terminals $T_1$ and $T_2$ that are positioned along a vertical axis z that is substantially normal to the plane presented by the lossy conducting medium 203. The second medium 206 is above the lossy conducting medium 203. The charge terminals $T_1$ and $T_2$ are positioned along a vertical axis z to provide for cylindrical symmetry in the resulting Zenneck surface wave as was described above. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200b also includes a probe coupling circuit 209b comprising a first coil $L_{1b}$ and a second coil $L_{2b}$. The first coil $L_{1b}$ is coupled to each of the charge terminals $T_1$ and $T_2$ as shown. The second coil L2b is coupled to the charge terminal $T_2$ and to the lossy conducting medium 203.

The excitation source 213 is magnetically coupled to the probe coupling circuit 209b in a manner similar as was mentioned with respect to the polyphase waveguide probe 200a (FIG. 7A) set forth above. To this end, the excitation source 213 is coupled to a coil $L_P$ that acts as a primary and the coil $L_{1b}$ acts as a secondary. Alternatively, the coil $L_{2b}$ may act as a secondary as well.

In order to adjust the polyphase waveguide probe 200b for the transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of each of the coils $L_{1b}$ and L2b may be altered by adding or eliminating turns or by changing some other dimension of the respective coils $L_{1b}$ or $L_{2b}$.

Figure 7C:
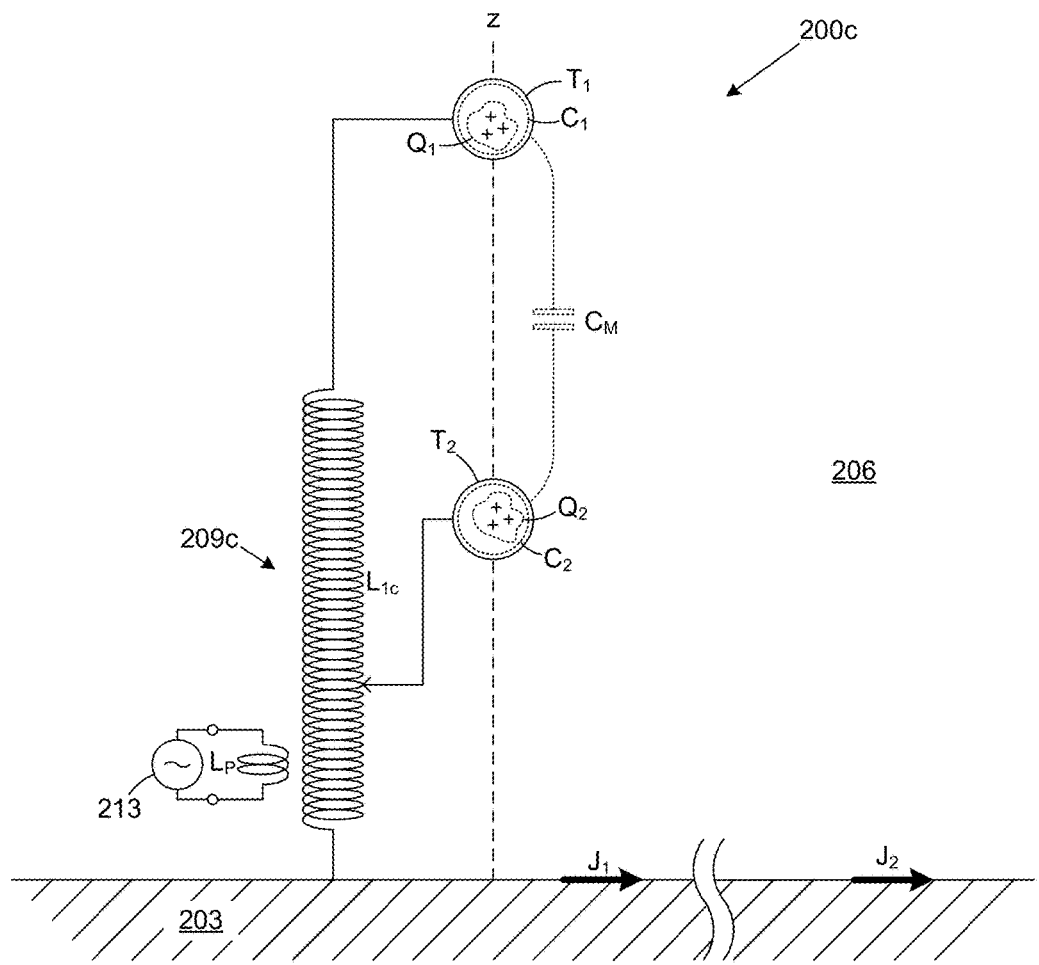

Referring now to FIG. 7C, shown is another example of the polyphase waveguide probe 200 (FIG. 6), denoted herein as polyphase waveguide probe 200c, according to one embodiment. The polyphase waveguide probe 200c includes the charge terminals $T_1$ and $T_2$ that are positioned along a vertical axis z that is substantially normal to the plane presented by the lossy conducting medium 203. The second medium 206 is above the lossy conducting medium 203. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200c also includes a probe coupling circuit 209c comprising a coil $L_{1c}$. One end of the coil $L_{1c}$ is coupled to the charge terminal $T_1$ as shown. The second end of the coil $L_{1c}$ is coupled to the lossy conducting medium 203. A tap that is coupled to the charge terminal $T_2$ is positioned along the coil $L_{1c}$.

The excitation source 213 is magnetically coupled to the probe coupling circuit 209c in a manner similar as was mentioned with respect to the polyphase waveguide probe 200a (FIG. 7A) set forth above. To this end, the excitation source 213 is coupled to a coil LP that acts as a primary and the coil $L_{1c}$ acts as a secondary. The coil LP can be positioned at any location along the coil $L_{1c}$.

In order to adjust the polyphase waveguide probe 200c for the excitation and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of the coil $L_{1c}$ may be altered by adding or eliminating turns, or by changing some other dimension of the coil $L_{1c}$. In addition, the inductance presented by the portions of the coil $L_{1c}$ above and below the tap may be adjusted by moving the position of the tap.

Figure 7D:
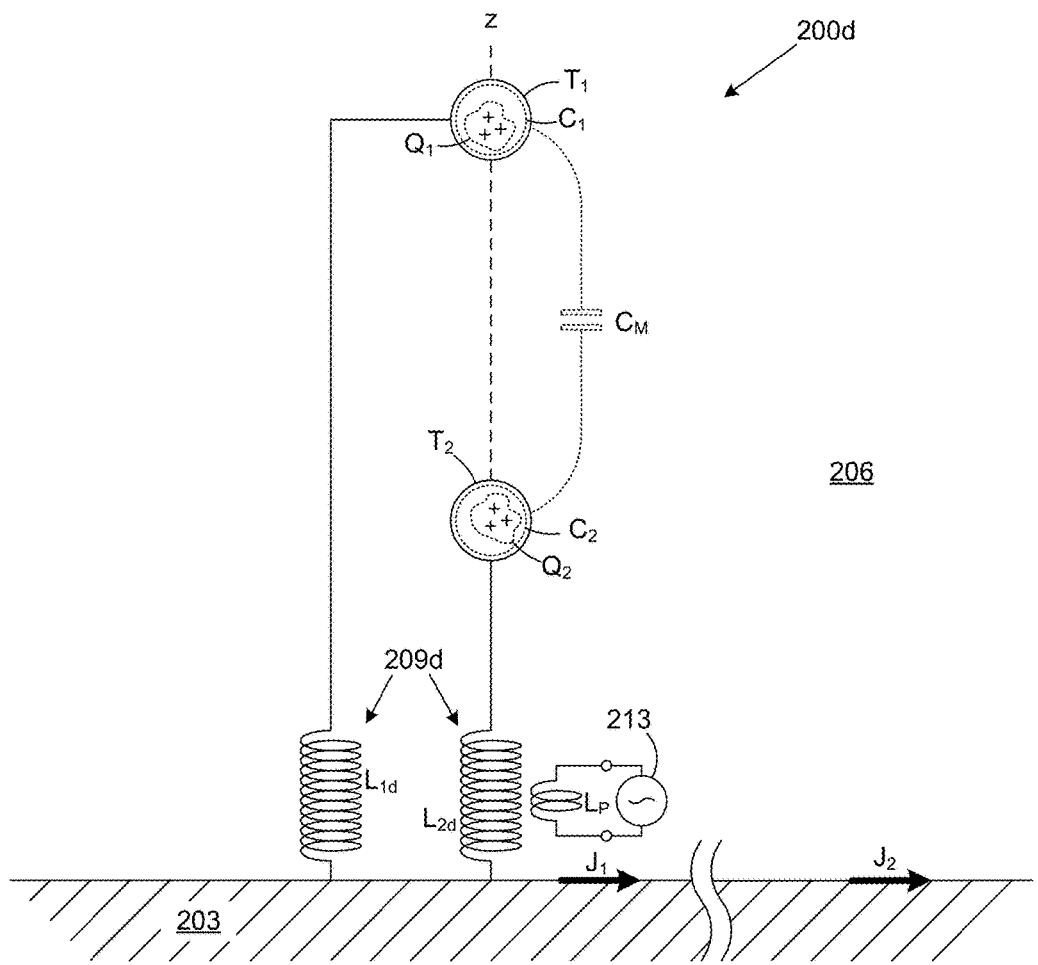

Referring now to FIG. 7D, shown is yet another example of the polyphase waveguide probe 200 (FIG. 6), denoted herein as polyphase waveguide probe 200d, according to one embodiment. The polyphase waveguide probe 200d includes the charge terminals $T_1$ and $T_2$ that are positioned along a vertical axis z that is substantially normal to the plane presented by the lossy conducting medium 203. The second medium 206 is above the lossy conducting medium 203. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200d also includes a probe coupling circuit 209d comprising a first coil Lid and a second coil $L_{2d}$. A first lead of the first coil Lid is coupled to the charge terminal $T_1$, and the second lead of the first coil $L_{1d}$ is coupled to the lossy conducting medium 203. A first lead of the second coil $L_{2d}$ is coupled to the charge terminal $T_2$, and the second lead of the second coil $L_{2d}$ is coupled to the lossy conducting medium 203.

The excitation source 213 is magnetically coupled to the probe coupling circuit 209d in a manner similar as was mentioned with respect to the polyphase waveguide probe 200a (FIG. 7A) set forth above. To this end, the excitation source 213 is coupled to a coil LP that acts as a primary and the coil $L_{2d}$ acts as a secondary. Alternatively, the coil $L_{1d}$ may act as a secondary as well.

In order to adjust the polyphase waveguide probe 200d for the excitation and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of each of the coils $L_{1d}$ and $L_{2d}$ may be altered by adding or eliminating turns or by changing some other dimension of the respective coils $L_{1d}$ or $L_{2d}$.

Figure 7E:
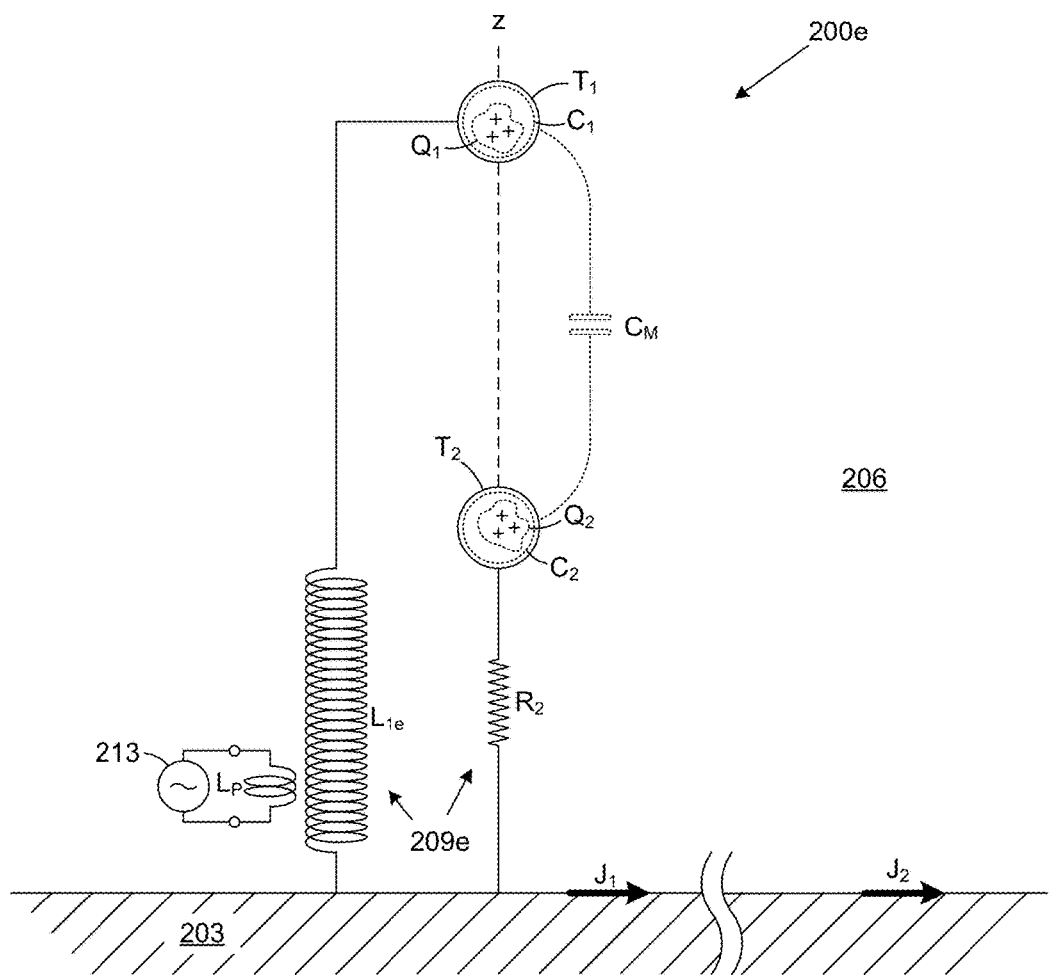

Referring now to FIG. 7E, shown is still another example of the polyphase waveguide probe 200 (FIG. 6), denoted herein as polyphase waveguide probe 200e, according to one embodiment. The polyphase waveguide probe 200e includes the charge terminals $T_1$ and $T_2$ that are positioned along a vertical axis z that is substantially normal to the plane presented by the lossy conducting medium 203. The second medium 206 is above the lossy conducting medium 203. The charge terminals $T_1$ and $T_2$ are positioned along a vertical axis z to provide for cylindrical symmetry in the resulting Zenneck surface wave as was described above. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200e also includes a probe coupling circuit 209e comprising a first coil Lie and a resistor $R_2$. A first lead of the first coil $L_{1e}$ is coupled to the charge terminal $T_1$, and the second lead of the first coil $L_{1e}$ is coupled to the lossy conducting medium 203. A first lead of the resistor $R_2$ is coupled to the charge terminal $T_2$, and the second lead of the resistor $R_2$ is coupled to the lossy conducting medium 203.

The excitation source 213 is magnetically coupled to the probe coupling circuit 209e in a manner similar as was mentioned with respect to the polyphase waveguide probe 200a (FIG. 7A) set forth above. To this end, the excitation source 213 is coupled to a coil $L_P$ that acts as a primary and the coil $L_{1e}$ acts as a secondary.

In order to adjust the polyphase waveguide probe 200e for the transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of the coil $L_{1e}$ may be altered by adding or eliminating turns or by changing some other dimension of the respective coils $L_{1e}$. In addition, the magnitude of the resistance $R_2$ may be adjusted as well.

Figure 7F:
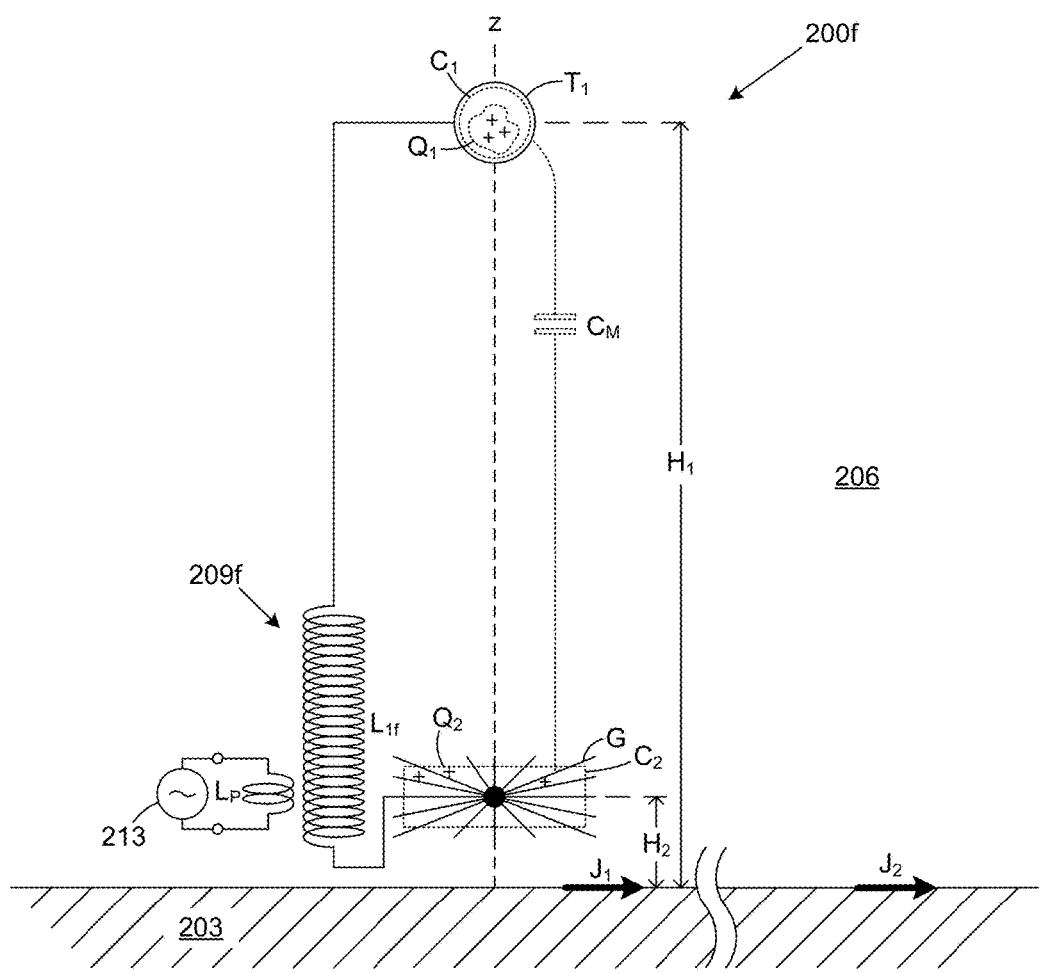

Referring now to FIG. 7F, shown is a further example of the polyphase waveguide probe 200 (FIG. 6), denoted herein as polyphase waveguide probe 200f, according to one embodiment. The polyphase waveguide probe 200f includes a charge terminal $T_1$ and a ground screen G that acts as a second charge terminal. The charge terminal $T_1$ and the ground screen G are positioned along a vertical axis z that is substantially normal to the plane presented by the lossy conducting medium 203. The second medium 206 is above the lossy conducting medium 203. Note that to calculate the height h of the transmission structure, the height $H_2$ of the ground screen G is subtracted from the height $H_1$ of the charge terminal $T_1$.

The charge terminal $T_1$ has a self-capacitance $C_1$, and the ground screen G has a self-capacitance $C_2$. During operation, charges $Q_1$ and $Q_2$ are imposed on the charge terminal $T_1$ and the ground screen G, respectively, depending on the voltages applied to the charge terminal $T_1$ and the ground screen G at any given instant. A mutual capacitance $C_M$ may exist between the charge terminal $T_1$ and the ground screen G depending on the distance there between. In addition, bound capacitances may exist between the charge terminal $T_1$ and/or the ground screen G and the lossy conducting medium 203 depending on the heights of the charge terminal $T_1$ and the ground screen G with respect to the lossy conducting medium 203. Generally, a bound capacitance will exist between the ground screen G and the lossy conducting medium 203 due to its proximity to the lossy conducting medium 203.

The polyphase waveguide probe 200f includes a probe coupling circuit 209f that is made up of an inductive impedance comprising a coil $L_{1f}$ having a pair of leads that are coupled to the charge terminal $T_1$ and ground screen G. In one embodiment, the coil $L_{1f}$ is specified to have an electrical length that is one-half (½) of the wavelength at the operating frequency of the polyphase waveguide probe 200f.

While the electrical length of the coil $L_{1f}$ is specified as approximately one-half (½) the wavelength at the operating frequency, it is understood that the coil $L_{1f}$ may be specified with an electrical length at other values. According to one embodiment, the fact that the coil $L_{1f}$ has an electrical length of approximately one-half the wavelength at the operating frequency provides for an advantage in that a maximum voltage differential is created on the charge terminal $T_1$ and the ground screen G. Nonetheless, the length or diameter of the coil $L_{1f}$ may be increased or decreased when adjusting the polyphase waveguide probe 200f to obtain optimal transmission of a Zenneck surface wave. Alternatively, it may be the case that the inductive impedance is specified to have an electrical length that is significantly less than or greater than ½ the wavelength at the operating frequency of the polyphase waveguide probe 200f.

According to one embodiment, the excitation source 213 is coupled to the probe coupling circuit 209f by way of magnetic coupling. Specifically, the excitation source 213 is coupled to a coil $L_P$ that is inductively coupled to the coil $L_{1f}$. This may be done by link coupling, a phasor/coupling network, or other approach as can be appreciated. To this end, the coil $L_P$ acts as a primary, and the coil $L_{1f}$ acts as a secondary as can be appreciated.

In order to adjust the polyphase waveguide probe 200a for the launching and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of the coil $L_{1f}$ may be altered by adding or eliminating turns or by changing some other dimension of the coil $L_{1f}$.

Figure 7G:
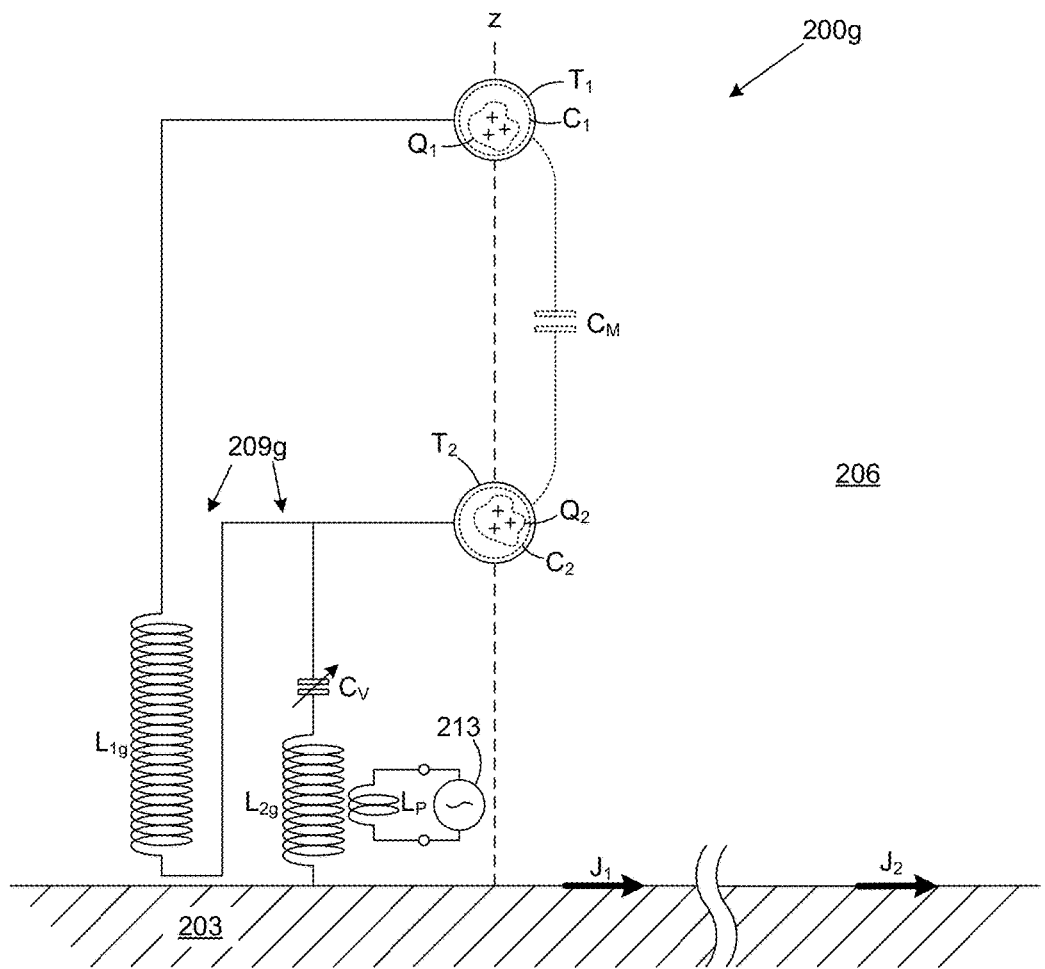

Referring now to FIG. 7G, shown is another example of the polyphase waveguide probe 200 (FIG. 6), denoted herein as polyphase waveguide probe 200g, according to one embodiment. The polyphase waveguide probe 200g includes the charge terminals $T_1$ and $T_2$ that are positioned along a vertical axis z that is substantially normal to the plane presented by the lossy conducting medium 203. The second medium 206 is above the lossy conducting medium 203. The charge terminals $T_1$ and $T_2$ are positioned along a vertical axis z to provide for cylindrical symmetry in the resulting Zenneck surface wave as was described above. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200g also includes a probe coupling circuit 209g comprising a first coil $L_{1g}$, a second coil $L_{2g}$, and a variable capacitor $C_v$. The first coil $L_{1g}$ is coupled to each of the charge terminals $T_1$ and $T_2$ as shown. The second coil $L_{2g}$ has a first lead that is coupled to a variable capacitor $C_v$ and a second lead that is coupled to the lossy conducting medium 203. The variable capacitor $C_v$, in turn, is coupled to the charge terminal $T_2$ and the first coil $L_{1g}$.

The excitation source 213 is magnetically coupled to the probe coupling circuit 209g in a manner similar as was mentioned with respect to the polyphase waveguide probe 200a (FIG. 7A) set forth above. To this end, the excitation source 213 is coupled to a coil LP that acts as a primary and either the coil $L_{1g}$ or the coil $L_{2g}$ may act as a secondary.

In order to adjust the polyphase waveguide probe 200g for the launching and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of each of the coils $L_{1g}$ and $L_{2g}$ may be altered by adding or eliminating turns or by changing some other dimension of the respective coils $L_{1g}$ and $L_{2g}$. In addition, the variable capacitance Cv may be adjusted.

Figure 7H:
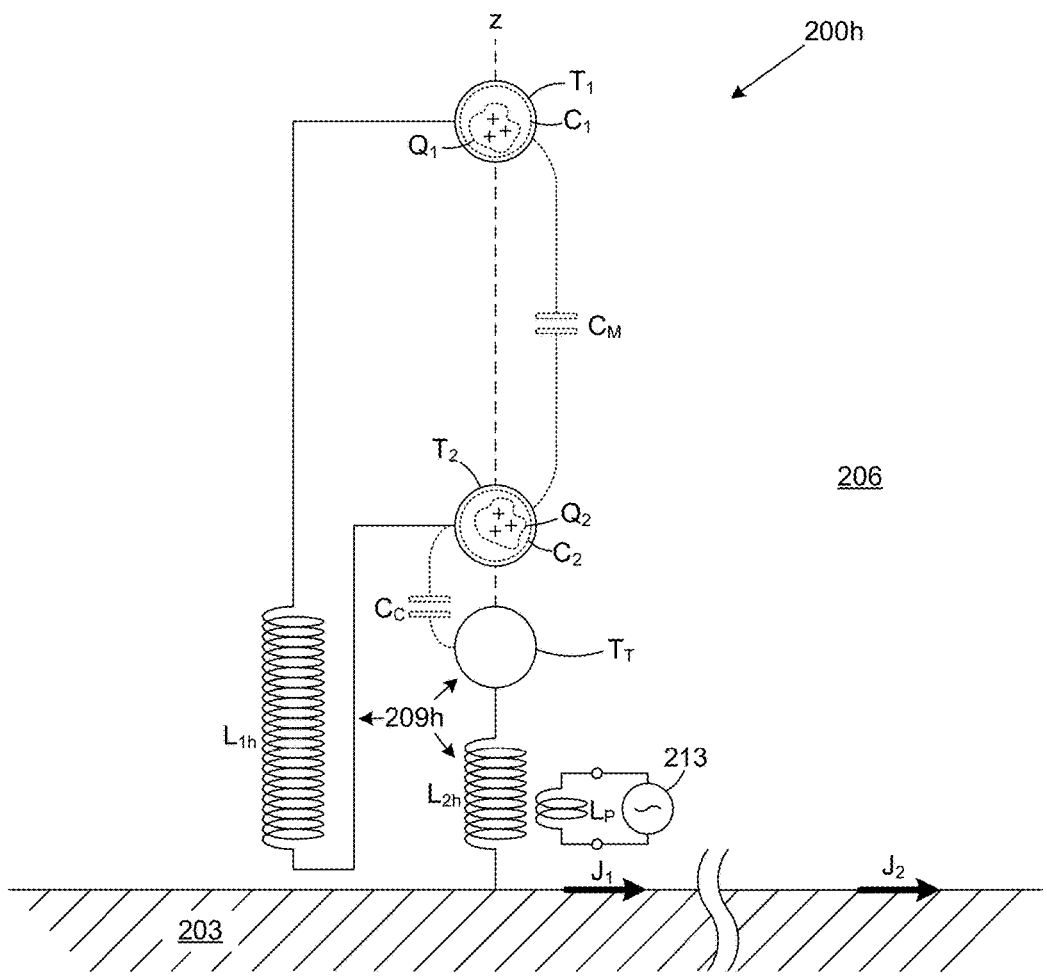

Referring now to FIG. 7H, shown is yet another example of the polyphase waveguide probe 200 (FIG. 6), denoted herein as polyphase waveguide probe 200h, according to one embodiment. The polyphase waveguide probe 200h includes the charge terminals $T_1$ and $T_2$ that are positioned along a vertical axis z that is substantially normal to the plane presented by the lossy conducting medium 203. The second medium 206 is above the lossy conducting medium 203. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200h also includes a probe coupling circuit 209h comprising a first coil Lin and a second coil $L_{2h}$. The first lead of the first coil $L_{1h}$ is coupled to the charge terminal $T_1$, and the second lead of the first coil $L_{1h}$ is coupled to the second charge terminal $T_2$. A first lead of the second coil $L_{2h}$ is coupled to a terminal $T_T$, and the second lead of the second coil $L_{2h}$ is coupled to the lossy conducting medium 203. The terminal $T_T$ is positioned relative to the charge terminal $T_2$ such that a coupling capacitance Cc exists between the charge terminal $T_2$ and the terminal $T_T$.

The excitation source 213 is magnetically coupled to the probe coupling circuit 209h in a manner similar as was mentioned with respect to the polyphase waveguide probe 200a (FIG. 7A) set forth above. To this end, the excitation source 213 is coupled to a coil LP that acts as a primary and the coil $L_{2h}$ acts as a secondary. Alternatively, the coil $L_{1h}$ may act as a secondary as well.

In order to adjust the polyphase waveguide probe 200h for the launching and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of each of the coils $L_{1h}$ and $L_{2h}$ may be altered by adding or eliminating turns or by changing some other dimension of the respective coils $L_{1h}$ or $L_{2h}$. Also the spacing between the charge terminal $T_2$ and the terminal $T_T$ may be altered, thereby modifying the coupling capacitance $C_c$ as can be appreciated.

Figure 7I:
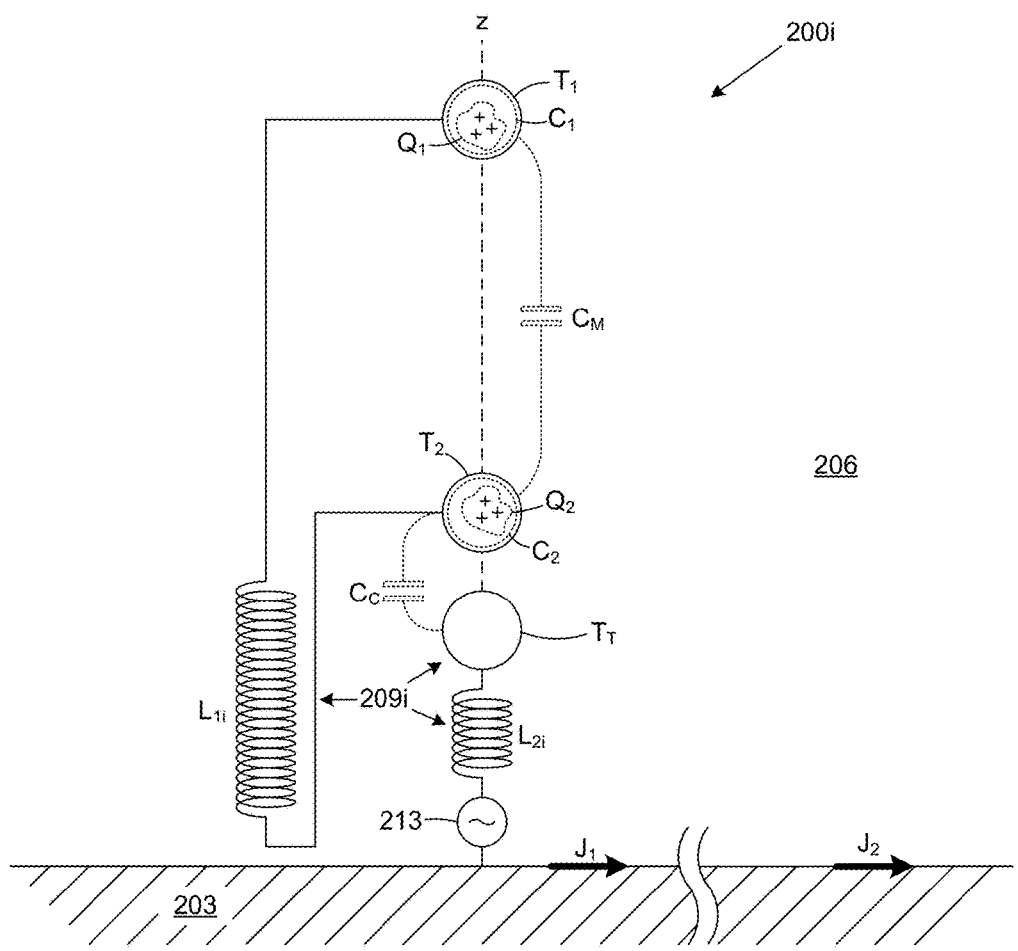

Referring now to FIG. 7I, shown is yet another example of the polyphase waveguide probe 200 (FIG. 6), denoted herein as polyphase waveguide probe 200i, according to one embodiment. The polyphase waveguide probe 200i is very similar to the polyphase waveguide probe 200h (FIG. 7H) except for the fact that the excitation source 213 is series-coupled to the probe coupling circuit 209i as will be described.

To this end, the polyphase waveguide probe 200i includes the charge terminals $T_1$ and $T_2$ that are positioned along a vertical axis z that is substantially normal to the plane presented by the lossy conducting medium 203. The second medium 206 is above the lossy conducting medium 203. The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200i also includes a probe coupling circuit 209i comprising a first coil $L_{1i}$ and a second coil $L_{2i}$. The first lead of the first coil $L_{1i}$ is coupled to the charge terminal $T_1$, and the second lead of the first coil $L_{1i}$ is coupled to the second charge terminal $T_2$. A first lead of the second coil $L_{2i}$ is coupled to a terminal $T_T$, and the second lead of the second coil $L_{2i}$ is coupled to an output of the excitation source 213. Also, a ground lead of the excitation source 213 is coupled to the lossy conducting medium 203. The terminal $T_T$ is positioned relative to the charge terminal $T_2$ such that a coupling capacitance Cc exists between the charge terminal $T_2$ and the terminal $T_T$.

The polyphase waveguide probe 200i provides one example where the excitation source 213 is series-coupled to the probe coupling circuit 209i as mentioned above. Specifically, the excitation source 213 is coupled between the coil $L_{2i}$ and the lossy conducting medium 203.

In order to adjust the polyphase waveguide probe 200i for the launching and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of each of the coils $L_{1i}$ and $L_{2i}$ may be altered by adding or eliminating turns or by changing some other dimension of the respective coils $L_{1i}$ and $L_{2i}$. Also the spacing between the charge terminal $T_2$ and the terminal $T_T$ may be altered, thereby modifying the coupling capacitance $C_c$ as can be appreciated.

Figure 7J:
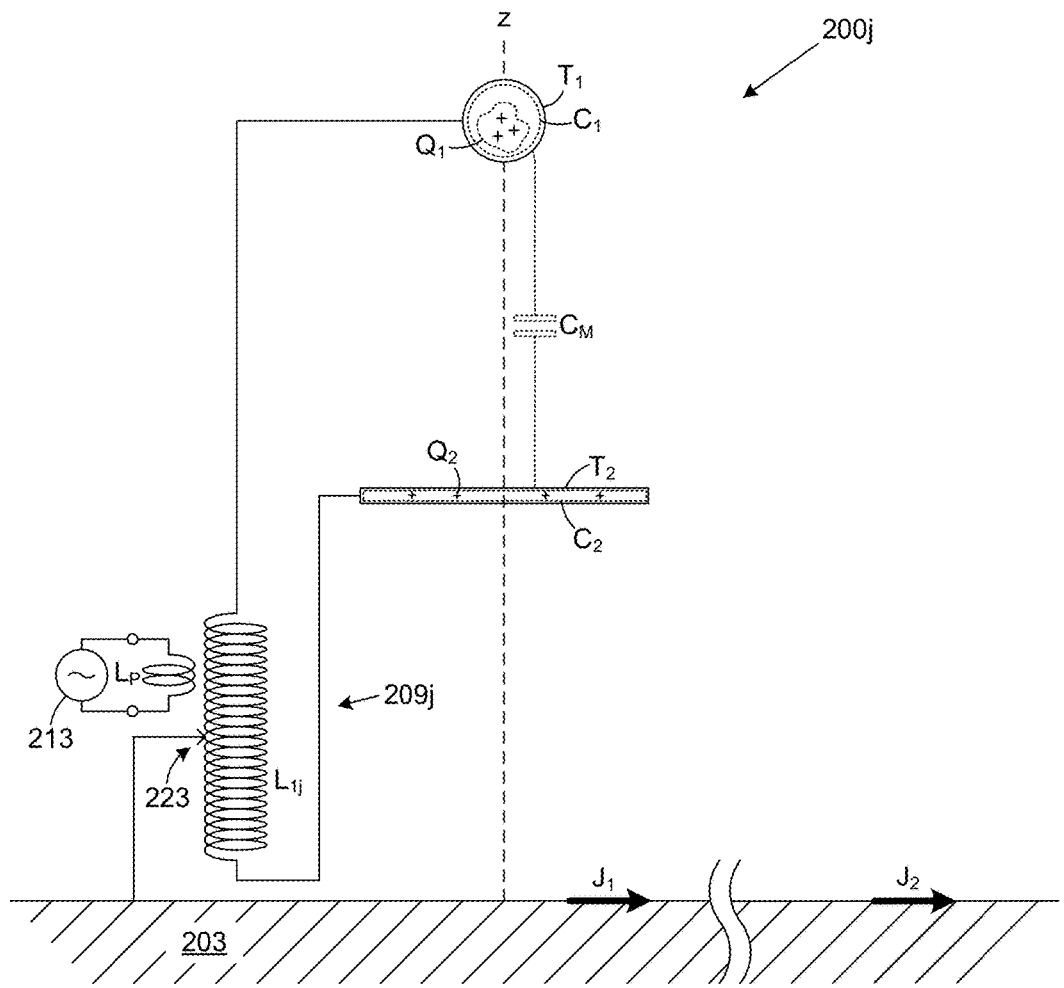

Referring now to FIG. 7J, shown is an example of the polyphase waveguide probe 200 (FIG. 6), denoted herein as polyphase waveguide probe 200j, according to one embodiment. The polyphase waveguide probe 200j includes the charge terminals $T_1$ and $T_2$ that are positioned along a vertical axis z that is substantially normal to the plane presented by the lossy conducting medium 203. The second medium 206 is above the lossy conducting medium 203. In this embodiment, the charge terminal $T_1$ comprises a sphere and the charge terminal $T_2$ comprises a disk. In this respect, the polyphase waveguide probe 200j provides an illustration that the charge terminals $T_N$ may comprise any shape.

The charge terminal $T_1$ has a self-capacitance $C_1$, and the charge terminal $T_2$ has a self-capacitance $C_2$. During operation, charges $Q_1$ and $Q_2$ are imposed on the charge terminals $T_1$ and $T_2$, respectively, depending on the voltages applied to the charge terminals $T_1$ and $T_2$ at any given instant. A mutual capacitance $C_M$ may exist between the charge terminals $T_1$ and $T_2$ depending on the distance there between. In addition, bound capacitances may exist between the respective charge terminals $T_1$ and $T_2$ and the lossy conducting medium 203 depending on the heights of the respective charge terminals $T_1$ and $T_2$ with respect to the lossy conducting medium 203.

The polyphase waveguide probe 200j includes a probe coupling circuit 209j comprising an inductive impedance comprising a coil Lip having a pair of leads that are coupled to respective ones of the charge terminals $T_1$ and $T_2$. In one embodiment, the coil $L_{1j}$ is specified to have an electrical length that is one-half (½) of the wavelength at the operating frequency of the polyphase waveguide probe 200j. While the electrical length of the coil Lip is specified as approximately one-half (½) the wavelength at the operating frequency, it is understood that the coil Lip may be specified with an electrical length at other values as was discussed with reference to the polyphase waveguide probe 200a (FIG. 7A) described above. In addition, the probe coupling circuit 209j includes a tap 223 on the coil $L_{1j}$ that is coupled to the lossy conducting medium 203.

The excitation source 213 is magnetically coupled to the probe coupling circuit 209j in a manner similar as was mentioned with respect to the polyphase waveguide probe 200a (FIG. 7A) set forth above. To this end, the excitation source 213 is coupled to a coil LP that acts as a primary and the coil Lip acts as a secondary. The coil $L_P$ can be positioned at any location along the coil $L_{1j}$. Also, the coil $L_P$ can be positioned above or below the tap 223.

In order to adjust the polyphase waveguide probe 200j for the launching and transmission of a desired Zenneck surface wave, the heights of the respective charge terminals $T_1$ and $T_2$ may be altered with respect to the lossy conducting medium 203 and with respect to each other. Also, the sizes of the charge terminals $T_1$ and $T_2$ may be altered. In addition, the size of the coil $L_{1j}$ may be altered by adding or eliminating turns or by changing some other dimension of the coil $L_{1j}$. Further, the position of the tap 223 on the coil $L_{1j}$ may be adjusted.

With reference to the various embodiments of the polyphase waveguide probes 200a-j in FIGS. 7A-J, each of the polyphase waveguide probes 200a-j may be excited to transmit energy conveyed in the form of a guided wave, or waveguide mode along the surface of the lossy conducting medium 203. To facilitate such transmission, the elements of each of the polyphase waveguide probes 200a-j may be adjusted to impose a desired voltage magnitude and phase on the respective charge terminals $T_1$ and $T_2$ when the respective polyphase waveguide probe 200a-j is excited. Such excitation can occur by applying energy from an excitation source 213 to the respective polyphase waveguide probe 200a-j as was described above.

The voltage magnitudes and phases imposed on the charge terminals $T_1$ and $T_2$ may be adjusted in order to substantially synthesize the fields that are substantially mode-matched to the guided or Zenneck surface-waveguide mode of the lossy conducting medium 203 at the site of transmission given the local permittivity $\varepsilon_r$, conductivity $\sigma$, and potentially other parameters of the lossy conducting medium 203. The waveguide mode of the surface-guided wave is expressed in Equations (21), (22), and (23) set forth above. This surface-waveguide mode has a radial surface current density expressed in Equation (20) in Amperes per meter.

It is understood that it may be difficult to synthesize fields that exactly match the surface-waveguide mode expressed in Equations (21), (22), and (23) set forth above. However, a guided surface wave may be launched if such fields at least approximate the surface-waveguide mode. According to various embodiments, the fields are synthesized to match the surface-waveguide mode within an acceptable engineering tolerance so as to launch a guided surface wave.

Likewise, it may be difficult to synthesize a radial surface current density that exactly matches the radial surface current density of the Zenneck surface-waveguide mode, where the synthesized radial surface current density results from the synthesized fields described above. According to various embodiments, the polyphase waveguide probes 200 may be adjusted to match the radial surface current density of the guided surface-waveguide mode within an acceptable engineering tolerance so as to launch a Zenneck surface wave mode. By creating specific charge distributions plus their images at complex distances, the various polyphase waveguide probes 200a-j set forth above excite surface currents, the fields of which are designed to approximately match a propagating Zenneck surface wave mode and a Zenneck surface wave is launched. By virtue of this complex image technique inherent in the various polyphase waveguide probes 200a-j described above, one is able to substantially mode-match to the surface waveguide modes that the guiding interface wants to support at the location of transmission. The guiding interface is the interface between Region 1 (FIG. 2) and Region 2 (FIG. 2) as described above. According to one embodiment, the guiding interface is the interface between the lossy conducting medium 203 presented by the Earth and the atmospheric medium as described above.

When the voltage magnitudes and phases imposed on the charge terminals $T_1$ and $T_2$ are adjusted so that they, plus their effective images at complex depths, excite complex surface currents whose fields synthesize the fields that substantially match the Zenneck surface-waveguide mode of the lossy conducting medium 203 at the site of transmission, by virtue of the Leontovich boundary condition, such fields will automatically substantially synthesize a wave front incident at a complex Brewster angle of the lossy conducting medium 203, resulting in zero reflection. This is the condition of wave matching at the boundary.

Figure 8A:
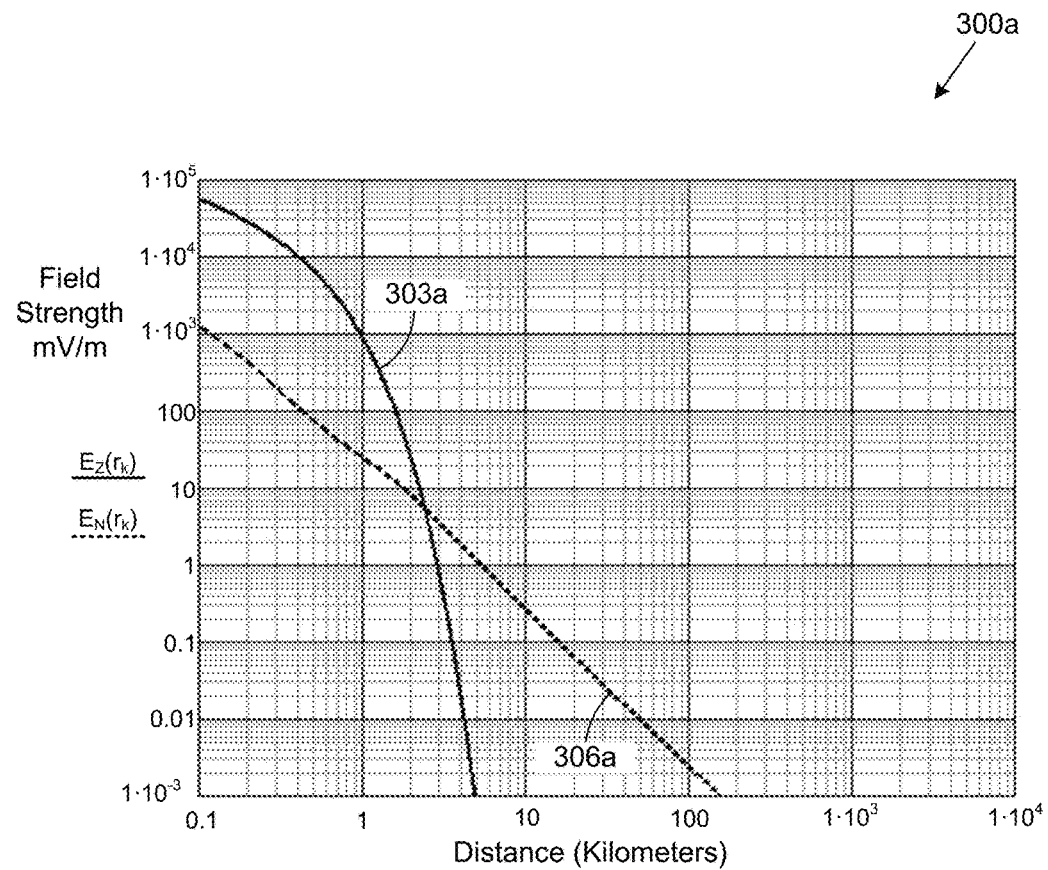
FIGS. 8A through 8C are graphs that illustrate field strengths of guided surface waves at select transmission frequencies generated by the various embodiments of polyphase waveguide probes according to the various embodiments of the present disclosure.
Figure 8B:
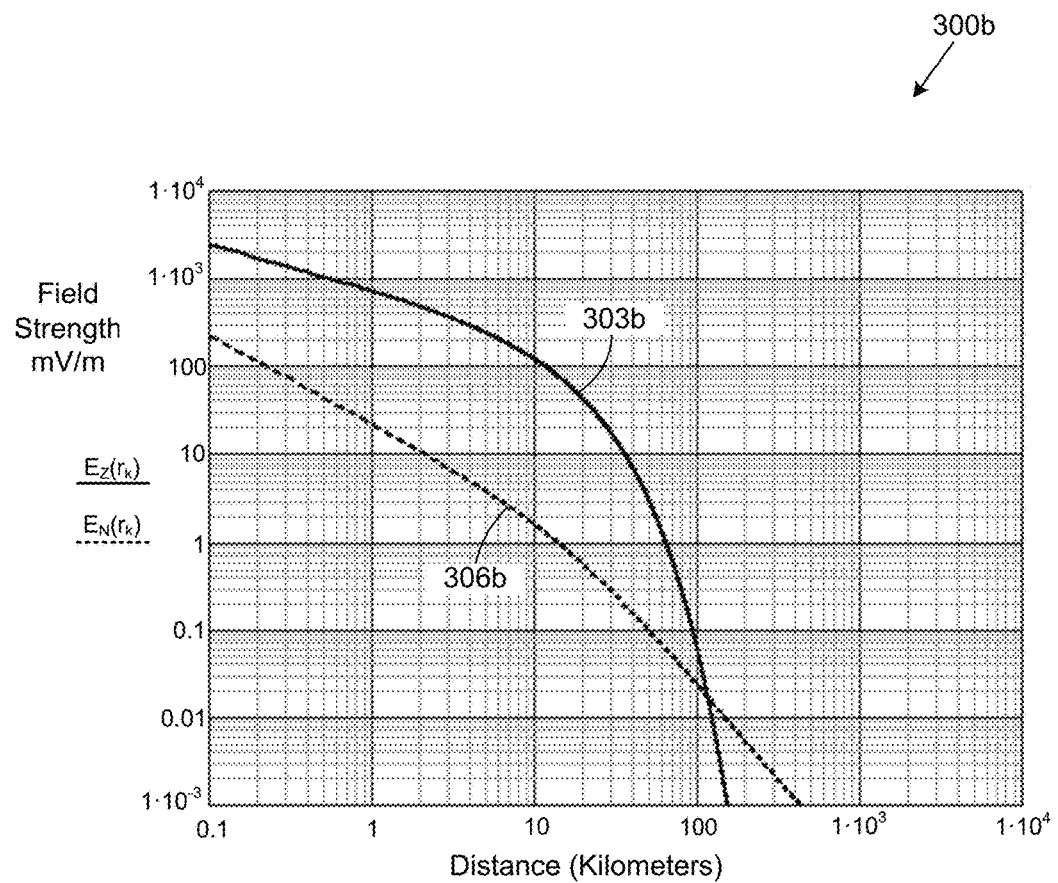
Figure 8C:
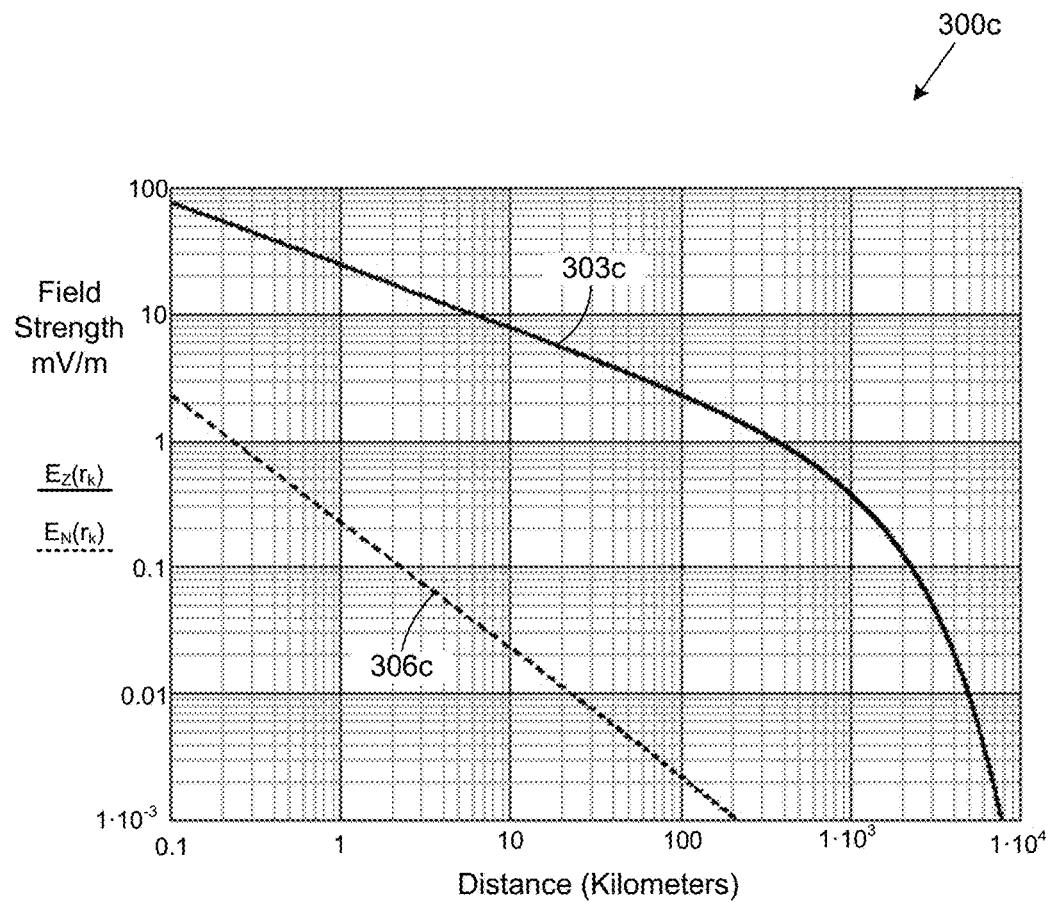

Referring next to FIGS. 8A, 8B, and 8C, shown are examples of graphs 300a, 300b, and 300c that depict field strength in Volts per meter as a function of distance in kilometers for purposes of comparison between a Zenneck surface wave and conventionally radiated fields. In addition, the various graphs 300a, 300b, and 300c illustrate how the distance of transmission of a Zenneck surface wave varies with the frequency of transmission.

Each graph 300a, 300b, and 300c depicts a corresponding guided field strength curve 303a, 303b, and 303c and corresponding radiated field strength curves 306a, 306b, and 306c. The guided field strength curves 303a, 303b, and 303c were generated assuming various parameters. Specifically, the graphs 300a, 300b, and 300c were calculated with a constant charge $Q_1$ (FIG. 3) applied to the upper terminal $T_1$ (FIG. 3) at frequencies of 10 MHz, 1 MHz, and 0.1 MHz, respectively. Constitutive parameters of $\varepsilon_r=15$ and $\sigma=0.008$ mhos/m, which are taken from the R-3 map for central Ohio set forth by the Federal Communications Commission (FCC), were assumed for purposes of calculation. The following table provides the assumed polyphase waveguide probe operating parameters for the generation of each of the guided field strength curve 303a, 303b, and 303c.

| Curve | Frequency (MHz) | λ | Height of Terminal $T_1$ (m) | H/λ | Self-Cap of Terminal $T_1$ (pF) | Voltage on Term $T_1$ (V) | Charge $Q_1$ (Coulombs) |
|---|---|---|---|---|---|---|---|
| 303a | 10 | 30 | 0.8 | 0.027 | 50 | 10,000 | $5 \times 10^{-7}$ |
| 303b | 1.0 | 300 | 8 | 0.027 | 100 | 5,000 | $5 \times 10^{-7}$ |
| 303c | 0.1 | 3000 | 8 | 0.0027 | 100 | 5,000 | $5 \times 10^{-7}$ |

In order to have physically realizable operation, the height of terminal $T_1$ was specified at $H_{T1}$=8 meters for f=0.1 MHz and 1.0 MHz, but shortened to 0.8 meters at 10 MHz in order to keep the current distribution uniform. Also, the self-capacitance $C_1$ of the terminal $T_1$ was set to 100 pF for operation at f=0.1 MHz and 1.0 MHz. This capacitance is unreasonably large for use at 10 MHz, so the self-capacitance $C_1$ was reduced for that case. However, the resulting terminal charge $Q_{T1}$ which is the controlling parameter for field strength was kept at the same value for all three guided field strength curve 303a, 303b, and 303c.

From the graphs it can be seen that the lower the frequency, the less the propagation attenuation and the fields reach out over greater distances. However, consistent with conservation of energy, the energy density decreases with distance. Another way to state that is that the higher the frequency, the smaller the region over which the energy is spread, so the greater the energy density. Thus, the "knee" of the Zenneck surface wave shrinks in range as the frequency is increased. Alternatively, the lower the frequency, the less the propagation attenuation and the greater the field strength of the Zenneck surface wave at very large distances from the site of transmission using a polyphase waveguide probe 200 (FIG. 6).

The Zenneck surface wave for each case is identified as guided field strength curves 303a, 303b, and 303c, respectively. The Norton ground wave field strength in Volts per meter for a short vertical monopole antenna, of the same height as the respective polyphase waveguide probe 200, with an assumed ground loss of 10 ohms, is represented by the radiated field strength curves 306a, 306b, and 306c, respectively. It is asserted that this is a reasonably realistic assumption for monopole antenna structures operating at these frequencies. The critical point is that a properly mode-matched polyphase waveguide probe launches a guided surface wave which dramatically outperforms the radiation field of any monopole at distances out to just beyond the "knee" in the guided field strength curves 303a-c of the respective Zenneck surface waves.

Given the foregoing, according to one embodiment, the propagation distance of a guided surface wave varies as a function of the frequency of transmission. Specifically, the lower the transmission frequency, the less the exponential attenuation of the guided surface wave and, therefore, the farther the guided surface wave will propagate. As mentioned above, the field strength of a guided surface wave falls off at a rate of $$\frac{e^{-\alpha d}}{\sqrt{d}},$$

whereas the field strength of a radiated electromagnetic field falls off geometrically, proportional to 1/d, where d is the distance in kilometers. Thus, each of the guided field strength curves 303a, 303b, and 303c feature a knee as was described above. As the frequency of transmission of a polyphase waveguide probe described herein decreases, the knee of the corresponding guided field strength curve 303a, 303b, and 303c will push to the right in the graph.

FIG. 8A shows a guided field strength curve 303a and a radiated field strength curve 306a generated at a frequency of 10 Megahertz. As shown, the guided surface wave falls off below 10 kilometers. In FIG. 8B, the guided field strength curve 303b and the radiated field strength curve 306b are generated at a frequency of 1 Megahertz. The guided field strength curve 303b falls off at approximately 100 Kilometers. Finally, in FIG. 8C, the guided field strength curve 303c and the radiated field strength curve 306c are generated at a frequency of 100 Kilohertz (which is 0.1 Megahertz). The guided field strength curve 303c falls off at between 4000-7000 Kilometers.

Note that if the frequency is low enough, it may be possible to transmit a guided surface wave around the entire Earth. It is believed that such frequencies may be at or below approximately 20-25 kilohertz. It should be noted that at such low frequencies, the lossy conducting medium 203 (FIG. 6) ceases to be a plane and becomes a sphere. Thus, when a lossy conducting medium 203 comprises a terrestrial medium, the calculation of guided field strength curves will be altered to take into account the spherical shape at low frequencies where the propagation distances approach size of the terrestrial medium.

Given the foregoing, some general guidance is provided in next constructing a polyphase waveguide probe 200 (FIG. 6) using the terrestrial medium of Earth as the lossy conducting medium 203 according to the various embodiments. As a practical approach, one might specify the frequency of operation and identify the desired field strength of the guided surface wave at a distance of interest from the respective polyphase waveguide probe 200 to be constructed.

Given these parameters, one can next determine the charge $Q_1$ (FIG. 6) that is to be imposed on the upper charge terminal $T_1$ (FIG. 6) in order to produce the desired field strength at the specified distance. To determine the charge $Q_1$ needed, one would need to obtain the permittivity $\varepsilon_r$ and the conductivity $\sigma$ of the Earth at the transmission site. These values can be obtained by measurement or by reference to conductivity charts published, for example, by the Federal Communications Commission or the Committee Consultif International Radio (CCIR). When the permittivity $\varepsilon_r$, conductivity $\sigma$, and the desired field strength at the specified distance are known, the needed charge $Q_1$ can be determined by direct calculation of the field strength from Zenneck's exact expressions set forth in Equations (21)-(23) above.

Once the needed charge $Q_1$ is determined, next one would need to identify what self-capacitance $C_1$ of the charge terminal $T_1$ at what voltage V would produce the needed charge $Q_1$ on the charge terminal $T_1$. A charge Q on any charge terminal T is calculated as Q=CV. In one approach, one can choose what is deemed to be an acceptable voltage V that can be placed on the charge terminal $T_1$, and then construct the charge terminal $T_1$ so as to have the required self-capacitance $C_1$ to achieve the needed charge $Q_1$. Alternatively, in another approach, one could determine what is an achievable self-capacitance $C_1$ by virtue of the specific construction of the charge terminal $T_1$, and then raise the resulting charge terminal $T_1$ to the required voltage V to achieve the needed charge $Q_1$.

In addition, there is an issue of operational bandwidth that should be considered when determining the needed self-capacitance $C_1$ of the charge terminal $T_1$ and voltage V to be imposed on the charge terminal $T_1$. Specifically, the bandwidth of the polyphase waveguide probes 200 described herein is relatively large. This results in a significant degree of flexibility in specifying the self-capacitance $C_1$ or the voltage V as described above. However, it should be understood that as the self-capacitance $C_1$ is reduced and the voltage V increased, the bandwidth of the resulting polyphase waveguide probe 200 will diminish.

Experimentally, it should be noted that a smaller self-capacitance $C_1$ may make a given polyphase waveguide probe 200 more sensitive to small variations in the permittivity $\varepsilon_r$ or conductivity $\sigma$ of the Earth at or near the transmission site. Such variation in the permittivity $\varepsilon_r$ or conductivity $\sigma$ might occur due to variation in the climate given the transition between the seasons or due to changes in local weather conditions such as the onset of rain, drought, and/or other changes in local weather. Consequently, according to one embodiment, the charge terminal $T_1$ may be specified so as to have a relatively large self-capacitance $C_1$ as is practicable.

Once the self-capacitance $C_l$ of the charge terminal $T_1$ and the voltage to be imposed thereon are determined, next the self-capacitance $C_2$ and physical location of the second charge terminal $T_2$ are to be determined. As a practical matter, it has been found easiest to specify the self-capacitance $C_2$ of the charge terminal $T_2$ to be the same as the self-capacitance $C_1$ of the charge terminal $T_1$. This may be accomplished by making the size and shape of the charge terminal $T_2$ the same as the size and shape of the charge terminal $T_1$. This would ensure that symmetry is maintained and will avoid the possibility of unusual phase shifts between the two charge terminals $T_1$ and $T_2$ that might negatively affect achieving a match with the complex Brewster angle as described above. The fact that the self-capacitances $C_1$ and $C_2$ are the same for both charge terminals $T_1$ and $T_2$ will result in the same voltage magnitudes on the charge terminals $T_1$ and $T_2$. However, it is understood that the self-capacitances $C_1$ and $C_2$ may differ, and the shape and size of the charge terminals $T_1$ and $T_2$ may differ.

To promote symmetry, the charge terminal $T_2$ can be positioned directly under the charge terminal $T_1$ along the vertical axis z (FIG. 6) as described above. Alternatively, it may be possible to position the charge terminal $T_2$ at some other location with some resulting effect.

The distance between the charge terminals $T_1$ and $T_2$ should be specified so as to provide for the best match between the fields generated by the polyphase waveguide probe 200 and the guided surface-waveguide mode at the site of transmission. As a suggested starting point, this distance may be set so that the mutual capacitance $C_M$ (FIG. 6) between the charge terminals $T_1$ and $T_2$ is the same or less than the isolated capacitance $C_1$ on the charge terminal Ultimately, one should specify the distance between the charge terminals $T_1$ and $T_2$ to make the mutual capacitance $C_M$ as small as is practicable. The mutual capacitance $C_M$ may be determined by measurement, and the charge terminals $T_1$ and $T_2$ may be positioned accordingly.

Next, the proper height $h=H_1-H_2$ (FIGS. 7A-J) of the polyphase waveguide probe 200 is determined. The so-called "image complex-depth" phenomenon comes into bearing here. This would entail consideration of the superposed fields on the surface of the Earth from the charge reservoirs $T_1$ and $T_2$ that have charges $Q_1$ and $Q_2$, and from the subsurface images of the charges $Q_1$ and $Q_2$ as height h is varied. Due to the significant number of variables to consider to ensure that a given polyphase waveguide probe 200 is mode matched with the guided surface-waveguide mode of the Earth at the site of transmission, a practical starting point is a height h at which the bound capacitance of each of the charge reservoirs $T_1$ and $T_2$ with respect to the ground is negligible such that the capacitance associated with the charge terminals $T_1$ and $T_2$ is essentially their isolated self-capacitance $C_1$ and $C_2$, respectively.

Another consideration to take into account when determining the height h associated with a polyphase waveguide probe 200 is whether radiation is to be avoided. Specifically, as the height h of the polyphase waveguide probe 200 approaches an appreciable portion of a wavelength at the frequency of operation, the radiation resistance $R_r$ will grow quadratically with height h and radiation will begin to dominate over the generation of a guided surface wave as described above. One benchmark set forth above that ensures the Zenneck surface wave will dominate over any radiation is to make sure the height h is less than 10% of the wavelength at the frequency of operation, although other benchmarks may be specified. In some cases, it may be desired to allow some degree of radiation to occur in addition to launching a guided surface wave, where the height h may be specified accordingly.

Next, the probe coupling circuit 209 (FIG. 6) is specified to provide for the voltage phase between the charge terminals $T_1$ and $T_2$. The voltage phase appears to have a significant effect on creating fields that mode-match the guided surface-waveguide mode at the site of transmission. Assuming that the placement of the charge terminals $T_1$ and $T_2$ is along the vertical z axis to promote symmetry, the probe coupling circuit 209 may be specified to provide for a voltage phase differential of 180 degrees on the charge terminals $T_1$ and $T_2$. That is to say, the probe coupling circuit 209 is specified so that voltage V on the charge terminal $T_1$ is 180 degrees out of phase with respect to the voltage on the charge terminal $T_2$.

As was described above, one example approach is to place a coil Lia (FIG. 7A) between the charge terminals $T_1$ and $T_2$ as described above with reference to the polyphase waveguide probe 200a and adjust the coil $L_{1a}$ until the resulting system is electrically half-wave resonant. This would place a voltage V on the charge terminal $T_1$ and voltage −V on the charge terminal $T_2$ such that the largest voltages are placed on the charge terminals $T_1$ and $T_2$ 180 degrees out of phase.

The excitation source 213 (FIG. 6) may then be coupled to the probe coupling circuit 209 and the output voltage adjusted to achieve the required voltage V to provide for the needed charge $Q_1$ as described above. The excitation source 213 may be coupled via magnetic coupling, capacitive coupling, or conductive coupling (direct) to the probe coupling circuit 209. Note that the output of the excitation source 213 may be stepped up using a transformer or via some other approach if necessary. The location of the coil $L_{1a}$ can be at any location such as down on the ground by the excitation source 213. Alternatively, as per best RF practice, the coil $L_{1a}$ can be positioned directly between the charge reservoirs $T_1$ and $T_2$. Principles of impedance matching may be applied when coupling the excitation source 213 to the probe coupling circuit 209.

Note that the phase differential does not necessarily have to be 180 degrees. To this end, one has the option of raising and lowering one or both of the charge terminals $T_1$ and/or $T_2$, adjusting the voltages V on the charge terminals $T_1$ and/or $T_2$, or adjusting the probe coupling circuit 209 to adjust the voltage magnitudes and phases to create fields that most closely match the guided surface-waveguide mode in order to generate a guided surface wave.

Experimental Results

Figure 9:
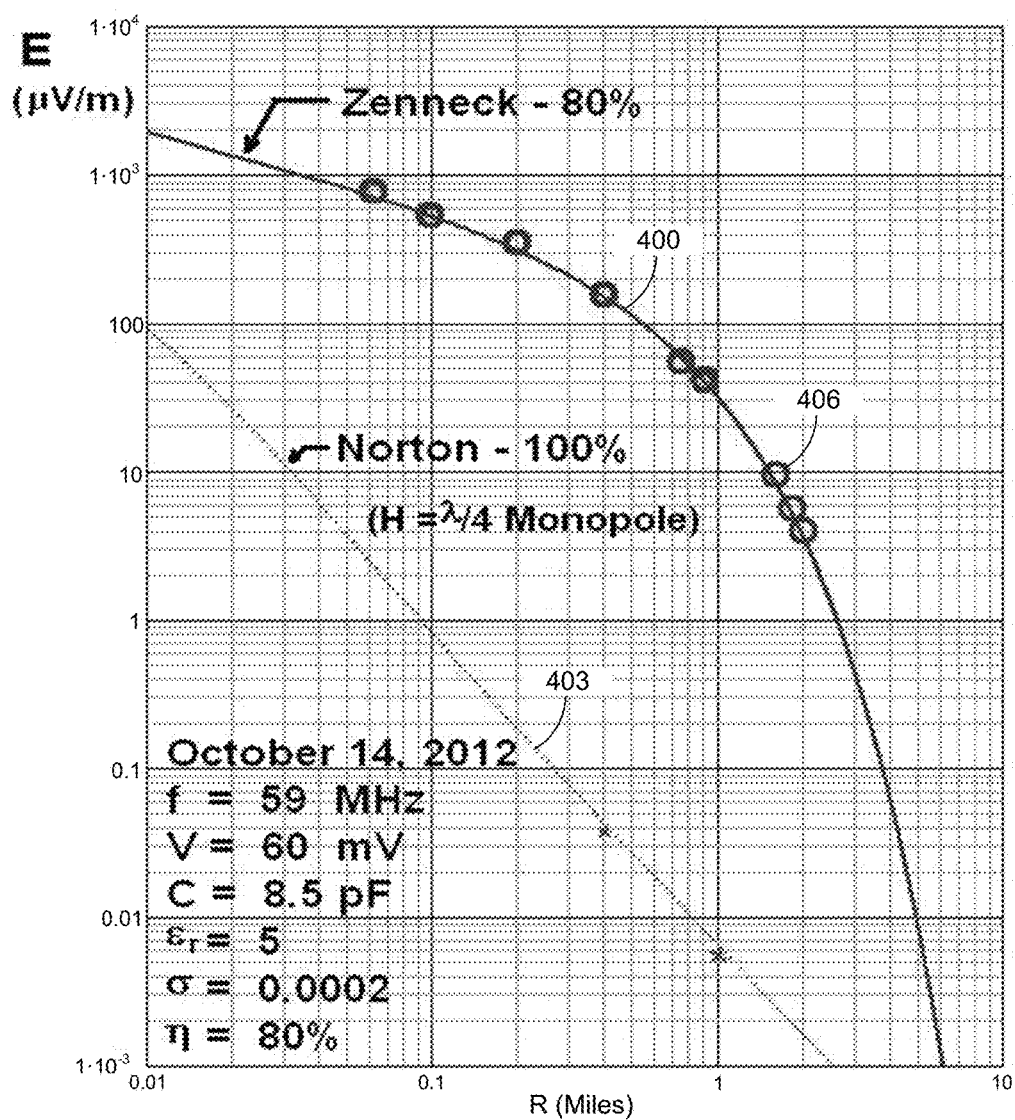
FIG. 9 shows one example of a graph of experimental measurements of field strength of a guided surface wave at 59 Megahertz as a function of distance generated by a polyphase waveguide probe according to an embodiment of the present disclosure.

The above disclosures are supported by experimental measurements and documentation. With reference to FIG. 9, shown is a graph that presents the measured field strength of an electromagnetic field transmitted by one embodiment of an experimental polyphase waveguide probe measured on Oct. 14, 2012 in Plymouth, N.H.. The frequency of transmission was 59 MHz with a voltage of 60 mV imposed on the charge terminal $T_1$ of the experimental polyphase waveguide probe. The self-capacitance $C_i$ of the experimental polyphase waveguide probe was 8.5 pF. The conductivity a of the ground at the test site is 0.0002 mhos/m, and the permittivity $\varepsilon_r$ of the ground at the test site was 5. These values were measured in situ at the frequency in use.

The graph includes a guided field strength curve 400 that is labeled a "Zenneck" curve at 80% efficiency and a radiated field strength curve 403 that is labeled a "Norton" curve at 100% radiation efficiency, which is the best possible. To this end, the radiated field strength curve 403 represents the radiated electromagnetic fields that would be generated by a ¼ wavelength monopole antenna operating at a frequency of 59 MHz. The circles 406 on the graph represent measured field strengths produced by the experimental polyphase waveguide probe. The field strength measurements were performed with a NIST-traceable Potomac Instruments FIM-71 commercial VHF field strength meter. As can be seen, the measured field strengths fall along the theoretical guided field strength curve 400. These measured field strengths are consistent with the propagation of a guided or Zenneck surface wave.

Figure 10:
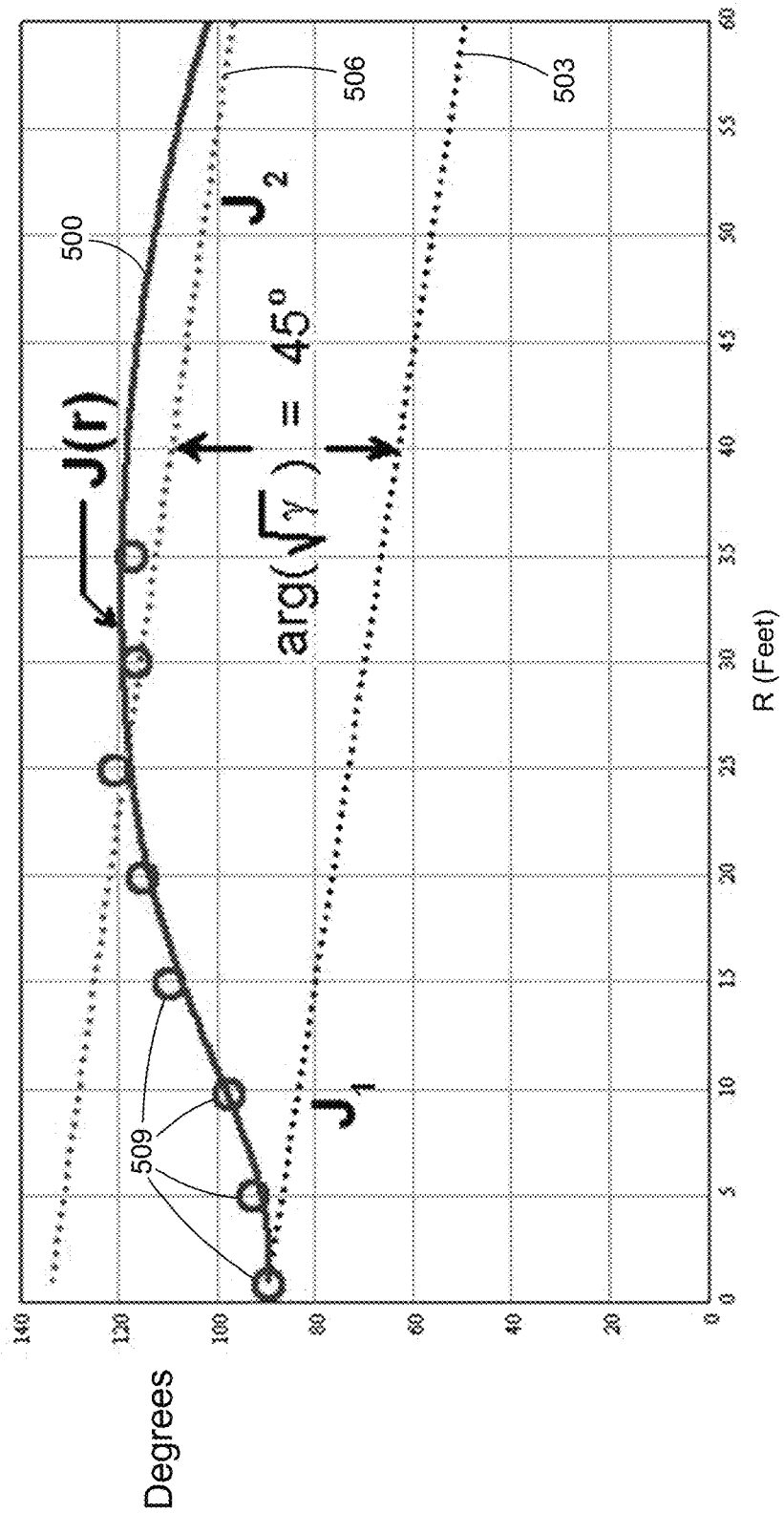
FIG. 10 shows a graph of experimental measurements of the phase as a function of distance of the guided surface wave of FIG. 9 according to an embodiment of the present disclosure.

Referring next to FIG. 10, shown is a graph that presents the measured phase of the transmitted electromagnetic wave from the experimental polyphase waveguide probe. The curve J(r) indicates the phase of the fields incident to the currents $J_1$ and $J_2$ with a transition between the currents $J_1$ and $J_2$ as shown. The curve 503 indicates the asymptote depicting the phase of the current $J_1$, and the curve 506 indicates the asymptote depicting the phase of the current $J_2$. A difference of approximately 45 degrees generally exists between the phases of the respective currents $J_1$ and $J_2$. The circles 509 indicate measurements of the phase of the current J(r) generated by the experimental polyphase waveguide probe operating at 59 MHz as with FIG. 9. As shown, the circles 509 fall along the curve J(r) indicating that there is a transition of the phase of the current J(r) from the curve 503 to the curve 506. This indicates that the phase of the current J(r) generated by the experimental polyphase waveguide probe transitions from the phase generated by the close-in current $J_1$ to the far-out current $J_2$. Thus, these phase measurements are consistent with the phase with the presence of a guided or Zenneck surface wave.

Figure 11:
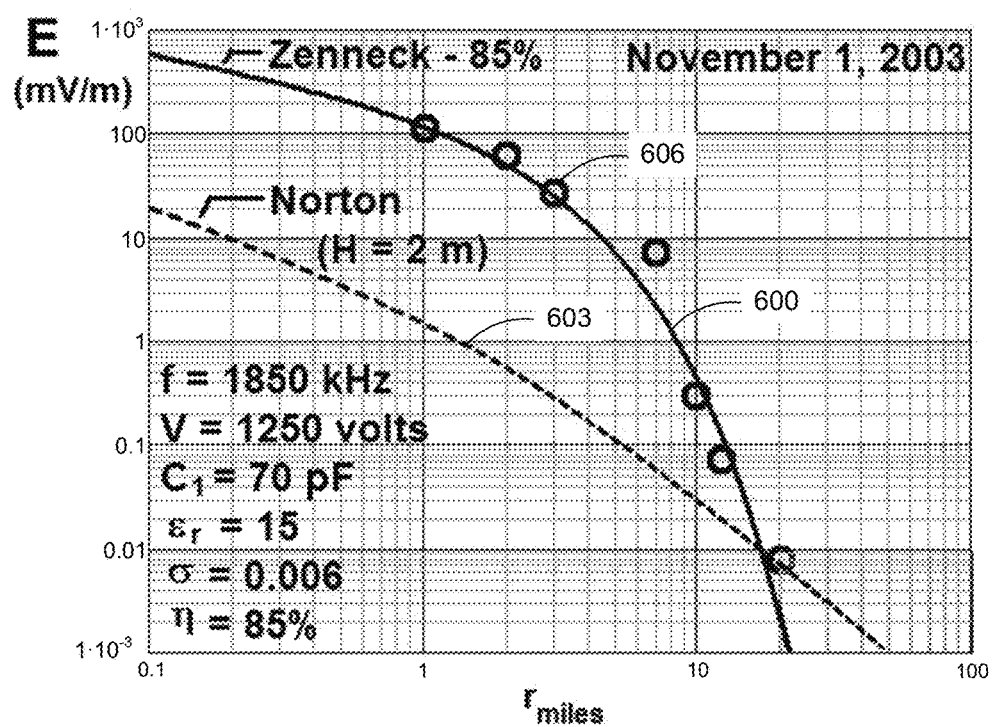
FIG. 11 shows another example of a graph of experimental measurements of field strength as a function of distance of a guided surface wave generated by a polyphase waveguide probe at 1.85 Megahertz according to an embodiment of the present disclosure.

With reference to FIG. 11 shown is a graph of a second set of measured data that depicts the field strength of an electromagnetic field transmitted by a second embodiment of an experimental polyphase waveguide probe measured on Nov. 1, 2003 in the vicinity of Ashland, New Hampshire and across the region north of Lake Winnipesaukee. The frequency of transmission was 1850 kHz with a voltage of 1250 V imposed on the charge terminal $T_1$ of the experimental polyphase waveguide probe. The experimental polyphase waveguide probe had a physical height of $H_1$=2 meters. The self-capacitance $C_1$ of the experimental polyphase waveguide probe in this experiment, which was a flat conducting disk of 1 meter radius, was measured to be 70 pF. The polyphase waveguide probe was arranged as illustrated in FIG. 7J, with spacing h=1 meter and the height of the charge terminal $T_2$ above the ground (the lossy conducting medium 203) being $H_2$=1 meter. The average conductivity σ of the ground in the vicinity of experimentation was 0.006 mhos/m, and the relative permittivity $\varepsilon_r$ of the ground was on the order of 15. These were determined at the frequency in use.

The graph includes a guided field strength curve 600 that is launched by the experimental polyphase waveguide probe, labeled as "Zenneck" curve at 85% efficiency, and a radiated field strength curve 603 that is labeled a "Norton" curve as radiated from a resonated monopole of the same height, $H_2$=2 meters, over a ground screen composed of 20 radial wires equally spaced and of length 200 feet each. To this end, the radiated field strength curve 603 represents the conventional Norton ground wave field radiated from a conventional stub monopole antenna operating at a frequency of 1850 kHz over the lossy Earth. The circles 606 on the graph represent measured field strengths produced by the experimental polyphase waveguide probe.

As can be seen, the measured field strengths fall closely along the theoretical Zenneck guided field strength curve 600. Special mention of the field strength measured at the r=7 mile point may be made. This field strength data point was measured adjacent to the shore of a lake, and this may account for the data departing slightly above the theoretical Zenneck guided field strength curve 600, i.e. the constitutive parameters, $\varepsilon_r$ and/or σ, at that location are likely to have departed significantly from the path-average constitutive parameters.

The field strength measurements were performed with a NIST-traceable Potomac Instruments FIM-41 MF/HF field strength meter. The measured field strength data are consistent with the presence of a guided or Zenneck surface wave. It is apparent from the experimental data that the measured field strengths observed at distances less than 15 miles could not possibly be due to conventional Norton ground wave propagation, and can only be due to guided surface wave propagation launched by the polyphase probe operating as disclosed above. Under the given 1.85 MHz experimental conditions, out at 20 miles it appears that a Norton ground wave component has finally overtaken the Zenneck surface wave component.

A comparison of the measured Zenneck surface wave data shown in FIG. 9 at 59 MHz with the measured data in FIG. 11 at 1.85 MHz illustrates the great advantage of employing a polyphase waveguide probe according to the various embodiments at lower frequencies.

These experimental data confirm that the present polyphase waveguide probes, comprising a plurality of appropriately phased and adjusted charge terminals, as taught herein, induce a phase-advanced surface current with a unique phase boost of arg($\sqrt{\gamma}$), and whose fields synthesize surface illumination at the complex Brewster angle for the lossy boundary as disclosed herein. The consequence is the efficient launching of cylindrical Zenneck-like wave propagation, guided by the boundary surface as an evanescent, single-conductor radial transmission-line mode, which attenuates as $$\frac{e^{-\alpha d}}{\sqrt{d}},$$

not as a radiation field, which would decrease as 1/d due to geometrical spreading.

Figure 12A:
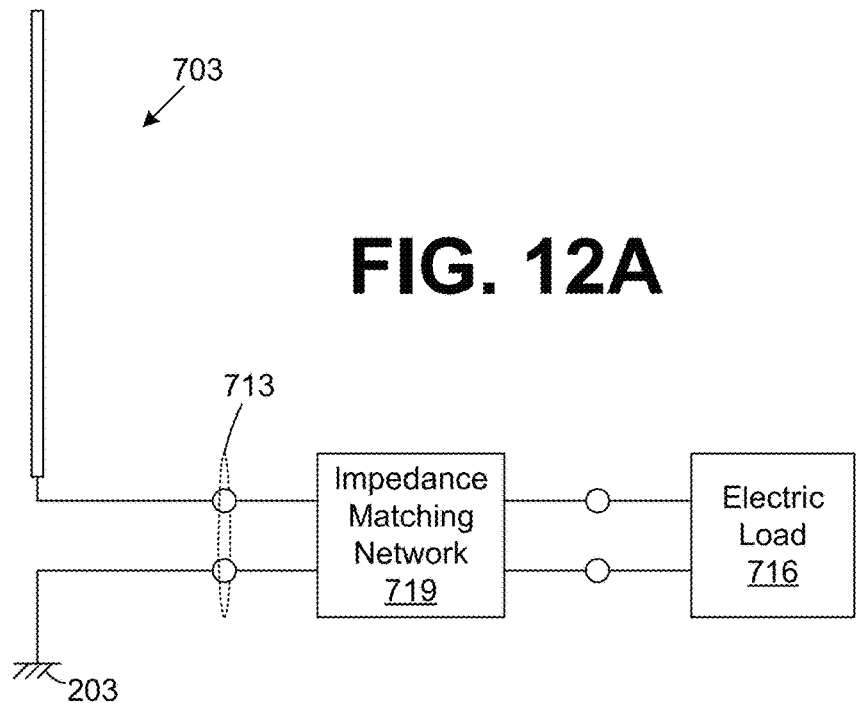
FIGS. 12A and 12B depict examples of receivers that may be employed to receive energy transmitted in the form of a guided surface wave launched by a polyphase waveguide probe according to the various embodiments of the present disclosure.
Figure 12B:
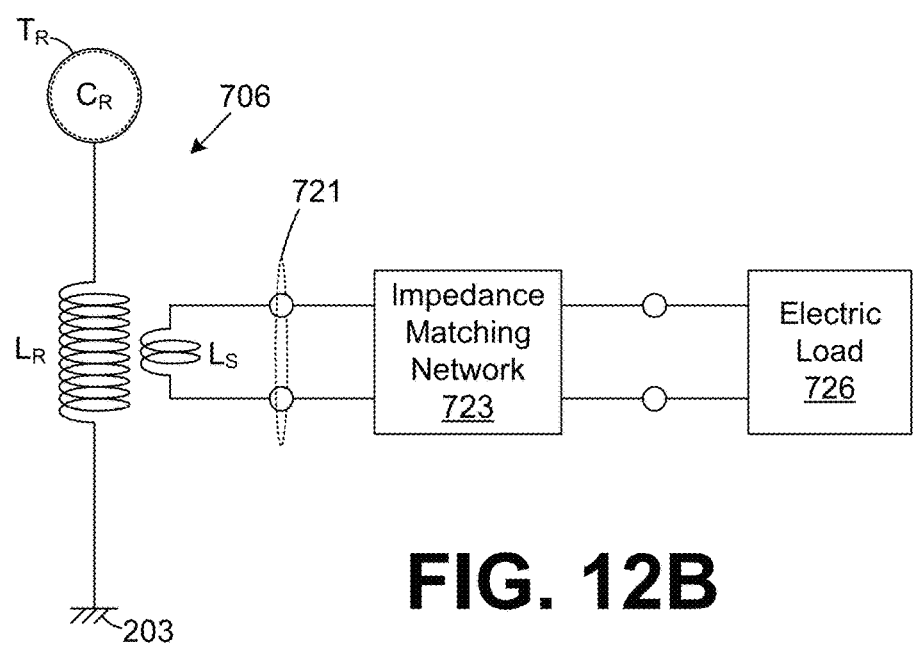
Figure 13:
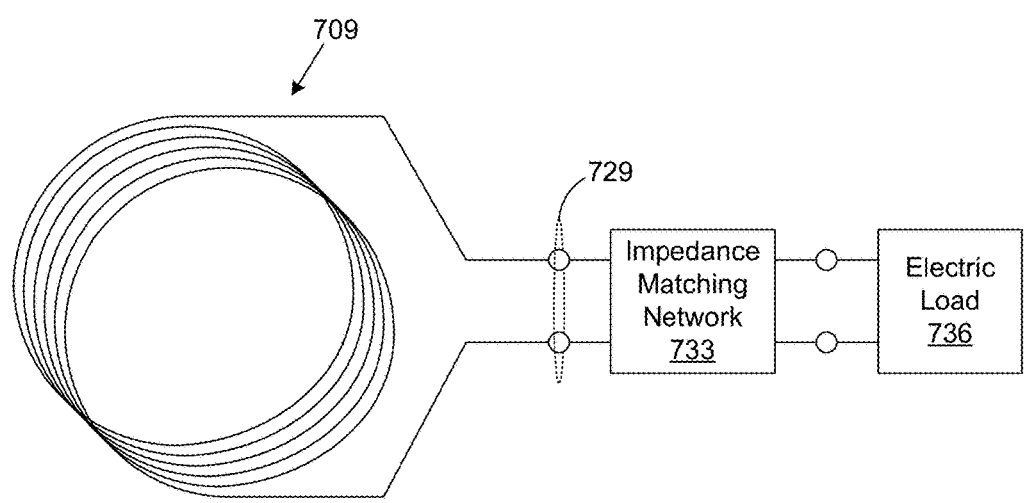
FIG. 13 depicts an example of an additional receiver that may be employed to receive energy transmitted in the form of a guided surface wave launched by a polyphase waveguide probe according to the various embodiments of the present disclosure.

Referring next to FIGS. 12A, 12B, and 13, shown are examples of generalized receive circuits for using the surface-guided waves in wireless power delivery systems. FIGS. 12A and 12B include a linear probe 703 and a tuned resonator 706. FIG. 13 is a magnetic coil 709 according to various embodiments of the present disclosure. According to various embodiments, each one of the linear probe 703, the tuned resonator 706, and the magnetic coil 709 may be employed to receive power transmitted in the form of a guided surface wave on the surface of a lossy conducting medium 203 (FIG. 6) according to various embodiments. As mentioned above, in one embodiment the lossy conducting medium 203 comprises a terrestrial medium.

With specific reference to FIG. 12A, the open-circuit terminal voltage at the output terminals 713 of the linear probe 703 depends upon the effective height of the linear probe 703. To this end, the terminal point voltage may be calculated as $$V_T = \int_0^{h_e} E_{inc} \cdot dl, \quad (43)$$

where $E_{inc}$ is the strength of the electric field in vector on the linear probe 703 in Volts per meter, dl is an element of integration along the direction of the linear probe 703, and $h_e$ is the effective height of the linear probe 703. An electrical load 716 is coupled to the output terminals 713 through an impedance matching network 719.

When the linear probe 703 is subjected to a guided surface wave as described above, a voltage is developed across the output terminals 713 that may be applied to the electrical load 716 through a conjugate impedance matching network 719 as the case may be. In order to facilitate the flow of power to the electrical load 716, the electrical load 716 should be substantially impedance matched to the linear probe 703 as will be described below.

Referring to FIG. 12B, the tuned resonator 706 includes a charge terminal $T_R$ that is elevated above the lossy conducting medium 203. The charge terminal $T_R$ has a self-capacitance $C_R$. In addition, there may also be a bound capacitance (not shown) between the charge terminal $T_R$ and the lossy conducting medium 203 depending on the height of the charge terminal $T_R$ above the lossy conducting medium 203. The bound capacitance should preferably be minimized as much as is practicable, although this may not be entirely necessary in every instance of a polyphase waveguide probe 200.

The tuned resonator 706 also includes a coil $L_R$. One end of the coil $L_R$ is coupled to the charge terminal $T_R$, and the other end of the coil $L_R$ is coupled to the lossy conducting medium 203. To this end, the tuned resonator 706 (which may also be referred to as tuned resonator $L_R$-$C_R$) comprises a series-tuned resonator as the charge terminal $C_R$ and the coil $L_R$ are situated in series. The tuned resonator 706 is tuned by adjusting the size and/or height of the charge terminal $T_R$, and/or adjusting the size of the coil $L_R$ so that the reactive impedance of the structure is substantially eliminated.

For example, the reactance presented by the self-capacitance $C_R$ is calculated as $$\frac{1}{j\omega C_R}.$$

Note that the total capacitance of the tuned resonator 706 may also include capacitance between the charge terminal $T_R$ and the lossy conducting medium 203, where the total capacitance of the tuned resonator 706 may be calculated from both the self-capacitance $C_R$ and any bound capacitance as can be appreciated. According to one embodiment, the charge terminal $T_R$ may be raised to a height so as to substantially reduce or eliminate any bound capacitance. The existence of a bound capacitance may be determined from capacitance measurements between the charge terminal $T_R$ and the lossy conducting medium 203.

The inductive reactance presented by a discrete-element coil $L_R$ may be calculated as $j\omega L$, where L is the lumped-element inductance of the coil $L_R$. If the coil $L_R$ is a distributed element, its equivalent terminal-point inductive reactance may be determined by conventional approaches. To tune the tuned resonator 706, one would make adjustments so that the inductive reactance presented by the coil $L_R$ equals the capacitive reactance presented by the tuned resonator 706 so that the resulting net reactance of the tuned resonator 706 is substantially zero at the frequency of operation. An impedance matching network 723 may be inserted between the probe terminals 721 and the electrical load 726 in order to effect a conjugate-match condition for maxim power transfer to the electrical load 726.

When placed in the presence of a guided surface wave, generated at the frequency of the tuned resonator 706 and the conjugate matching network 723, as described above, maximum power will be delivered from the surface guided wave to the electrical load 726. That is, once conjugate impedance matching is established between the tuned resonator 706 and the electrical load 726, power will be delivered from the structure to the electrical load 726. To this end, an electrical load 726 can be coupled to the tuned resonator 706 by way of magnetic coupling, capacitive coupling, or conductive (direct tap) coupling. The elements of the coupling network may be lumped components or distributed elements as can be appreciated. In the embodiment shown in FIG. 12B, magnetic coupling is employed where a coil Ls is positioned as a secondary relative to the coil $L_R$ that acts as a transformer primary. The coil Ls may be link coupled to the coil $L_R$ by geometrically winding it around the same core structure and adjusting the coupled magnetic flux as can be appreciated. In addition, while the tuned resonator 706 comprises a series-tuned resonator, a parallel-tuned resonator or even a distributed-element resonator can also be used.

Referring to FIG. 13, the magnetic coil 709 comprises a receive circuit that is coupled through an impedance coupling network 733 to an electrical load 736. In order to facilitate reception and/or extraction of electrical power from a guided surface wave, the magnetic coil 709 can be positioned so that the magnetic flux of the guided surface wave, $H_\varphi$, passes through the magnetic coil 709, thereby inducing a current in the magnetic coil 709 and producing a terminal point voltage at its output terminals 729. The magnetic flux of the guided surface wave coupled to a single turn coil is expressed by $$\psi = \iint_{A_{CS}} \mu_r \mu_o \vec{H} \cdot \hat{n} dA \qquad (44)$$

where $\psi$ is the coupled magnetic flux, $\mu_r$ is the effective relative permeability of the core of the magnetic coil 709, $\mu_o$ is the permeability of free space, $\vec{H}$ is the incident magnetic field strength vector, $\hat{n}$ is a unit vector normal to the cross-sectional area of the turns, and $A_{cs}$ is the area enclosed by each loop. For an N-turn magnetic coil 709 oriented for maximum coupling to an incident magnetic field that is uniform over the cross-sectional area of the magnetic coil 709, the open-circuit induced voltage appearing at the output terminals 729 of the magnetic coil 709 is $$V = -N\frac{d\Psi}{dt} \approx -j\omega\mu_r\mu_0 H A_{CS}, \qquad (45)$$

where the variables are defined above. The magnetic coil 709 may be tuned to the guided wave frequency either as a distributed resonator or with an external capacitor across its output terminals 729, as the case may be, and then impedance-matched to an external electrical load 736 through a conjugate impedance matching network 733.

Assuming that the resulting circuit presented by the magnetic coil 709 and the electrical load 736 are properly adjusted and conjugate impedance matched, via impedance matching network 733, then the current induced in the magnetic coil 709 may be employed to optimally power the electrical load 736. The receive circuit presented by the magnetic coil 709 provides an advantage in that it does not have to be physically connected to the ground.

With reference to FIGS. 12A, 12B, and 13, the receive circuits presented by the linear probe 703, the tuned resonator 706, and the magnetic coil 709 each facilitate receiving electrical power transmitted from any one of the embodiments of polyphase waveguide probes 200 described above. To this end, the energy received can be used to supply power to an electrical load 716/726/736 via a conjugate matching network as can be appreciated. This contrasts with the signals that may be received in a receiver that were transmitted in the form of a radiated electromagnetic field. Such signals have very low available power and receivers of such signals do not load the transmitters.

It is also characteristic of the present guided surface waves generated using the polyphase waveguide probes 200 described above that the receive circuits presented by the linear probe 703, the tuned resonator 706, and the magnetic coil 709 will load the excitation source 213 (FIG. 3) that is applied to the polyphase waveguide probe 200, thereby generating the guided surface wave to which such receive circuits are subjected. This reflects the fact that the guided surface wave generated by a given polyphase waveguide probe 200 described above comprises a transmission line mode. By way of contrast, a power source that drives a radiating antenna that generates a radiated electromagnetic wave is not loaded by the receivers, regardless of the number of receivers employed.

Thus, a given polyphase waveguide probe 200 and receive circuits in the form of the linear probe 703, the tuned resonator 706, and/or the magnetic coil 709 can together make up a wireless distribution system. Given that the distance of transmission of a guided surface wave using a polyphase waveguide probe 200 as set forth above depends upon the frequency, it is possible that wireless power distribution can be achieved across wide areas and even globally.

The conventional wireless-power transmission/distribution systems extensively investigated today include "energy harvesting" from radiation fields and also sensor coupling to inductive or reactive near-fields. In contrast, the present wireless-power system does not waste power in the form of radiation which, if not intercepted, is lost forever. Nor is the presently disclosed wireless-power system limited to extremely short ranges as with conventional mutual-reactance coupled near-field systems. The wireless-power system disclosed herein probe-couples to the novel surface-guided transmission line mode, which is equivalent to delivering power to a load by a wave-guide or a load directly wired to the distant power generator. Not counting the power required to maintain transmission field strength plus that dissipated in the surface waveguide, which at extremely low frequencies is insignificant relative to the transmission losses in conventional high-tension power lines at 60 Hz, all the generator power goes only to the desired electrical load. When the electrical load demand is terminated, the source power generation is relatively idle.

Figure 14A:
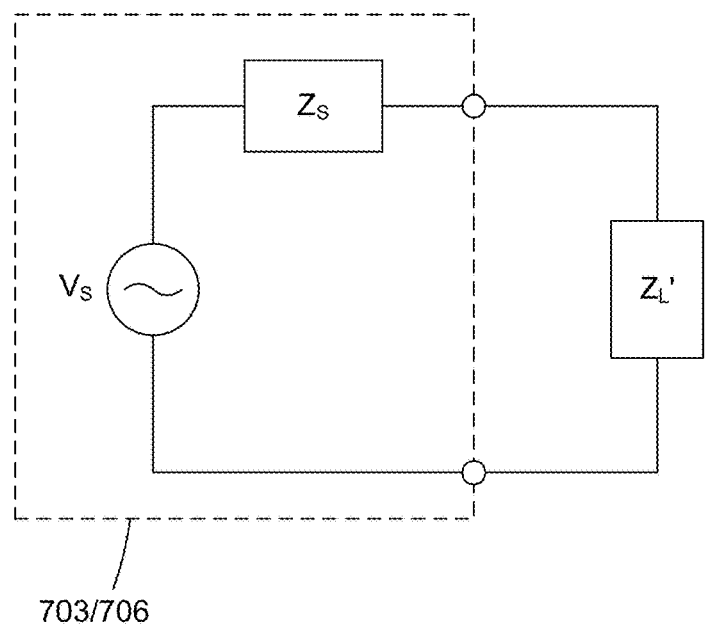
FIG. 14A depicts a schematic diagram representing the Thevenin-equivalent of the receivers depicted in FIGS. 12A-B according to an embodiment of the present disclosure.
Figure 14B:
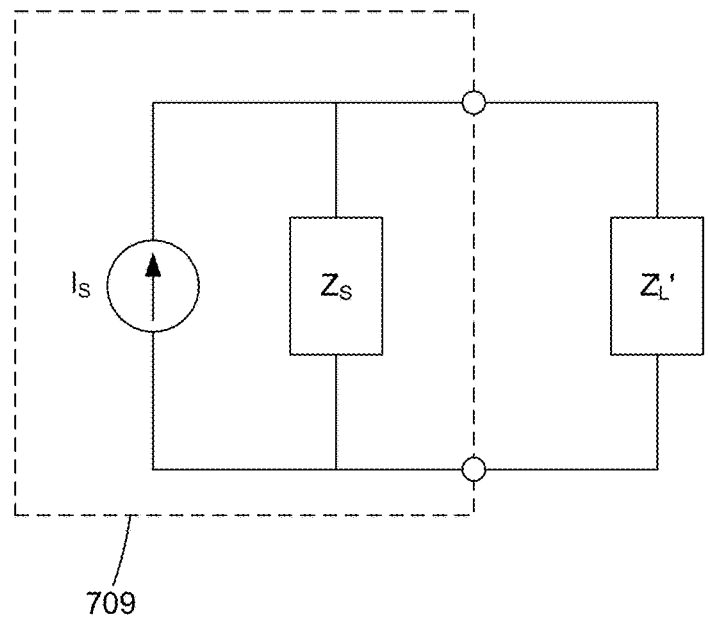
FIG. 14B depicts a schematic diagram representing the Norton-equivalent of the receiver depicted in FIG. 13 according to an embodiment of the present disclosure.

Referring next to FIG. 14A shown is a schematic that represents the linear probe 703 and the tuned resonator 706. FIG. 14B shows a schematic that represents the magnetic coil 709. The linear probe 703 and the tuned resonator 706 may each be considered a Thevenin equivalent represented by an open-circuit terminal voltage source $V_s$ and a dead network terminal point impedance $Z_s$. The magnetic coil 709 may be viewed as a Norton equivalent represented by a short-circuit terminal current source $I_s$ and a dead network terminal point impedance $Z_s$. Each electrical load 716/726/736 (FIGS. 12A-B and FIG. 13) may be represented by a load impedance $Z_L$. The source impedance $Z_s$ comprises both real and imaginary components and takes the form $Z_s = R_s + jX_s$.

According to one embodiment, the electrical load 716/726/736 is impedance matched to each receive circuit, respectively. Specifically, each electrical load 716/726/736 presents through a respective impedance matching network 719/723/733 a load on the probe network specified as $Z_L'$ expressed as $Z_L' = R_L' + j X_L'$, which will be equal to $Z_L' = Z_s^* = R_s - j X_s$, where the presented load impedance $Z_L'$ is the complex conjugate of the actual source impedance $Z_s$. The conjugate match theorem, which states that if, in a cascaded network, a conjugate match occurs at any terminal pair then it will occur at all terminal pairs, then asserts that the actual electrical load 716/726/736 will also see a conjugate match to its impedance, $Z_L'$. See Everitt, W. L. and G. E. Tanner, *Communication Engineering*, McGraw-Hill, V edition, 1956, p. 407. This ensures that the respective electrical load 716/726/736 is impedance matched to the respective receive circuit and that maximum power transfer is established to the respective electrical load 716/726/736.

Operation of a polyphase waveguide probe 200 may be controlled to adjust for variations in operational conditions associated with the guided surface waveguide probe 200. For example, a probe control system 218 (FIG. 6) can be used to control the probe coupling circuit 209 and/or positioning of the charge terminal $T_1$ and/or $T_2$ to control the operation of the polyphase waveguide probe 200. Operational conditions can include, but are not limited to, variations in the characteristics of the lossy conducting medium 203 (e.g., conductivity a and relative permittivity $\varepsilon_r$), variations in field strength, and/or variations in loading of the guided surface waveguide probe 200. As can be seen from Equations (7)-(11), (13) and (34), the radial surface current density and the complex Brewster angle ($\psi_{i,B}$) can be affected by changes in soil conductivity and permittivity resulting from, e.g., weather conditions.

Equipment such as, e.g., conductivity measurement probes, permittivity sensors, ground parameter meters, field meters, current monitors and/or load receivers can be used to monitor for changes in the operational conditions and provide information about current operational conditions to the probe control system 218. The probe control system 218 can then make one or more adjustments to the polyphase waveguide probe 200 to maintain specified operational conditions for the polyphase waveguide probe 200. For instance, as the moisture and temperature vary, the conductivity of the soil will also vary. Conductivity measurement probes and/or permittivity sensors may be located at multiple locations around the polyphase waveguide probe 200. Generally, it would be desirable to monitor the conductivity and/or permittivity at or about the transition between the close-in and far-out radial surface current at the operational frequency. Conductivity measurement probes and/or permittivity sensors can be located at multiple locations (e.g., in each quadrant) around the polyphase waveguide probe 200.

Figure 15A:
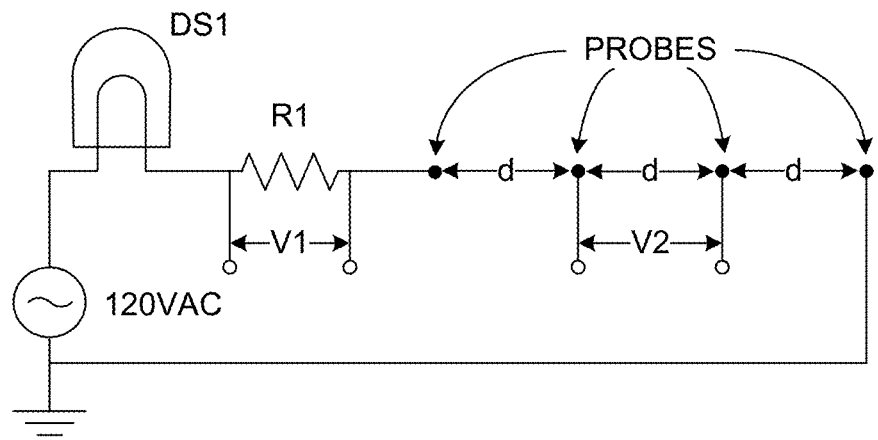
FIG. 15A depicts a schematic diagram of a conductivity measurement probe according to an embodiment of the present disclosure.

FIG. 15A shows an example of a conductivity measurement probe that can be installed for monitoring changes in soil conductivity. As shown in FIG. 15A, a series of measurement probes are inserted along a straight line in the soil. For example, the probes may be 9/16-inch diameter rods with a penetration depth of 12 inches or more, and spaced apart by d=18 inches. DS1 is a 100 Watt light bulb and R1 is a 5 Watt, 14.6 Ohm resistance. By applying an AC voltage to the circuit and measuring V1 across the resistance and V2 across the center probes, the conductivity can be determined by the weighted ratio of σ=21(V1/V2). The measurements can be filtered to obtain measurements related only to the AC voltage supply frequency. Different configurations using other voltages, frequencies, probe sizes, depths and/or spacing may also be utilized.

Figure 15B:
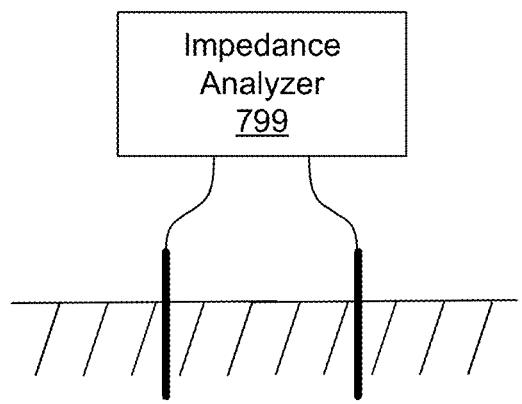
FIG. 15B depicts an impedance analyzer according to various embodiments of the present disclosure.

Open wire line probes can also be used to measure conductivity and permittivity of the soil. As illustrated in FIG. 15B, impedance is measured between the tops of two rods inserted into the soil (lossy medium) using, e.g., an impedance analyzer 799. If an impedance analyzer 799 is utilized, measurements (R+jX) can be made over a range of frequencies and the conductivity and permittivity determined from the frequency dependent measurements using $$\sigma = \frac{8.84}{C_0}\left[\frac{R}{R^2 + X^2}\right] \text{ and } \varepsilon_r = \frac{10^6}{2\pi f C_0}\left[\frac{R}{R^2 + X^2}\right], \quad (46)$$

where $C_0$ is the capacitance in pF of the probe in air.

The conductivity measurement probes and/or permittivity sensors can be configured to evaluate the conductivity and/or permittivity on a periodic basis and communicate the information to the probe control system 218. The information may be communicated to the probe control system 218 through a network or combination of networks such as, but not limited to, a LAN, WLAN, cellular network, or other appropriate wired or wireless communication network or combination of networks. Based upon the monitored conductivity and/or permittivity, the probe control system 218 may evaluate the variation in the complex Brewster angle ($\psi_{i,B}$) and/or the radial surface currents (or current density) and adjust the polyphase waveguide probe 200 to maintain and/or optimize operation at the operational frequency.

Stated another way, the various parameters associated with the polyphase waveguide probe 200 may be varied to adjust the polyphase waveguide probe 200 to a desired operating configuration.

This can be accomplished by adjusting, e.g., the height ($H_1$, $H_2$) of one or both of the charge terminals $T_1$ and/or $T_2$ relative to the surface of the lossy conducting medium 203, as well as the distance or spacing between the charge terminals $T_1$ and $T_2$. For instance, the probe control system 218 can adjust the height ($H_2$) of the charge terminal $T_2$ to maintain the electrical field strength of the Zenneck surface wave at or near its maximum. Alternatively, another parameter that can be adjusted is the size of the respective charge terminals $T_1$ and/or $T_2$, which affects the associated self-capacitance. Still further, another parameter that can be adjusted is the probe coupling circuit 209 associated with the polyphase waveguide probe 200. This may be accomplished by adjusting the size of the inductive and/or capacitive reactances that make up the probe coupling circuit 209. For example, the inductance of the coil coupled to charge terminal $T_1$ and/or terminal $T_2$ can be adjusted by varying a tap position on the coil, and/or by including a plurality of predefined taps along the coil and switching between the different predefined tap locations.

Field or field strength (FS) meters (e.g., a FIM-41 FS meter, Potomac Instruments, Inc., Silver Spring, MD) may also be distributed about the polyphase waveguide probe 200 to measure field strength of fields associated with the guided surface wave. The field or FS meters can be configured to detect the field strength and/or changes in the field strength (e.g., electric field strength) and communicate that information to the probe control system 218. The information may be communicated to the probe control system 218 through a network or combination of networks such as, but not limited to, a LAN, WLAN, cellular network, or other appropriate communication network or combination of networks. As the load and/or environmental conditions change or vary during operation, the polyphase waveguide probe 200 can be adjusted to maintain specified field strength(s) at the FS meter locations to ensure appropriate power transmission to the receivers and the loads they supply.

For example, the inductance of the coil coupled to the charge terminal $T_1$ and/or $T_2$ can be adjusted to improve and/or maximize the electrical field strength launched by the polyphase waveguide probe 200. By adjusting one or both of the coil inductance(s), the polyphase waveguide probe 200 can be adjusted to ensure the field strength remains at appropriate levels for the Zenneck surface wave. This can be accomplished by adjusting a tap position on the coil to change the inductance coupled to the charge terminal $T_1$ and/or $T_2$. In this way, the voltage magnitudes and phases on the charge terminals $T_1$ and $T_2$ can be increased or decreased to adjust the electric field strength. Maintaining field strength levels within predefined ranges can improve coupling by the receivers, reduce ground current losses, and avoid interference with transmissions from other polyphase waveguide probes 200.

Figure 16A:
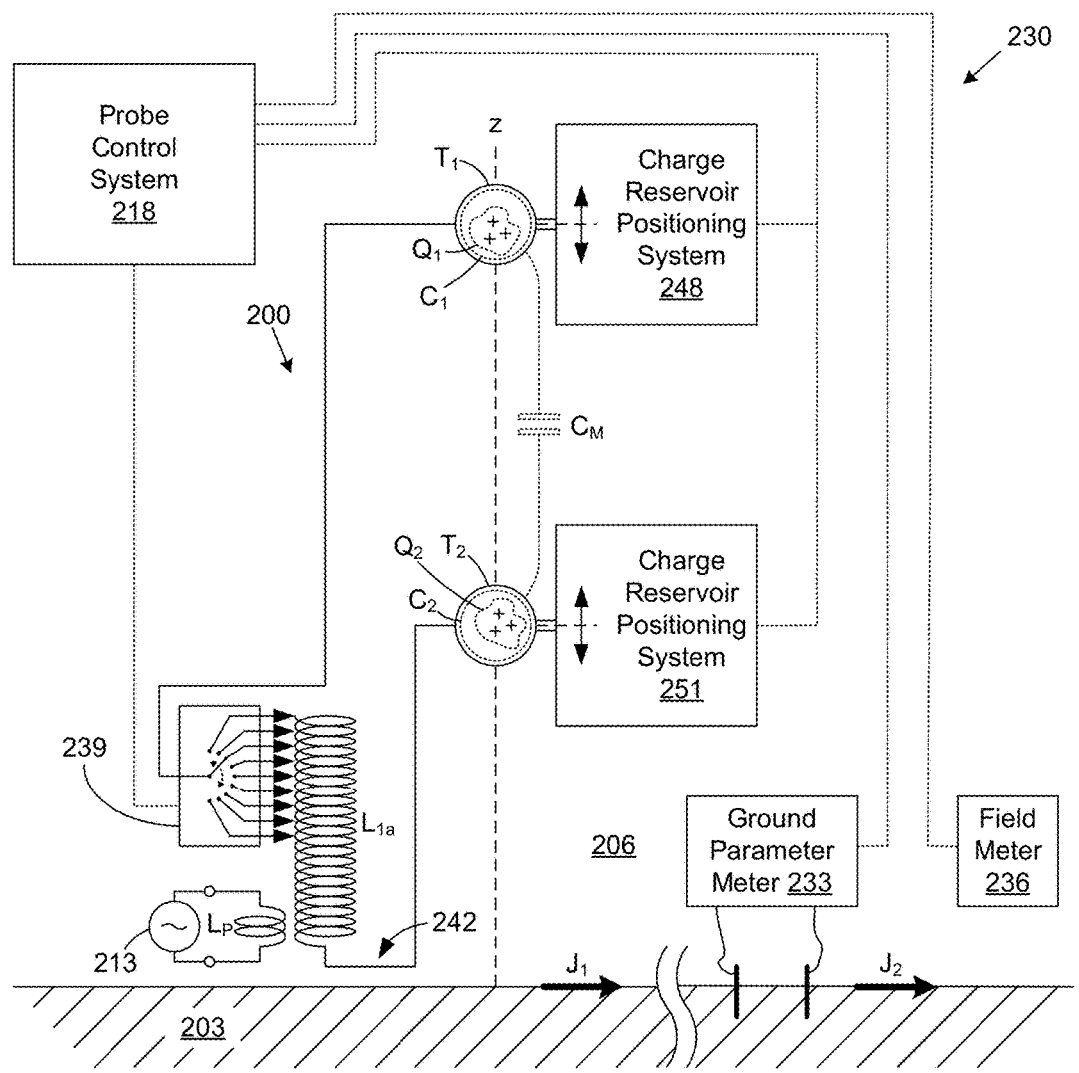
FIGS. 16A through 16C depict various adaptive control systems according to various embodiments of the present disclosure.

Referring to FIG. 16A, shown is an example of an adaptive control system 230 including the probe control system 218 of FIG. 6, which is configured to adjust the operation of a polyphase waveguide probe 200, based upon monitored conditions. The probe control system 218 can be implemented with hardware, firmware, software executed by hardware, or a combination thereof. For example, the probe control system 218 can include processing circuitry including a processor and a memory, both of which can be coupled to a local interface such as, for example, a data bus with an accompanying control/address bus as can be appreciated by those with ordinary skill in the art. A probe control application may be executed by the processor to adjust the operation of the polyphase waveguide probe 200 based upon monitored conditions. The probe control system 218 can also include one or more network interfaces for communicating with the various monitoring devices. Communications can be through a network or combination of networks such as, but not limited to, a LAN, WLAN, cellular network, or other appropriate communication network or combination of networks. The probe control system 218 can comprise, for example, a computer system such as a server, desktop computer, laptop, or other system with like capability.

The adaptive control system 230 can include one or more ground parameter meter(s) 233 such as, but not limited to, a conductivity measurement probe of FIG. 15A and/or an open wire probe or impedance analyzer 799 of FIG. 15B. The ground parameter meter(s) 233 can be distributed about the polyphase waveguide probe 200 at about the transition distance associated with the radial surface currents at the operating frequency. For example, an open wire probe or impedance analyzer 799 of FIG. 15B may be located in each quadrant around the polyphase waveguide probe 200 to monitor the conductivity and permittivity of the lossy conducting medium as previously described. The ground parameter meter(s) 233 can be configured to determine the conductivity and permittivity of the lossy conducting medium on a periodic basis and communicate the information to the probe control system 218 for potential adjustment of the polyphase waveguide probe 200. In some cases, the ground parameter meter(s) 233 may communicate the information to the probe control system 218 only when a change in the monitored conditions is detected.

The adaptive control system 230 can also include one or more field meter(s) 236 such as, but not limited to, an electric field strength (FS) meter. The field meter(s) 236 can be distributed about the polyphase waveguide probe 200 beyond the radial surface current transition where the guided field strength curve 103 (FIG. 1) dominates the radiated field strength curve 106 (FIG. 1). For example, a plurality of field meters 236 may be located along one or more radials extending outward from the polyphase waveguide probe 200 to monitor the electric field strength as previously described. The field meter(s) 236 can be configured to determine the field strength on a periodic basis and communicate the information to the probe control system 218 for potential adjustment of the polyphase waveguide probe 200. In some cases, the field meter(s) 236 may communicate the information to the probe control system 218 only when a change in the monitored conditions is detected.

Other variables can also be monitored and used to adjust the operation of the polyphase waveguide probe 200. For example, real power delivery may be determined by monitoring the excitation source 213. In some implementations, the polyphase waveguide probe 200 may be adjusted to maximize coupling into the guided surface waveguide mode based at least in part upon the current indication. By adjusting the inductance coupled to the charge terminal $T_1$ and/or $T_2$, the electric field strength can be maintained at desired levels or ranges for guided surface wave transmissions in the lossy conducting medium 203 (e.g., the earth). This can be accomplished by adjusting the tap position on the coil.

The excitation source 213 can also be monitored to ensure that overloading does not occur. As real load on the polyphase waveguide probe 200 increases, the output voltage of the excitation source 213, or the voltage supplied to the charge terminal $T_1$ from the coil, can be increased to increase field strength levels, thereby avoiding additional load currents. In some cases, the receivers themselves can be used as sensors monitoring the condition of the guided surface waveguide mode. For example, the receivers can monitor field strength and/or load demand at the receiver. The receivers can be configured to communicate information about current operational conditions to the probe control system 218. The information may be communicated to the probe control system 218 through a network or combination of networks such as, but not limited to, a LAN, WLAN, cellular network, or other appropriate communication network or combination of networks.

Based upon the information, the probe control system 218 can then adjust the polyphase waveguide probe 200 for continued operation. For example, the inductance coupled to the charge terminal $T_1$ and/or charge terminal $T_2$ can be adjusted to improve and/or maximize the coupling of the polyphase waveguide probe 200, to supply the load demands of the receivers. In some cases, the probe control system 218 may adjust the polyphase waveguide probe 200 to reduce loading on the excitation source 213 and/or polyphase waveguide probe 200. For example, the voltage supplied to the charge terminal $T_1$ may be reduced to lower field strength and prevent coupling to a portion of the most distant load devices.

The polyphase waveguide probe 200 can be adjusted by the probe control system 218 using, e.g., one or more tap controllers 239. In FIG. 16A, the connection from the coil to the upper charge terminal $T_1$ is controlled by a tap controller 239. In response to a change in the monitored conditions (e.g., a change in conductivity, permittivity, and/or electric field strength), the probe control system can communicate a control signal to the tap controller 239 to initiate a change in the tap position. The tap controller 239 can be configured to vary the tap position continuously along the coil or incrementally based upon predefined tap connections. The control signal can include a specified tap position or indicate a change by a defined number of tap connections. By adjusting the tap position, the voltage magnitude and phase on the charge terminal $T_1$ can be adjusted to improve the coupling of the guided surface waveguide mode.

Figure 16B:
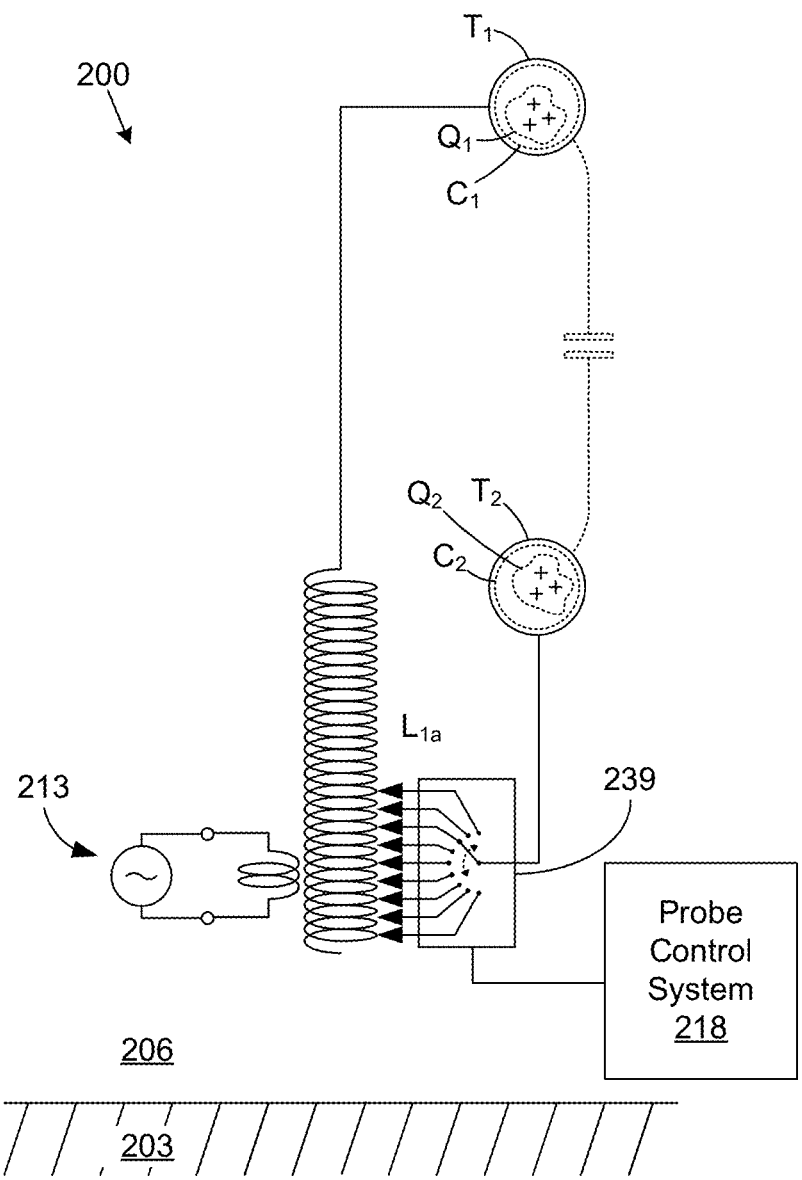
Figure 16C:
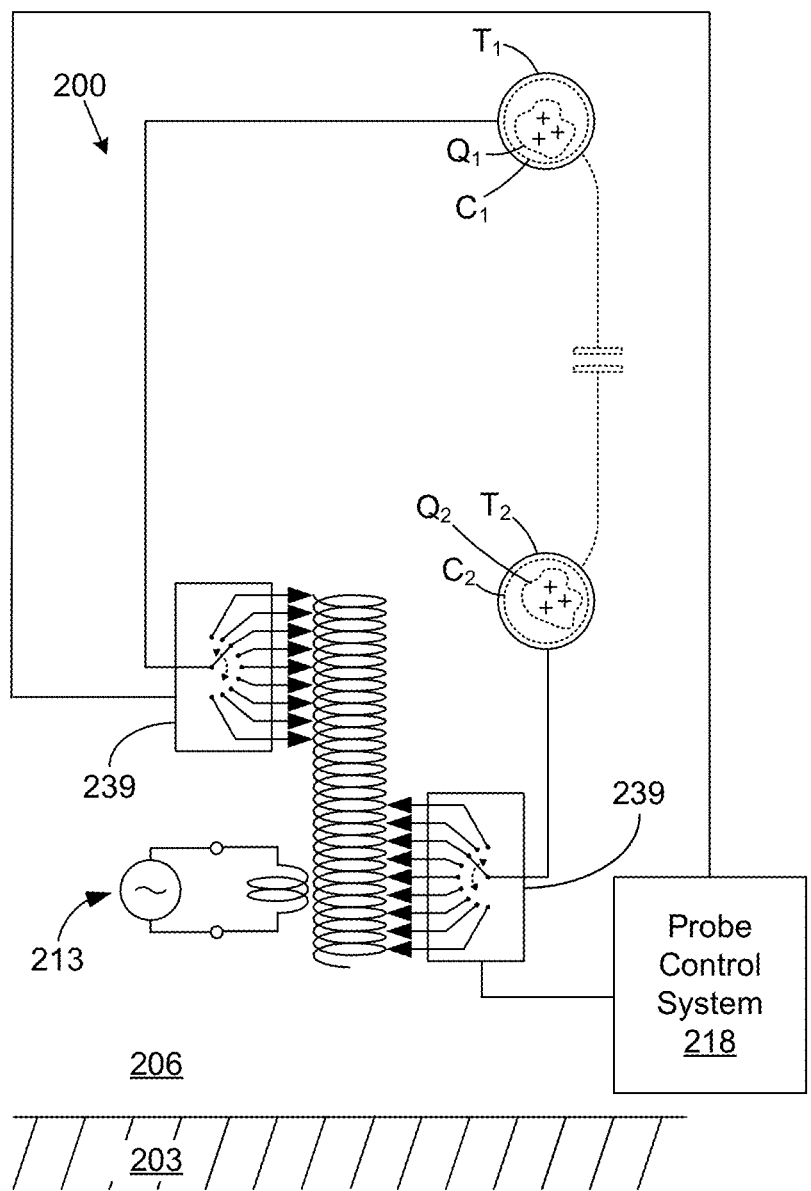

While FIG. 16A illustrates a tap controller 239 coupled between the coil and the charge terminal $T_1$, in other embodiments the connection 242 from the coil to the lower charge terminal $T_2$ can also include a tap controller 239. FIG. 16B shows another embodiment of the polyphase waveguide probe 200 with a tap controller 239 for adjusting the phase delay of the charge terminal $T_2$. FIG. 16C shows an embodiment of the polyphase waveguide probe 200 where the phase delay of both terminal $T_1$ and $T_2$ can be controlled using tap controllers 239. The tap controllers 239 may be controlled independently or concurrently by the probe control system 218. In some implementations, the excitation source 213 may be coupled to the coil through a tap controller 239, which may be controlled by the probe control system 218 to maintain a matched condition for maximum power transfer from the excitation source.

Referring back to FIG. 16A, the polyphase waveguide probe 200 can also be adjusted by the probe control system 218 using, e.g., an upper charge terminal positioning system 248 and/or a lower charge terminal positioning system 251. By adjusting the height of the charge terminal $T_1$ and/or the charge terminal $T_2$, and thus the distance between the two, it is possible to adjust the coupling of energy into the guided surface waveguide mode to maximize launch efficiency in launching a guided surface wave. The terminal positioning systems 248 and 251 can be configured to change the height of the terminals $T_1$ and $T_2$ by linearly raising or lowering the terminal along the z-axis normal to the lossy conducting medium 203. For example, linear motors may be used to translate the charge terminals $T_1$ and $T_2$ upward or downward using insulated shafts coupled to the terminals.

Other embodiments can include insulated gearing and/or guy wires and pulleys, screw gears, or other appropriate mechanism(s) that can control the positioning of the charge terminals $T_1$ and $T_2$. Insulation of the terminal positioning systems 248 and 251 prevents discharge of the charge that is present on the charge terminals $T_1$ and $T_2$. For instance, an insulating structure can support the charge terminal $T_1$ above the charge terminal $T_2$. For example, an RF insulating fiberglass mast can be used to support the charge terminals $T_1$ and $T_2$. The charge terminals $T_1$ and $T_2$ can be individually positioned using the charge terminal positioning system 248 and/or charge terminal positioning system 251 to improve and/or maximize the electrical field of the polyphase waveguide probe 200.

As has been discussed, the probe control system 218 of the adaptive control system 230 can monitor the operating conditions of the polyphase waveguide probe 200 by communicating with one or more remotely located monitoring devices such as, but not limited to, a ground parameter meter 233 and/or a field meter 236. The probe control system 218 can also monitor other conditions by accessing information from, e.g., the excitation source 213. Based upon the monitored information, the probe control system 218 can determine if adjustment of the polyphase waveguide probe 200 is needed to improve and/or maximize the electrical field strength for transmissions.

In response to a change in one or more of the monitored conditions, the probe control system 218 can initiate an adjustment of one or more of the inductances coupled to the charge terminal $T_1$ and/or charge terminal $T_2$ and/or the physical height ($H_1$, $H_2$) of the charge terminal $T_1$ and/or terminal $T_2$, respectively. In some implementations, the probe control system 218 can evaluate the monitored conditions to identify the source of the change. If the monitored condition(s) was caused by a change in receiver load, then adjustment of the polyphase waveguide probe 200 may be avoided, where the power source 213 may be driven so as to maintain the desired voltage on the charge terminals $T_1$ and/or $T_2$. If the monitored condition(s) affect the field strength of the polyphase waveguide probe 200, then the probe control system 218 can initiate adjustments of the polyphase waveguide probe 200 to improve and/or maximize the field strength associated with the radial surface currents.

In some embodiments, the size of the charge terminal $T_1$ may also be adjusted to control the coupling of energy into the guided surface waveguide mode. For example, the self-capacitance of the charge terminal $T_1$ can be varied by changing the size of the terminal. The charge distribution can also be improved by increasing the size of the charge terminal $T_1$, which can reduce the chance of an electrical discharge from the charge terminal $T_1$. Note that the size of the charge terminal $T_2$ may also be varied in a similar manner to charge terminal $T_1$ as described above. Control of the size of the charge terminal $T_1/T_2$ can be provided by the probe control system 218 through the charge terminal positioning system 248 or through a separate control system.

Figure 17A:
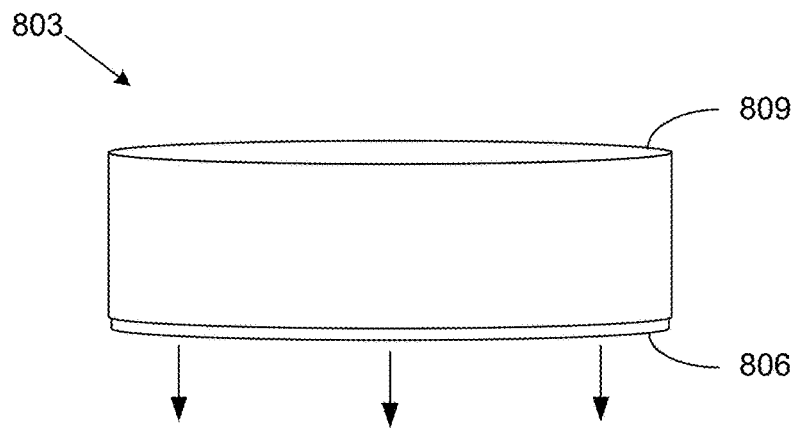
FIGS. 17A, 17B and 18 depict examples of variable charge terminals according to an embodiment of the present disclosure.
Figure 17B:
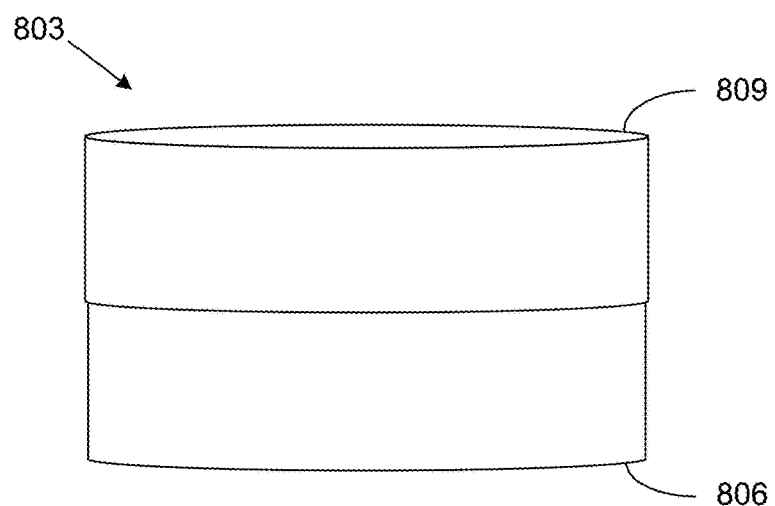

FIGS. 17A and 17B illustrate an example of a variable terminal 803 that can be used as a charge terminal $T_1$ and/or $T_2$ of the polyphase waveguide probe 200. For example, the variable terminal 803 can include an inner cylindrical section 806 nested inside of an outer cylindrical section 809. The inner and outer cylindrical sections 806 and 809 can include plates across the bottom and top, respectively. In FIG. 17A, the cylindrically shaped variable terminal 803 is shown in a contracted condition having a first size, which can be associated with a first effective spherical diameter. To change the size of the variable terminal 803, and thus the effective spherical diameter, one or both sections of the variable terminal 803 can be extended to increase the surface area as shown in FIG. 17B. This may be accomplished using a driving mechanism such as an electric motor or hydraulic cylinder that is electrically isolated to prevent discharge of the charge on the terminal.

Figure 18:
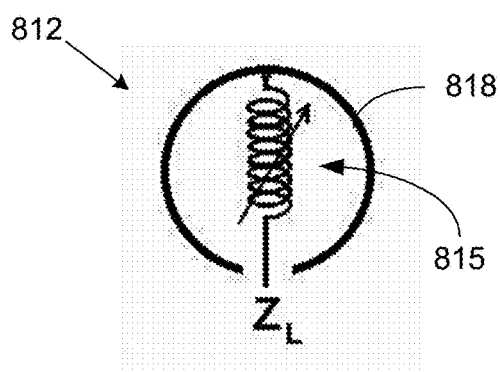

Referring next to FIG. 18, shown is a schematic representation illustrating a variable terminal 812 including a variable inductance 815 within the outer surface 818 of the terminal 812. By placing the variable inductor within the terminal 812, the load impedance $Z_L$ of a polyphase waveguide probe 200 of FIGS. 7A-7J (or the load impedance $Z_R$ of the tuned resonator 706 of FIG. 12B) can be adjusted by adjusting the inductance 815, without affecting the charge surface of the charge terminal $T_1$. In some embodiments, the variable terminal 803 of FIGS. 17A and 17B can include a variable inductance 815 within the cylindrical sections 806 and 809. Such a combination can provide a wider range of control over the load impedance $Z_L$ of the polyphase waveguide probe 200.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims. In addition, all optional and preferred features and modifications of the described embodiments and dependent claims are usable in all aspects of the disclosure taught herein. Furthermore, the individual features of the dependent claims, as well as all optional and preferred features and modifications of the described embodiments are combinable and interchangeable with one another.

Therefore, the following is claimed:

1. A system, comprising:
 a guided surface waveguide probe comprising a first charge terminal and a second charge terminal elevated above a lossy conducting medium, the guided surface waveguide probe being configured to launch a Zenneck surface wave by generating at least one resultant field that synthesizes a wave front incident at a complex Brewster angle of incidence of the lossy conducting medium; and
 a probe control system configured to optimize operation of the guided surface waveguide probe by adjusting one or more operating parameters of the guided surface waveguide probe.

2. The system of claim 1, further comprising a remotely-located field meter in communication with the probe control system, the probe control system being configured to receive field meter data from the remotely-located field meter, and the one or more operating parameters being adjusted based at least in part on the field meter data.

3. The system of claim 2, wherein the one or more operating parameters of the guided surface waveguide probe are adjusted until a maximum field strength is detected by the remotely-located field meter.

4. The system of claim 1, wherein the one or more operating parameters comprise at least one of: a distance between the first charge terminal and the second charge terminal, a self-capacitance of at least one of the first charge terminal or the second charge terminal, a bound capacitance of at least one of the first charge terminal or the second charge terminal, a phase of at least one of the first charge terminal or the second charge terminal, or a magnitude of at least one of the first charge terminal or the second charge terminal.

5. The system of claim 1, wherein the probe control system is further configured to at least detect a condition associated with the guided surface waveguide probe, wherein the one or more operating parameters are adjusted in response to detecting the condition.

6. The system of claim 5, wherein the condition comprises at least one of a field strength, a conductivity of the lossy conducting medium, a real power delivery of an excitation source coupled to the guided surface waveguide probe, or an overloading of the excitation source.

7. The system of claim 1, further comprising an excitation source coupled to the guided surface waveguide probe.

8. A method, comprising:
   launching a Zenneck surface wave, via a guided surface waveguide probe, by exciting a first charge terminal and a second charge terminal of the guided surface waveguide probe to generate at least one resultant field that synthesizes a wave front incident at a complex Brewster angle of incidence of a lossy conducting medium; and
   adjusting one or more operational parameters of the guided surface waveguide probe to improve operation of the guided surface waveguide probe in response to detecting a condition associated with the guided surface waveguide probe.

9. The method of claim 8, wherein generating the at least one resultant field that synthesizes the wave front incident at the complex Brewster angle of incidence further comprises substantially mode-matching the at least one resultant field to a Zenneck surface wave mode on a surface of the lossy conducting medium.

10. The method of claim 8, further comprising detecting the condition based at least in part on one or more monitored characteristics associated with the guided surface waveguide probe.

11. The method of claim 10, wherein detecting the condition comprises receiving data from one or more remotely-located monitoring devices.

12. The method of claim 11, wherein the one or more remotely-located monitoring devices comprise at least one of: a field meter or a ground parameter meter.

13. The method of claim 8, further comprising:
   generating a guided field strength curve based at least in part on a conductivity and a permittivity of an area associated with the guided surface waveguide probe; and
   determining whether optimal transmission of the Zenneck surface wave is achieved by comparing one or more measured field strengths associated with the at least one resultant field with the guided field strength curve.

14. The method of claim 8, wherein the condition comprises at least one of a field strength, a conductivity of the lossy conducting medium, a real power delivery of an excitation source coupled to the guided surface waveguide probe, or an overloading of the excitation source.

15. The method of claim 8, wherein the one or more operational parameters comprises at least one of: a distance between the first charge terminal and the second charge terminal, a self-capacitance of at least one of the first charge terminal or the second charge terminal, a bound capacitance of at least one of the first charge terminal or the second charge terminal, a phase of at least one of the first charge terminal or the second charge terminal, or a magnitude of at least one of the first charge terminal or the second charge terminal.

16. A system comprising:
   a guided surface waveguide probe configured to launch a Zenneck surface wave by generating at least one resultant field that synthesizes a wave front incident at a complex Brewster angle of incidence of a lossy conducting medium;
   one or more remotely-located monitoring devices configured to generate data associated with the guided surface waveguide probe; and
   a probe control system configured to improve transmission of the Zenneck surface wave by adjusting one or more operational parameters of the guided surface waveguide probe based at least in part on the data received from the one or more remotely-located monitoring devices.

17. The system of claim 16, wherein the probe control system is further configured to at least detect a change in at least one of a conductivity of the lossy conducting medium or a change in electric field strength based at least in part on the generated data.

18. The system of claim 16, wherein the guided surface waveguide probe comprises a first charge terminal, a second charge terminal, and a coupling circuit coupled to the first charge terminal and the second charge terminal via at least one variable tap, and the coupling circuit being configured to impose a plurality of voltage magnitudes and a plurality of phases on the first charge terminal and the second charge terminal.

19. The system of claim 18, wherein adjusting the one or more operational parameters of the guided surface waveguide probe further comprises adjusting a position of the at least one variable tap.

20. The system of claim 16, wherein the guide surface waveguide probe further comprises a first charge terminal and a second charge terminal, and adjusting the one or more operational parameters further comprises adjusting at least one of a phase or a magnitude of at least one of the first charge terminal or the second charge terminal.

* * * * *